US005960415A

United States Patent [19]

Williams

[11] Patent Number: 5,960,415

[45] Date of Patent: Sep. 28, 1999

[54] FORECASTING CONTROL SYSTEM AND METHOD

[75] Inventor: Geoff Williams, Melbourne, Australia

[73] Assignee: GLW Software Pty. Limited, Australia

[21] Appl. No.: 08/771,611

[22] Filed: Dec. 20, 1996

[30] Foreign Application Priority Data

Dec. 22, 1995 [AU] Australia ............................... 40694/95

[51] Int. Cl.[6] ...................................................... B42D 11/00

[52] U.S. Cl. ............................. 705/30; 707/503; 707/504

[58] Field of Search ............................... 705/30; 707/503, 707/504, 904, 905

[56] References Cited

U.S. PATENT DOCUMENTS

| | | | |
|---|---|---|---|
| 5,471,612 | 11/1995 | Schlafly | 707/104 |
| 5,633,998 | 5/1997 | Schlafly | 395/180 |

*Primary Examiner*—Thomas Peeso
*Attorney, Agent, or Firm*—Olson & Hierl, Ltd.

[57] ABSTRACT

This invention concerns a forecasting control system which takes data and processes it to provide selective data reports including forecasts as a continuum of post results. The system makes use of arrays and in particular arrays embedded in computerised spreadsheets to process measured and forecast data and produce control reports. In particular the system produces a summary array and a closing array by adding together the other arrays. In another aspect the invention concerns a method of operating the computerised spreadsheets.

17 Claims, 1 Drawing Sheet

FORECASTING CONTROL SYSTEM AND METHOD

TECHNICAL FIELD

This invention concerns a forecastirg control system which takes measured data, and processes it to provide selective data reports including forecasts. The systen makes use of arrays, and in particular arrays embedded within computerised spreadsheets, to process the data and provide the reports. In further aspects the invention concerns a method of operating the computerised spreadsheets and a computer system.

BACKGROUND ART

The invention comprises a framework for efficiently generating and controlling forecasts from historical data, and arose in financial forecasting originally. With the advent of personal computers, a number of forecasting packages have been introduced. A typical accountancy package will provide for sequential entry of historical accountancy data, and a computing "engine" will process this data to provide accountancy output, which is compared with a budget. The "engine" will generally be invisible to the user, and its operation need not be understood by the user. In fact, it is commonly the case that the user will not be able to determine how the "engine" is processing the accountancy data to produce the output. Some systems, in an endeavour to reduce the ability of users to tamper with the input data, restrict users ability to change data once entered. These packages tend to be inflexible in their provision of reports, do not usually provide any forecasting facilities, and do not have provision to include technical non-accounting data. Other packages concentrate on forecasting, with minimal or no historical data. Yet other spreadsheet systems are developed to forecast results for companies for economic investment appraisals, but do not include basic accounting controls such as double-entry bookkeeping, applied to forecasts.

DISCLOSURE OF THE INVENTION

The present invention provides a forecasting control system comprising: arrays of cells for the entry of data items representing operational, historical and forecast data for each of a number of defined reporting periods within a time period; wherein each cell in each array corresponds to a particular item of growth or category of assets in respect of a particular reporting period; some of the arrays are designated data entry arrays and data concerning different items of growth are entered into different data entry arrays, each cell of a summary of change factors array is arranged to automatically display data which is the sum of the data entered for the respective item of growth and for the respective reporting period on all the data entry arrays; and each cell of a closing array automatically displays data which is the sum of: the data entered for the respective category of asset and the respective reporting period on all the other arrays; plus the value of the respective cell of the closing array in the immediately preceding reporting period. A note on the terms used is indicated on Annexure A of this application.

The array approach allows the user to define and select in advance the data to be tracked by the system. Both historical data such as particular revenue, expenses, equity, assets and liabilities, and operational data such as measurable technical features of transactions with major groups such as customers, workers, and suppliers, may be entered.

The arrays may be partitioned into sections, each array having a growth factor section and a system status section.

Alternatively, separate arrays may be provided for growth factor data, and for system status data, and these arrays may be paired.

Columns in the arrays may record data for reporting periods preselected by the user within a time period, for example the twelve months July to June of a financial year in accounting applications; or the ten years 1990 to 2000 in economic appraisals.

Rows in the arrays may record items of data, for example: sales, purchases, fixed asset totals, creditor totals or other data, and units sold, labour hours worked, orders delivered late or other non-financial data.

Any entry for a particular reporting period may require both a positive value such as a debit for an expense or asset, and a negative value such as a credit for income or a creditor, to be entered in the same column. The action of this control is shown in a check row to clarify that entries in a particular reporting period total zero, or in other words that total debits equal total credits.

The arrangement preserves double-entry bookkeeping, with which bookkeeping staff are familiar, and allows data to be entered by staff without advanced qualifications. The data is easily reviewed from period to period by qualified personnel.

Additional columns may be added to show, for instance, year-to-date actuals, and forecast end-term results.

A summary of change factors (or profit) may may be derived by formulae which automatically sum items affecting profit or chance from data input arrays over the defined reporting periods. The total profit or net change for each month may be recorded in a special profit row in the array.

A summary system status or closing (balance sheet) array may be derived by formulae which automatically sum the status or asset and liability items, plus the opening value of these items at the beginning of each reporting period, plus the total profit derived from the profit array.

Budget data, set at the beginning of the accounting period, actual data recorded during the accounting period and forecast data may be treated in similar ways.

Before a forecasting exercise is started, a budget array is completed showing budget data for each reporting period.

Another array is there, filled with forecast data for each reporting period, showing expected data rather than target or budget data. Actual data is then entered in place of forecast data, as each reporting period is completed. A close relationship of actual and forecast data is maintained. At the beginning of the accounting period, the forecasts may be close to budget, but after a month or two forecasts may differ substantially from budget. This will indicate to management that results for the full year may be substantially above or below original budget, and provides early warning to management to take action to avoid adverse results. By including forecasts, the effect of action by management, such as a decision to raise prices by 10%, can be obtained to determine whether the action proposed will yield the desired result.

The forecasts may be revised in the light of each month's actual results, every month. The forecasts will therefore reflect the most up-to-date information. The forecasts of each item grow naturally out of, and can be seen to be consistent with, the immediately preceding data. Furthermore, the forecast data is subject to the same data controls as actual data. For financial data, a forecast balance sheet is generated for every reporting period in advance, and this forecast balance sheet must balance, as does a balance sheet with historical data. For non-financial data, causal factors are specified and separately forecast, and actual data for the causal factors isolated is reconciled with total system data by an error array.

Another advantage is reversibility. This may be particularly important in analysis of financial statements of public companies. An analyst will not know in advance all the causal factors, that is the accounting transactions which cause the changes in balance sheets. However, from the balance sheets available in summary form, the causal changes may be deduced by disaggregating the data back into individual data arrays for respective items.

The technique of adding and subtracting arrays of data is a general technique that can work in either direction: from the system "balance sheet" to causal factors, or from causal factors to a system "balance sheet".

Reports may be defined by the user. These may be combinations of summary data, comparing budget, actual and forecast data, and comments and graphs as desired. For example, a graph may plot budget levels of cash at bank month by month, and compare these with plots of actual cash at bank each month to date, and forecast cash at bank levels for the remainder of the year. Financial data and non-financial data may be highlighted in the reports as preferred by the user.

The system described can be implemented in a computerised spreadsheet application. In this case each set of revenue and expense and balance sheet data may be placed on a respective page within the spreadsheet. The cells of the sheets may contain formulae linked to the contents of other cells. In particular, some cells in journal arrays may contain formulae which reverse entries made in other revenue or expense cells. In addition, the cells of the closing profit array and the final balance sheet array may contain formulae to add the contents of the respective cells of the other arrays.

In another aspect, the invention provides a forecasting control method comprising the steps of:

displaying a plurality of data entry arrays containing cells for the entry of data representing growth and asset items for each of a number of defined reporting periods within a time period, wherein each cell in each data entry array corresponds to a particular item of growth or category of assets in respect of a particular reporting period;

entering items, historical or forecast, concerning different growth and assets data in the cells of different data entry arrays;

displaying a summary of change factors array in which each cell automatically contains the sum of the data entered for defined items of growth and respective reporting periods on all the data entry arrays; and displaying a closing array in which each cell automatically contains the sum of: data entered for the defined category of asset and reporting period on all the other sheets plus the value of the respective cell of the closing array in the immediately preceding reporting period.

In a further aspect the invention provides a method of operating a computer spreadsheet application to provide forecasting control comprising the steps of; constructing a plurality of arrays each having the same corresponding elements in which there is identified the same item of growth or category of assets in respect of the same reporting period;

designating one of the arrays as a summary of change factors array and inserting a formula into each growth factor cell to automatically calculate the sum of the entries in the corresponding cell in each of the other arrays;

designating another array as a closing array and inserting a formula into each asset cell to automatically calculate the sum of the entries in the corresponding cell of each of the other arrays plus in the first reporting periods an opening value and in the subsequent reporting periods the value of the respective cell of the closing array in the immediately preceding reporting period.

In a further aspect the invention provides a computer system including a spreadsheet application arranged to provide forecast control comprising a plurality of arrays each having the same corresponding elements in which there is identified the same item of growth or category of assets in respect of the same reporting period;

one of the arrays is a summary of change factors array in which there is a formula in each growth factor cell to automatically calculate the sum of the entries in the corresponding cell in each of the other arrays;

another array is a closing array in which there is a formula in each asset cell to automatically calculate the sum of the entries in the corresponding cell of each of the other arrays plus the value of the respective cell of the closing array in the immediately preceding reporting period.

In a further aspect the invention provides computer software to control the operation of a computer spreadsheet application to perform the method of operating a computer spreadsheet application to provide forecasting control reports, comprising the steps of: constructing a plurality of arrays, each having the same corresponding elements in which there is identified the same item of growth or category of assets in respect of the same reporting period;

designating one of the arrays as a summary of change factors array, and inserting a formula into each growth factor cell to automatically calculate the sum of the entries in the corresponding cell in each of the other arrays;

designating another array as a closing array, and inserting a formula into each asset cell to automatically calculate the sum of the entries in the corresponding cell of each of the other arrays, plus the value of the respective cell of the closing array in the immediately preceding reporting period.

BRIEF DESCRIPTION OF THE DRAWINGS

Examples of the invention will now be described with reference to the accompanying drawings.

BRIEF DESCRIPTION OF THE TABLES

Figure 1:
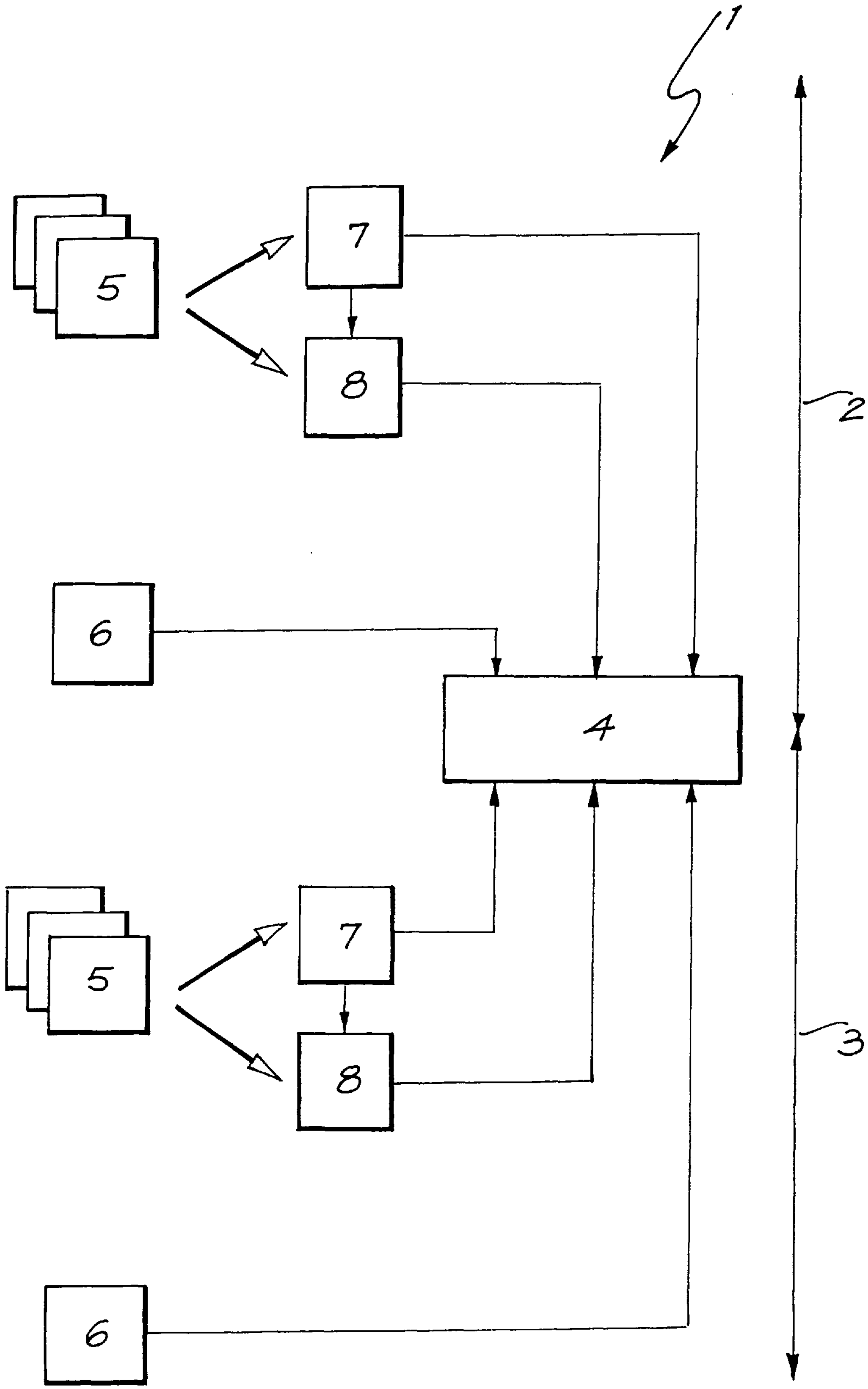
FIG. 1 is a schematic diagram outlining a prepared embodiment of the invention.

Table 1 presents known Australian population at end of various specified periods.

Tables 2 to 9 concern a first example showing the application of the invention to records of the Australian population;

Table 2 is an array of population births;

Table 3 is an array of migrations to Australia;

Table 4 is an array of population deaths;

Table 5 is an array of permanent departures,

Table 6 is an array of net interstate migration;

Table 7 is an array of statistical errors;

Table 8 is an array of the sum of change factors; and

Table 9 is an array showing population at the close of each year.

Table 9a shows the total population at year end.

Table 9b presents regression forecasts for specified years.

Tables 10 to 13 concern a second example applied in an accounting scenario.

Table 10 is an array of cash receipts;

Table 11 is an array of journal entries;

Table 12 is an profit and loss statement; and

Table 13 is an balance sheet.

BEST MODE FOR CARRYING OUT THE INVENTION

Referring first to FIG. 1 the reporting system 1 has a structure comprising two identically structured sub-systems 2 and 3 feeding information to the reports 4. The first sub-system 2 concerns budget data, and the second sub-system 3 concerns actual and forecast data.

In both sub-systems 2 and 3 there are data entry arrays 5 and 6. Economic data is entered into arrays 5 and operational data is entered into arrays 6. Change factor data and system status data both go into arrays 5. There are multiple arrays 5 each having the same dimensions, and concerning the same reporting periods and data. Data entry is disaggregated by entering different economic data items into different sections of the arrays 5. Arrays 5 are summed to produce a summary of change factors in array 7, and a final asset status summary in array 8. Operational data is shown as feeding direct to reports 4; however operational data may also be split into change factor data and system status data in the same way as the economic data. Arrays 6, 7 and 8 feed to reports 4.

In accounting applications, financial and non-financial data is input to arrays 5 and 6 respectively. The non-financial data input array 6 feeds direct to the reports 4. The financial data input arrays 5 are summed to produce a summary array 7 of profit, and another summary array 8 of closing balance sheets.

In both cases, the principles of double entry bookkeeping are applied to ensure an important control over the data, for each reporting period:

| Array 8 of data in previous period (ie, opening balances for this reporting period). | + | Array 7 of data, for the current reporting period. | = | Array 8 data in this reporting period, (ie, closing balances). |
|---|---|---|---|---|

It is not difficult using formulae to generate forecasts; application of this control however requires the forecasts to be generated in such a manner that the system is balanced. This enhances the reliability, consistency and verisimilitude of the forecasts. If asset acquisitions are forecast or budgeted, for example, the system requires liabilities (or diminution in cash reserves) to be also forecast or budgeted in exactly equal amounts, or error messages will be generated.

In a first example the population of Australia between 1986 and 1991 will be recorded and processed in order to provide forecasts for the population through 1992 to 1997. The base data is given in Table 1.

TABLE 1

| KNOWN POPULATION AT END OF PERIOD | | | | | | |
|---|---|---|---|---|---|---|
| | 1986 | 1987 | 1988 | 1989 | 1990 | 1991 |
| NSW | 5531526 | 5612244 | 5701525 | 5771946 | 5828850 | 5901126 |
| VIC | 4160856 | 4208940 | 4261945 | 4321464 | 4379622 | 4427371 |
| QLD | 2624595 | 2676765 | 2743765 | 2834097 | 2906778 | 2972004 |
| SA | 1382550 | 1394154 | 1400255 | 1424047 | 1439121 | 1456712 |
| WA | 1459018 | 1500507 | 1544806 | 1594745 | 1633825 | 1665945 |
| TAS | 446473 | 447941 | 448457 | 451136 | 455633 | 460405 |
| NT | 154421 | 156674 | 155886 | 156323 | 157277 | 158779 |
| ACT | 258910 | 266088 | 273534 | 278705 | 265077 | 293531 |
| TOTAL AUSTRALIA | 16018350 | 16263319 | 16538153 | 16833095 | 17085383 | 17335933 |

Source: A Commonwealth Year Book

1992:0

PO 150

Tables 2 to 9 are set out showing data for the years 1986 to 1997 in columns. The first six rows show growth items. The following eight rows show a breakdown according to states and territories. The ninth row shows a control total which should sum the column to zero, and a final row present on some sheets shows a rate based on the population at the end of the preceding year.

Table 2 deals with population births during the year. In the first row the actual birth figures are inserted for the years 1987 to 1991 and the breakdown of these figures by states and territories is set out lower down in the same columns. Forecasts are then made for the years 1992 to 1997 on the basis of the birth rate established from the historical data.

Table 3 deals with migration to Australia and again the actual figures are entered from 1987 to 1991. For 1992 to 1997 the forecast is for migration at the 1991 rate.

Table 4 deals with deaths. The actual figures are placed for 1987 to 1991 and the forecast figures are generated using the death rate of the historical figures.

Table 5 deals with permanent departures. Historical data is entered from 1987 to 1991 and forecasts are made at a constant rate of departure for 1992 to 1997.

Table 6 shows the net interstate migration and although this has not been forecasted the overall effect on the country's population is effectively zero for all years.

Table 7 shows the statistical errors in the historical data.

Table 8 is a summary of the change factors. This summary shows the growth items taken from Tables 2 to 7 and displayed in an array in corresponding location to those occupied in the earlier figures. It can be considered as a consolidation of Tables 2 to 7 and may be derived by adding the corresponding growth items of Tables 2 to 7 together and displaying them. An additional line is entered beneath the table of growth items showing the net change throughout the year.

Table 9 is a snap shot of the total population at the end of each year. It shows the actual and forecast breakdown of the population into the various states and territories. This array also shows the 1986 values and the net change row from Table 8. The previous year's population can be added to the total population at the end of the preceding year shown in the row labelled "Previous Investment" in order to arrive at a total population figure for the year end. The total population figure for the year end is not shown in Table 9 but is shown in Table 9a.

Table 9a also shows the actual and forecast population figures from the 1996 year book and this data has been used to test the forecast populations and illustrates these by total error and percentage error.

An alternative way of forecasting the data is to apply a simple regression to the total population Table as shown in Table 9B. The errors shown using this aggregated approach indicate higher errors than the forecasting which embodies the present invention. This does not say that the matrix disaggregation approach of the present invention will always yield better results than regression formulae.

TABLE 9B

REGRESSION FORECASTS

| YEAR | 1992 | 1993 | 1994 |
|---|---|---|---|
| 1996 Year Book Data | 17489076 | 17656427 | 17843268 |
| Regression Forecasts | 17618912 | 17888158 | 18157404 |
| Errors | 129840 | 231731 | 314136 |
| Error % | 0.74% | 1.31% | 1.76% |

A second example will now be described with reference to Tables 10 to 13.

The arrangement of the data in arrays and in particular the separation of the data into growth factors and asset categories is compliant with standard double counting bookkeeping practice. This makes the invention particularly suited to accountancy applications.

Table 10 shows an array of twelve columns each headed by the name of a month from July to June. The rows show growth factors as profit and loss entries divided into revenue and expenses and the system status categories as balance sheet entries divided into assets liabilities and equity. There is a totals row at the bottom of the page.

Data is credited (negative figures in brackets indicate a credit) into the row representing sales in the profit and loss array and the corresponding debit entry is made in the cash at bank row on the balance sheet array for cash sales. The total row at the bottom shows zero entries as a check.

The first two columns July and August are sub-headed actual and the data in these columns is actual data from subsidiary records maintained by bookkeepers. The remaining columns are sub-headed forecast and include data which is estimated.

Table 11 shows an array which is identical in layout to Table 10 but which has different entries. The entries on this array are journal entries and represent depreciation. Depreciaton is debited as an expense in the profit section and credited representing an addition to the provision or diminution in value of the fixed assets in the balance sheet section. Again the entries for each month total to zero.

Table 12 again shows identical arrays to Tables 10 and 11 but the data shown in the cells of the profit and loss array is the sum of all the data shown in the respective cells of the profit and loss arrays of Tables 10 and 11. Entries are automatically generated in the profit row equal to the sum of the other rows.

Table 13 is again an array of identical layout but data is only shown in this case in the balance sheet section. An additional column is provided on the left hand side of the array for the opening values. The values in the first column of the array that is July represent the sums of the corresponding values in all the preceding sheets added to the opening values. The sums shown in the second column August are the sums from the corresponding locations in all the preceding sheets but in addition they are added to the preceding month values (July). The process is continued across the array. The profits shown in the profit row in the profit and loss statement Table 12 are also input onto the balance sheet.

An identical set of arrays could be provided for budget data.

Realisation

In a practical example a business entity finds through experience that certain journals are required to record accounting transactions: a sales journal, a purchases journal, a cash receipts journal, a cash payments journal, a general journal, for example. Let n=the number of journals required for a particular business entity.

Then consider a matrix A of 3 dimensions; this may be visualised as a spreadsheet consisting of (n+2) sheets. The first n sheets contain the journals required by the business entity.

Sheet (n+1) contains an array of profit data.

Sheet (n+2) contains an array of balance sheet data.

In general terms let A(s i j) denote an element of matrix A corresponding to sheet s account i period j. For example in all entity with 5 basic journals (n=5) the matrix A or spreadsheet can take the following form:

s=1: Sales journal data s=2: Purchases journal data s=3: Cash receipts journal data s=4: Cash payments journal data s=5: General journal data s=6: Profit statement s=7: Balance sheet where i denotes an account number in the entity's chart of accounts and j denotes a month number in the current accounting period (financial year) of 1 2 3 . . . 12.

The journal matrices may be partitioned matrices containing profit data and balance sheet data in separate sections.

The profit statement on sheet (n+1) is derived by adding the profit data in the first n sheets for any particular month j:

$$A(n+1\ i\ j)=\sum_{s=1}^{n} A(s\ i\ j)$$

for i=revenue or expense account.

The profit is found by adding all entries i for that month; in the profit statement and recording the sum in a special row p:

$$A(n+1\ p\ j)=\sum_{i\neq p}A(n+1\ i\ j)$$

p is conveniently located as a row in the equity section.

The balance sheet on sheet (n+2) is derived by adding the balance sheet data in the first n sheets for any particular month j together with the corresponding balances of the previous month:

$$A(n+2\ i\ j)=\sum_{s=1}^{n}A(s\ i\ j)+A(n+2\ i\ j-1)$$

for balance sheet accounts $i\neq p$

The invention also postulates that the profit for the current month found in the profit statement is added in to the equity in the balance sheet statement:

$$A(n+2p\ j)=A(n+2p\ j-1)+A(n+1p\ j).$$

If all accounting entries are correct then the data in the balance sheet in each month j will sum to zero:

$$\sum_{i}A(n+2\ i\ j)=O$$

for j=1 2 . . . 12.

Whatever the current month say j=t. This means that both actual and forecast data are subject to the same overall control: total debits are balanced with total credits whether they are historical debits and credits or future debits and credits. The advantage of this feature in forecasting is that it is a check to ensure that liabilities are not omitted. Only by including all forecast liabilities will a forecast balance sheet balance.

It is important to ensure that in the arrays s=1 2 . . . n recording journal data input that the sum of all entries to all accounts in any month j will add to zero. This summation to zero is obtained on the journal input matrices by entering the complete accounting entry for each entry each month; that is ensuring total debits equal total credits. This is a useful control measure in its own right but also ensures matrices can be added together to yield a profit statement and a balance sheet.

Full year results are anticipated by inclusion of forecasts in each data cell for each account each month up to the end of the year on the same double entry accounting principle for actual results.

forcast Profit to year-end $$\sum_{j=1}^{12}A(n+1\ p\ j)$$

is founded by summing actual profits for months 1 2 . . . t plus forecast profits for months (t+1) (t+2) . . . 12.

Forecast balance sheet data is obtained in a similar way by summing actual data in month t plus forecast data for months (t+1) (t+2) . . . 12.

Forecast data is therefore subject to the same data control as actual data.

This logic is equally applicable to budget data:

A budget profit statement is obtained at the beginning of a year by adding budget journal matrices for revenue/expense accounts.

A budget balance sheet is obtained at the beginning of a year by adding budget journal matrices for asset/liability/equity accounts.

A report to management is obtained by comparing key budget and actual/forecast data:

Current month: Actual results and budget results

Year to date: Actual results and budget results

End Year: Actual results for the first t months plus forecast results for the remaining (12-t) months for the full year compared to full year budget results.

A slight variation entails set-up of a matrix to hold opening balances on accounts at the beginning of each month; the profit statement could be held on sheet n+2 and the balance sheet held on sheet n+3.

Then A(1 i j)=A(n+3 i j−2) for j=2 3 . . . 12 and A(1 i 1) has data input from the previous financial year.

Other variations may involve for example additional cash receipts and cash payments sheets/matrices for additional bank accounts.

Also all matrices may be partitioned and the profit statement and balance sheet combined on one sheet which could be called a trial balance matrix.

Application to Annual Reporting

Another application is to annual results comparing annual actuals with a long term plan for a defined period of t years as budget:

For example a planning cycle or term of t=5 years;

| | years | | | | | |
|---|---|---|---|---|---|---|
| Profits | 1 | 2 | 3 | 4 | 5 | Total |
| Budget | 100 | 120 | 135 | 130 | 150 | 635 |
| Actual | 110 | 95 | | | | 205 |
| Forecast | | | 90 | 95 | 105 | 290 |

In this case j = 1 2 3 4 5

In general:

Each year within the planning term of t years:

Compare actual results and budget results for each year

But also: Compare (a) the sum of actual results for the first j years and forecast results for the remaining (t-j) years of the planning term or cycle; with (b) the planned or budget results for all t years of the planning term or cycle Even though the invention has been described with reference to particular embodiments it should be appreciated that it may be embodied in many other ways. For instance it is not necessary for the arrays to be identical nor for them to be positioned in the same places on respective sheets since it is possible to add elements from different arrays together regardless of their positions. However it is convenient and advantageous to the user to employ that arrangement. Error messages may also be provided to highlight any errors in data input or forecasts, in order to flag new trends or input errors. The source of all data changes could also be identified and recorded.

Industrial Applicability

Although the invention has been described with reference to applications which are not technical in themselves, it is possible to apply the invention technically. The invention could be employed in the many different control systems such as:

FORECASTING OF MINERAL RESOURCES

Objective: Forecast specified mineral reserves, Australia 1997–2005

System status categories: Estimated reserves at specified locations

System change categorles: Production, destruction, evaporation, wastage

Unit of measurement: Kilotonnes or megaliters

FORECASTING OF BIOLOGICAL RESOURCES

Objective: Forecast (eg) Australian forest resources, 1997–2005

System status categories: Estimated reserves of different species of trees on Australian commercial plantations System change categories: Sawmilling, destruction by fire, planting, additions purchased, relinquishments Unit of measurement: Hectares

FORECASTING OF MILITARY RESOURCES

Objective: Forecast (eg) Australian army personnel, 1997–2000

System status categories: Numbers of personnel of different ranks and different training at different locations System change categories: Recruitments, killed, resignations, promotions, transfers Unit of measurement: Number of personnel

FORECASTING OF A CITY OFFICE SPACE

Objective: Forecast (eg) stock of office space, Melbourne 1997–2000

System status categories: Office space in 6 city areas defined by the Building Owners & Managers Association System change categories: Supply additions, vacant, withdrawals Unit of measurement: Square meters

FORECASTING OF VEHICLE FUEL USAGE

Objective: Forecast (eg) fuel consumption for a satellite launch rocket every 1 second after ignition System status categories: Quantity of fuel remaining in different fuel cells during satellite launch System change categories: Fuel flow for production, wastage Unit of measurement: Liters

FORECASTING OF SMALL BUSINESS

Objective: Forecast number of small business enterprises Australia 1997–2000

System status categories: Numbers of small firms by location and/or year of start-up and/or type of firm System change categories: Startups, Failures by cause of failure Unit of measurement: Numbers of firms In these environments the ability to forecast disaggregated items, such as the behaviour of fuel cells individually, could be used to ensure that the behaviour of the rocket remained within operational norms. Circumstances where actual behaviour differ substantially from forecast behaviour could indicate failures, such as fuel leaks or engine damage, and could even trigger a decision to abort if the measured data indicated too great a variance from the forecast data.

The invention may find application in many controlled environments besides the particular financial environments described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

ANNEXURE A

| G/LEG97 GLOSS 17/12/96 | GLOSSARY OF TERMS USED IN PATENT APPLICATION |
|---|---|
| Accounting Period | Total term of months, weeks, years for which budget, actual and forecast data are generated and controlled in the model. |
| Reporting Period | Individual period for which a report is required, within the overall accounting period; for example a month within a year. |
| Arrays | Arrangement of numbers in rows and columns, describing: (a) change or growth factors to a system, and (b) elements of the status of a system. In a financial system, for example: (a) is represented by revenue and expense accounts, summing to a profit; (b) is represented by asset and liability accounts, which with owners' equity including accumulated profits sum to zero; typically rows are used for accounts and columns are used for reporting periods. The patent application assumes all arrays contain a common unit of measurement, whether it be dollars of currency, or numbers of people, or another unit of quantity. |
| Budget | Estimate of data for a given reporting period, which is fixed either in absolute amount (fixed budget) or in calculation (flexible budget) for a defined accounting period. Budgets are used as an aid to controlling operations and evaluating performance. For example, a budget may be entered for sales for each month for the next year, and this is kept fixed for that year for purposes of comparing with actual sales and because many other decisions are dependent upon achievement of it - borrowing by the company for example, or recruitment of a certain level of sales and service personnel. |
| Forecast | Estimate of data for a given reporting period, which may be revised at any time. Forecasts are used as an aid to planning and an early warning of problem situations. |
| Status Category | A state or condition of a part or division of a system under study. |
| Change Category | A classification or division of change or growth factors applicable to a system under study. |
| Double-entry Accounting | Basic accounting approach, in which each transaction is entered twice (being debited to one account and credited to another account) to record the impact on the accounting equation. The accounting equation states that at any given time, the assets of a business entity equal the sum of the liabilities and the owners' equity in that business entity. |

TABLE 2

| | 1986 | 1987 ACTUAL | 1988 ACTUAL | 1989 ACTUAL | 1990 ACTUAL | 1991 ACTUAL | 1992 F'CAST | 1993 F'CAST | 1994 F'CAST | 1995 F'CAST | 1996 F'CAST | 1997 F'CAST |
|---|---|---|---|---|---|---|---|---|---|---|---|---|
| | | | | | | Population Births during the Year | | | | | | |
| GROWTH ITEM: ( ) is increase/income for country | | | | | | | | | | | | |
| (Births) (Migration) to Australia Deaths Permanent Departures Net Interstate Migration Statistical Errors | | (245,683) | (248,883) | (250,466) | (254,688) | (259,230) | (263,116) | (266,973) | (270,884) | (274,787) | (278,743) | (282,732) |
| ASSET CATEGORY: 0 is decrease in asset | | | | | | | | | | | | |
| NSW | | 86,186 | 85,127 | 86,344 | 87,931 | 88,408 | 89,584 | 90,877 | 92,202 | 93,637 | 94,884 | 98,242 |
| VIC | | 04,077 | 63,841 | 64,545 | 65,338 | 68,453 | 67,195 | 68,182 | 69,178 | 70,177 | 71,187 | 72,208 |
| QLD | | 40,419 | 40,601 | 41,562 | 42,880 | 44,103 | 46,107 | 45,759 | 48,436 | 47,108 | 47,787 | 48,470 |
| SA | | 21,291 | 21,147 | 21,327 | 21,585 | 21,835 | 22,109 | 22,433 | 22,700 | 23,090 | 23,422 | 23,756 |
| WA | | 22,469 | 22,780 | 23,395 | 24,120 | 24,789 | 25,265 | 25,655 | 26,029 | 26,406 | 26,767 | 27,170 |
| TAS | | 8,878 | 5,794 | 8,791 | 8,626 | 6,226 | 6,980 | 7,091 | 7,195 | 7,299 | 7,404 | 7,810 |
| NT | | 2,378 | 2,376 | 2,360 | 2,385 | 2,386 | 2,410 | 2,445 | 2,481 | 2,517 | 2,553 | 2,590 |
| ACT | | 3,987 | 4,020 | 4,142 | 4,217 | 4,325 | 4,455 | 4,620 | 4,686 | 4,853 | 4,720 | 4,787 |
| CONTROL TOTAL | | (0) | (0) | 0 | (0) | (0) | 0 | 0 | 0 | 0 | 0 | 0 |
| Birth Rate, per thousand based on population and previous year | | 15 | 15 | 15 | 15 | 15 | 15 | 15 | 15 | 15 | 15 | 15 |

Source: Com'th Year Book 1992: p 152 mentions crude rate 15.4 per thousand given and apportioned over States.

TABLE 3

| | 1986 | 1987 ACTUAL | 1988 ACTUAL | 1989 ACTUAL | 1990 ACTUAL | 1991 ACTUAL | 1992 F'CAST | 1993 F'CAST | 1994 F'CAST | 1995 F'CAST | 1996 F'CAST | 1997 F'CAST |
|---|---|---|---|---|---|---|---|---|---|---|---|---|
| | | | | | | Migration to Australia during the Year | | | | | | |
| GROWTH ITEM: ( ) is increases/income for country | | | | | | | | | | | | |
| (Births) (Migration) to Australia Deaths Permanent Departures Net Interstate Migration Statistical Errors | | (128,290) | (151,650) | (131,080) | (121,550) | (133,116) | (133,115) | (133,115) | (133,115) | (133,116) | (133,118) | (133,115) |
| ASSET CATEGORY: 0 is decrease in asset | | | | | | | | | | | | |
| NSW | | 44,302 | 62,293 | 45,185 | 41,662 | 45,308 | 46,312 | 45,312 | 45,312 | 45,312 | 45,312 | 45,312 |
| VIC | | 33,324 | 33,221 | 33,776 | 31,208 | 34,124 | 33,900 | 33,995 | 38,996 | 33,996 | 33,996 | 33,996 |
| QLD | | 21,020 | 24,948 | 21,744 | 20,455 | 22,647 | 22,821 | 22,621 | 22,021 | 22,621 | 22,621 | 22,621 |
| SA | | 11,073 | 12,991 | 11,180 | 10,288 | 11,211 | 11,185 | 11,185 | 11,185 | 11,185 | 11,185 | 11,185 |
| WA | | 11,685 | 13,982 | 12,242 | 11,516 | 12,729 | 12,792 | 12,792 | 12,792 | 12,792 | 12,792 | 12,792 |
| TAS | | 3,578 | 4,174 | 3,854 | 3,258 | 3,558 | 3,530 | 3,635 | 3,536 | 3,535 | 3,535 | 3,535 |
| NT | | 1,237 | 1,480 | 1,235 | 1,127 | 1,225 | 1,219 | 1,219 | 1,219 | 1,219 | 1,219 | 1,219 |

TABLE 3-continued

| | Migration to Australia during the Year | | | | | | | | | | |
|---|---|---|---|---|---|---|---|---|---|---|---|
| | 1986 | 1987 ACTUAL | 1988 ACTUAL | 1989 ACTUAL | 1990 ACTUAL | 1991 ACTUAL | 1992 F'CAST | 1993 F'CAST | 1994 F'CAST | 1995 F'CAST | 1996 F'CAST | 1997 F'CAST |
| ACT | | 2,074 | 2,480 | 2,108 | 2,013 | 2,221 | 2,254 | 2,254 | 2,254 | 2,254 | 2,254 | 2,254 |
| CONTROL TOTAL | | (0) | (0) | 0 | (0) | 0 | 0 | 0 | 0 | 0 | 0 | 0 |

Source: Com'th Year Book 1992: p 175: Australian totals given and apportioned over States above pro-rata to population at end of previous year
Data for 1991 onwards based on average of 1987–1990, then allocated pro-rata, to States

TABLE 4

| | DEATH Population Deaths during the Year | | | | | | | | | | | |
|---|---|---|---|---|---|---|---|---|---|---|---|---|
| | 1986 | 1987 ACTUAL | 1988 ACTUAL | 1989 ACTUAL | 1990 ACTUAL | 1991 ACTUAL | 1992 F'CAST | 1993 F'CAST | 1994 F'CAST | 1995 F'CAST | 1996 F'CAST | 1997 F'CAST |
| GROWTH ITEM: ( ) is increase/income for country | | | | | | | | | | | | |
| (Births) (Migration) to Australia Deaths Permanent Departures Net Interstate Migration Statistical Errors | | 112,128 | 112,198 | 115,840 | 115,767 | 117,832 | 119,695 | 121,352 | 123,120 | 124,903 | 125,701 | 128,515 |
| ASSET CATEGORY: 0 is decrease in asset | | | | | | | | | | | | |
| NSW | | (38,721) | (33,604) | (39,247) | (39,696) | (40,185) | (40,711) | (41,308) | (41,910) | (42,517) | (43,120) | (43,746) |
| VIC | | (29,128) | (29,019) | (29,338) | (20,720) | (30,206) | (30,644) | (30,992) | (31,442) | (31,589) | (32,366) | (32,821) |
| QLD | | (15,372) | (18,455) | (19,887) | (10,401) | (20,047) | (20,803) | (20,804) | (21,107) | (21,413) | (21,721) | (22,052) |
| SA | | (9,676) | (9,612) | (9,604) | (9,708) | (9,925) | (10,060) | (10,197) | (10,340) | (10,405) | (10,647) | (10,799) |
| WA | | (10,213) | (10,348) | (10,634) | (10,968) | (11,288) | (11,493) | (11,882) | (11,832) | (12,003) | (12,176) | (12,350) |
| TAS | | (3,125) | (3,088) | (3,087) | (3,103) | (3,149) | (3,177) | (3,223) | (3,270) | (3,318) | (3,365) | (3,414) |
| NT | | (1,081) | (1,080) | (1,073) | (1,075) | (1,085) | (1,095) | (1,111) | (1,128) | (1,144) | (1,100) | (1,177) |
| ACT | | (1,512) | (1,838) | (1,883) | (1,217) | (1,955) | (2,025) | (2,056) | (2,085) | (2,115) | (2,145) | (2,176) |
| CONTROL TOTAL | | 0 | (0) | (0) | (0) | 0 | 0 | (0) | (0) | (0) | (0) | 0 |
| Death Rate, per thousand based on population and previous year | | 7 | 7 | 7 | 7 | 7 | 7 | 7 | 7 | 7 | 7 | 7 |

Source: Com'th Year Book 1992: p 162 mentions crude rate 7.0 per thousand given and apportioned over States above

TABLE 5

| | Population Permanent Departures during the Year | | | | | | | | | | | |
|---|---|---|---|---|---|---|---|---|---|---|---|---|
| | 1986 | 1987 ACTUAL | 1988 ACTUAL | 1989 ACTUAL | 1990 ACTUAL | 1991 ACTUAL | 1992 F'CAST | 1993 F'CAST | 1994 F'CAST | 1995 F'CAST | 1996 F'CAST | 1997 F'CAST |
| GROWTH ITEM: ( ) is increase/income for country | | | | | | | | | | | | |
| (Births) (Migration) to Australia Deaths Permanent Departures Net Interstate Migration Statistical Errors | | 20,410 | 20,320 | 24,800 | 30,570 | 23,988 | 23,983 | 23,983 | 23,983 | 23,983 | 23,983 | 23,953 |

TABLE 5-continued

Population Permanent Departures during the Year

| | 1986 | 1987 ACTUAL | 1988 ACTUAL | 1989 ACTUAL | 1990 ACTUAL | 1991 ACTUAL | 1992 F'CAST | 1993 F'CAST | 1994 F'CAST | 1995 F'CAST | 1996 F'CAST | 1997 F'CAST |
|---|---|---|---|---|---|---|---|---|---|---|---|---|
| ASSET CATEGORY: 0 is decrease in asset | | | | | | | | | | | | |
| NSW | | (7,048) | (7,012) | (5,550) | (10,414) | (8,179) | (8,164) | (8,164) | (8,164) | (8,164) | (8,164) | (8,164) |
| VIC | | (5,302) | (6,259) | (5,809) | (7,797) | (6,148) | (6,128) | (6,125) | (6,125) | (6,125) | (6,125) | (6,125) |
| QLD | | (3,344) | (3,344) | (4,119) | (5,113) | (4,080) | (4,111) | (4,111) | (4,111) | (4,111) | (4,111) | (4,111) |
| SA | | (1,702) | (1,742) | (2,114) | (2,670) | (2,020) | (2,018) | (2,016) | (2,016) | (2,016) | (2,016) | (2,015) |
| WA | | (1,859) | (1,878) | (2,319) | (2,877) | (2,203) | (2,305) | (2,305) | (2,305) | 2,305) | (2,305) | (2,305) |
| TAS | | (569) | (560) | (673) | (314) | (641) | (637) | (637) | (637) | (637) | (637) | (637) |
| NT | | (197) | (198) | (234) | (282) | (221) | (220) | (220) | (220) | (220) | (220) | (220) |
| ACT | | (330) | (332) | (411) | (503) | (400) | (408) | (408) | (408) | (408) | (408) | (408) |
| CONTROL TOTAL | | (0) | 0 | 0 | 0 | (0) | (0) | (0) | (0) | (0) | (0) | (0) |

Source: Com'th Year Book 1992: p 152: Australian totals given.
Apportioned over States above pro-rata to population at end of previous year
Data for 1991 onwards based on average of 1987–1990, then allocated pro-rata to States

TABLE 6

Population Interstate Migration during the Year

| | 1986 | 1987 ACTUAL | 1988 ACTUAL | 1989 ACTUAL | 1990 ACTUAL | 1991 ACTUAL | 1992 F'CAST | 1993 F'CAST | 1994 F'CAST | 1995 F'CAST | 1996 F'CAST | 1997 F'CAST |
|---|---|---|---|---|---|---|---|---|---|---|---|---|
| GROWTH ITEM: ( ) is increase/income for country | | | | | | | | | | | | |
| (Births) | | | | | | | | | | | | |
| (Migration) to Australia | | | | | | | | | | | | |
| Deaths | | | | | | | | | | | | |
| Permanent Departures | | | | | | | | | | | | |
| Net Interstate Migration | | (100) | (100) | 0 | (100) | 200 | | | | | | |
| Statistical Errors | | | | | | | | | | | | |
| ASSET CATEGORY: 0 is decrease in asset | | | | | | | | | | | | |
| NSW | | (10,300) | (14,200) | (30,100) | (37,000) | (16,800) | 0 | 0 | 0 | 0 | 0 | 0 |
| VIC | | (13,400) | (14,800) | (12,900) | (8,200) | (15,200) | 0 | 0 | 0 | 0 | 0 | 0 |
| QLD | | 15,100 | 28,200 | 45,300 | 36,500 | 27,400 | 0 | 0 | 0 | 0 | 0 | 0 |
| SA | | (3,200) | (300) | 800 | 700 | 3,100 | 0 | 0 | 0 | 0 | 0 | 0 |
| WA | | 10,400 | 3,400 | 9,508 | 7,100 | 2,500 | 0 | 0 | 0 | 0 | 0 | 0 |
| TAS | | (2,600) | (3,400) | (1,300) | 1,400 | (200) | 0 | 0 | 0 | 0 | 0 | 0 |
| NT | | (1,400) | (4,600) | (3,000) | (2,800) | (2,200) | 0 | 0 | 0 | 0 | 0 | 0 |
| ACT | | 2,700 | 2,800 | 700 | 2,100 | 4,200 | 0 | 0 | 0 | 0 | 0 | 0 |
| CONTROL TOTAL | | 0 | 0 | 0 | 0 | 0 | 0 | 0 | 0 | 0 | 0 | 0 |

Source: Com'th Year Book 1992: p 178 for Aust totals

TABLE 7

| | 1986 | 1987 ACTUAL | 1988 ACTUAL | 1989 ACTUAL | 1990 ACTUAL | 1991 ACTUAL | 1992 F'CAST | 1993 F'CAST | 1994 F'CAST | 1995 F'CAST | 1996 F'CAST | 1997 F'CAST |
|---|---|---|---|---|---|---|---|---|---|---|---|---|
| GROWTH ITEM: ( ) is increase/income for country | | | | | | | | | | | | |
| (Births) | | | | | | | | | | | | |
| (Migration) to Australia | | | | | | | | | | | | |
| Deaths | | | | | | | | | | | | |
| Permanent Departures | | | | | | | | | | | | |
| Net Interstate Migration | | | | | | | | | | | | |
| Statistical | | (2,435) | (8,950) | (52,090) | (22,088) | (220) | 0 | 0 | 0 | 0 | 0 | 0 |

TABLE 7-continued

| | 1986 | 1987 ACTUAL | 1988 ACTUAL | 1989 ACTUAL | 1990 ACTUAL | 1991 ACTUAL | 1992 F'CAST | 1993 F'CAST | 1994 F'CAST | 1995 F'CAST | 1996 F'CAST | 1997 F'CAST |
|---|---|---|---|---|---|---|---|---|---|---|---|---|
| Errors | | | | | | | | | | | | |
| ASSET CATEGORY: 0 is decrease in asset | | | | | | | | | | | | |
| NSW | | 7,300 | 11,708 | 25,801 | 13,001 | 7,834 | | | | | | |
| VIC | | (1,484) | (885) | 9,858 | 7,483 | (474) | | | | | | |
| QLD | | (0,063) | (2,945) | 4,743 | (2,801) | (4,797) | | | | | | |
| SA | | (8,121) | (9,388) | (5,088) | (5,701) | (5,611) | | | | | | |
| WA | | 9,008 | 11,377 | 17,755 | 10,180 | 5,003 | | | | | | |
| TAS | | (2,480) | (3,404) | (2,604) | (2,072) | (2,084) | | | | | | |
| NT | | 1,318 | 1,232 | 1,185 | 1,417 | 1,096 | | | | | | |
| ACT | | 550 | 297 | 484 | 462 | 74 | | | | | | |
| CONTROL TOTAL | | 0 | 0 | 0 | 0 | 0 | 0 | 0 | 0 | 0 | 0 | 0 |

TABLE 8

| | 1986 | 1987 ACTUAL | 1988 ACTUAL | 1989 ACTUAL | 1990 ACTUAL | 1991 ACTUAL | 1992 F'CAST | 1993 F'CAST | 1994 F'CAST | 1995 F'CAST | 1996 F'CAST | 1997 F'CAST |
|---|---|---|---|---|---|---|---|---|---|---|---|---|
| GROWTH ITEM: ( ) is increase/income for country | | | | | | | | | | | | |
| (Births) | | (246,883) | (246,683) | (250,485) | (254,668) | (269,230) | (263,115) | (286,973) | (270,885) | (274,787) | (278,743) | (262,732) |
| (Migra- | | (128,290) | (151,650) | (131,060) | (121,580) | (133,115) | (123,115) | (133,115) | (133,115) | (133,115) | (133,115) | (133,115) |
| tion) to 0 Australia | | 0 | 0 | 0 | 0 | 0 | 0 | 0 | 0 | 0 | 0 | |
| Deaths | | 112,128 | 112,128 | 113,843 | 115,767 | 117,832 | 119,908 | 121,362 | 123,120 | 124,903 | 125,701 | 128,515 |
| Permanent Departures | | 20,410 | 20,320 | 24,030 | 30,370 | 23,883 | 23,883 | 23,883 | 23,883 | 23,883 | 23,883 | 23,865 |
| Net Inter-state Migration | | (100) | (100) | 0 | (100) | 200 | 0 | 0 | 0 | 0 | 0 | 0 |
| Statistical Errors | | (2,436) | (8,950) | (62,000) | (22,086) | (220) | 0 | 0 | 0 | 0 | 0 | 0 |
| NET CHANGES: 0 = (PROFIT) | | (244,959) | (274,834) | (294,952) | (252,206) | (250,580) | (262,650) | (264,764) | (256,877) | (259,017) | (261,174) | (263,350) |
| ASSET CATEGORY: 0 is decrease in asset | | | | | | | | | | | | |
| NSW | | — | — | — | — | — | — | — | — | — | — | — |
| VIC | | — | — | — | — | — | — | — | — | — | — | — |
| QLD | | — | — | — | — | — | — | — | — | — | — | — |
| SA | | — | — | — | — | — | — | — | — | — | — | — |
| WA | | — | — | — | — | — | — | — | — | — | — | — |
| TAS | | — | — | — | — | — | — | — | — | — | — | — |
| NT | | — | — | — | — | — | — | — | — | — | — | — |
| ACT | | — | — | — | — | — | — | — | — | — | — | — |
| CONTROL TOTAL | | — | — | — | — | — | — | — | — | — | — | — |

TABLE 9

| Closing Total Population at End of Year | | | | | | |
|---|---|---|---|---|---|---|
| | 1986 | 1987 ACTUAL | 1988 ACTUAL | 1989 ACTUAL | 1990 ACTUAL | 1991 ACTUAL |
| GROWTH ITEM: ( ) is increase/income for country | | | | | | |
| (Births) | | — | — | — | — | — |
| (Migration) to Australia | | — | — | — | — | — |
| | | — | — | — | — | — |
| Deaths | | — | — | — | — | — |
| Permanent Departures | | — | — | — | — | — |
| Net Interstate Migration | | — | — | — | — | — |
| Statistical Errors | | — | — | — | — | — |
| NET CHANGE: 0 = (PF | 0 | (244,969) | (274,834) | (204,032) | (252,295) | (260,530) |
| PREVIOUS INVESTM | (18,018,350) | (16,015,360) | (16,203,810) | (15,538,165) | (15,893,055) | (17,085,883) |

TABLE 9-continued

| Closing Total Population at End of Year | | | | | | |
|---|---|---|---|---|---|---|
| ASSET CATEGORY | | | | | | |
| NSW | 3,531,526 | 6,612,244 | 5,701,625 | 5,771,945 | 5,620,860 | 5,901,120 |
| VIC | 4,160,858 | 4,208,946 | 4,281,946 | 4,321,484 | 4,379,822 | 4,427,071 |
| QLD | 2,624,595 | 2,678,765 | 2,748,785 | 2,834,097 | 2,906,778 | 2,072,004 |
| SA | 1,382,560 | 1,394,104 | 1,405,255 | 1,424,647 | 1,439,121 | 1,486,712 |
| WA | 1,459,019 | 1,500,507 | 1,544,808 | 1,594,746 | 1,633,028 | 1,585,946 |
| TAS | 446,473 | 447,941 | 448,457 | 481,138 | 456,639 | 480,488 |
| NT | 154,421 | 156,874 | 155,800 | 155,323 | 167,277 | 156,779 |
| ACT | 258,010 | 260,088 | 273,534 | 278,705 | 288,077 | 293,831 |
| CONTROL TOTAL | 0 | 0 | 0 | 0 | 0 | 0 |
| | 1992 F'CAST | 1993 F'CAST | 1994 F'CAST | 1995 F'CAST | 1996 F'CAST | 1997 F'CAST |
| GROWTH ITEM: ( ) is increase/income for country | | | | | | |
| (Births) | | — | — | — | — | — |
| (Migration) to Australia | | — | — | — | — | — |
| | | — | — | — | — | — |
| Deaths | | — | — | — | — | — |
| Permanent Departures | | — | — | — | — | — |
| Net Interstate Migration | | — | — | — | — | — |
| Statistical Errors | | — | — | — | — | — |
| NET CHANGE: 0 = (PF | (252,650) | (254,759) | (265,877) | (269,017) | (261,174) | (288,350) |
| PREVIOUS INVESTM | (17,335,933) | (17,588,883) | (17,843,397) | (18,100,214) | (18,359,230) | (18,820,404) |
| ASSET CATEGORY | | | | | | |
| NSW | 5,987,126 | 6,075,845 | 6,101,288 | 6,240,455 | 6,338,368 | 6,420,002 |
| VIC | 4,421,894 | 4,556,958 | 4,622,652 | 4,688,708 | 4,755,408 | 4,822,854 |
| QLD | 3,018,017 | 3,058,991 | 3,103,020 | 3,147,434 | 3,192,200 | 0,237,365 |
| SA | 1,477,942 | 1,403,346 | 1,820,933 | 1,542,005 | 1,554,844 | 1,380,770 |
| WA | 1,890,224 | 1,714,705 | 1,739,391 | 1,754,282 | 1,769,380 | 1,814,637 |
| TAS | 467,170 | 473,042 | 450,785 | 487,845 | 494,682 | 501,577 |
| NT | 161,093 | 153,428 | 155,770 | 166,151 | 170,648 | 172,955 |
| ACT | 297,809 | 302,122 | 006,472 | 310,857 | 318,260 | 212,730 |
| CONTROL TOTAL | 0 | 0 | 0 | 0 | 0 | 0 |

TABLE 9a

| Total population at year end | | | | | | |
|---|---|---|---|---|---|---|
| 1992 YEARBOOK DATA: | 1986 | 87 ACTUAL | 88 ACTUAL | 89 ACTUAL | 90 ACTUAL | 91 ACTUAL |
| Total Population year-end | | 16,263,310 | 16,538,183 | 16,833,085 | 17,085,382 | 17,353,933 |
| 1992 YEARBOOK DATA: | 92 F'CAST | 93 F'CAST | 94 F'CAST | 95 F'CAST | 96 F'CAST | 97 F'CAST |
| Total Population year-end | 17,568,583 | 17,843,037 | 18,100,214 | 18,359,230 | 18,820,404 | 18,883,755 |
| | ACTUAL | ACTUAL | ACTUAL | F'CAST | F'CAST | F'CAST |
| 1996 YEARBOOK DATA: | 17,489,072 | 17,686,427 | 17,843,258 | 18,041,891 | 18,242,671 | 18,445,027 |
| error | 99,511 | 189,910 | 256,040 | | | |
| error % | 0.87% | 1.06% | 1.44% | | | |

TABLE 10

| PROFIT & LOSS ENTRIES | JUL ACTUAL | AUG ACTUAL | SEP FORECAS | OCT FORECAS | NOV FORECAS | DEC FORECAS |
|---|---|---|---|---|---|---|
| REVENUE | | | | | | |
| Sales | (102,400) | (105,600) | (89,600) | (80,000) | (76,800) | (48,000) |
| Other Income | — | — | — | — | — | — |
| COST OF SALES | | | | | | |
| Opening Stock | — | — | — | — | — | — |
| Purchases | — | — | — | — | — | — |

TABLE 10-continued

| | | | | | | | |
|---|---|---|---|---|---|---|---|
| Rent | | — | — | — | — | — | — |
| Wages | | — | — | — | — | — | — |
| Closing Stock | | — | — | — | — | — | — |
| OFFICE EXPENSES | | | | | | | |
| Depreciation | | — | — | — | — | — | — |
| Insurance & Workcare | | — | — | — | — | — | — |
| Leave | | — | — | — | — | — | — |
| Light & Power | | — | — | — | — | — | — |
| Petty Cash & Sundry | | — | — | — | — | — | — |
| Wages | | — | — | — | — | — | — |
| Income Tax | | — | — | — | — | — | — |
| BALANCE SHEET ENTRIES | | | | | | | |
| CURRENT ASSETS | | — | — | — | — | — | — |
| Cash at Bank | | 102,400 | 106,800 | 89,600 | 80,000 | 76,800 | 48,000 |
| Debtors | | — | — | — | — | — | — |
| Provision Doubtful Debts | | — | — | — | — | — | — |
| Closing Stock - products | | — | — | — | — | — | — |
| NON-CURRENT ASSETS | | — | — | — | — | — | — |
| Depreciation Provision | | — | — | — | — | — | — |
| Investments at cost | | — | — | — | — | — | — |
| CURRENT LIABILITIES | | — | — | — | — | — | — |
| Trade Creditors | | — | — | — | — | — | — |
| Provision for Income Tax | | — | — | — | — | — | — |
| NON-CURRENT LIABILITIES | | — | — | — | — | — | — |
| mortgage | | — | — | — | — | — | — |
| SHAREHOLDERS EQUITY | | | | | | | |
| Share Capital | | — | — | — | — | — | — |
| Profit Current Year after tax | | 0 | 0 | 0 | 0 | 0 | 0 |
| Totals | — | — | — | — | — | — | — |

| PROFIT & LOSS ENTRIES | JAN FORECAS | FEB FORECAS | MAR FORECAS | APR FORECAS | MAY FORECAS | JUN FORECAS |
|---|---|---|---|---|---|---|
| REVENUE | | | | | | |
| Sales | (16,000) | (28,800) | (48,000) | (51,200) | (73,600) | (89,600) |
| Other Income | — | — | — | — | — | — |
| COST OF SALES | | | | | | |
| Opening Stock | — | — | — | — | — | — |
| Purchases | — | — | — | — | — | — |
| Rent | — | — | — | — | — | — |
| Wages | — | — | — | — | — | — |
| Closing Stock | — | — | — | — | — | — |
| OFFICE EXPENSES | | | | | | |
| Depreciation | — | — | — | — | — | — |
| Insurance & Workcare | — | — | — | — | — | — |
| Leave | — | — | — | — | — | — |
| Light & Power | — | — | — | — | — | — |
| Petty Cash & Sundry | — | — | — | — | — | — |
| Wages | — | — | — | — | — | — |
| Income Tax | — | — | — | — | — | — |
| BALANCE SHEET ENTRIES | | | | | | |
| CURRENT ASSETS | — | — | — | — | — | — |
| Cash at Bank | 16,000 | 28,800 | 48,000 | 51,200 | 73,600 | 89,600 |
| Debtors | — | — | — | — | — | — |
| Provision Doubtful Debts | — | — | — | — | — | — |
| Closing Stock - products | — | — | — | — | — | — |
| NON-CURRENT ASSETS | — | — | — | — | — | — |
| Depreciation Provision | — | — | — | — | — | — |
| Investments at cost | — | — | — | — | — | — |
| CURRENT LIABILITIES | — | — | — | — | — | — |
| Trade Creditors | — | — | — | — | — | — |
| Provision for Income Tax | — | — | — | — | — | — |
| NON-CURRENT LIABILITIES | — | — | — | — | — | — |
| mortgage | — | — | — | — | — | — |
| SHAREHOLDERS EQUITY | | | | | | |
| Share Capital | — | — | — | — | — | — |
| Profit Current Year after tax | 0 | 0 | 0 | 0 | 0 | 0 |
| Totals | — | — | — | — | — | — |

TABLE 12

| PROFIT & LOSS ENTRIES | JUL ACTUAL | AUG ACTUAL | SEP FORECAST | OCT FORECAST | NOV FORECAST | DEC FORECAST |
|---|---|---|---|---|---|---|
| REVENUE | | | | | | |
| Sales | (102,400) | (105,600) | (89,600) | (80,000) | (76,800) | (48,000) |
| Other Income | — | — | — | — | — | — |
| COST OF SALES | | | | | | |
| Opening Stock | — | — | — | — | — | — |
| Purchases | — | — | — | — | — | — |
| Rent | — | — | — | — | — | — |
| Wages | — | — | — | — | — | — |
| Closing Stock | — | — | — | — | — | — |
| OFFICE EXPENSES | | | | | | |
| Depreciation | 1,000 | 1,000 | 1,000 | 1,000 | 1,000 | 1,000 |
| Insurance & Workcare | — | — | — | — | — | — |
| Leave | — | — | — | — | — | — |
| Light & Power | — | — | — | — | — | — |
| Petty Cash & Sundry | — | — | — | — | — | — |
| Wages | — | — | — | — | — | — |
| Income Tax | — | — | — | — | — | — |
| BALANCE SHEET ENTRIES | | | | | | |
| CURRENT ASSETS | — | — | — | — | — | — |
| Cash at Bank | — | — | — | — | — | — |
| Debtors | — | — | — | — | — | — |
| Provision Doubtful Debts | — | — | — | — | — | — |
| Closing Stock - products | — | — | — | — | — | — |
| NON-CURRENT ASSETS | — | — | — | — | — | — |
| Fixed Asset | | | | | | |
| Depreciation Provision | — | — | — | — | — | — |
| Investments at cost | — | — | — | — | — | — |
| CURRENT LIABILITIES | — | — | — | — | — | — |
| Trade Creditors | — | — | — | — | — | — |
| Provision for Income Tax | — | — | — | — | — | — |
| NON-CURRENT LIABILITIES | — | — | — | — | — | — |
| mortgage | — | — | — | — | — | — |
| SHAREHOLDERS EQUITY | | | | | | |
| Share Capital | — | — | — | — | — | — |
| Profit Current Year after tax | (101,400) | (104,500) | (88,600) | (79,000) | (76,800) | (47,000) |
| Totals — | — | — | — | — | — | |

| PROFIT & LOSS ENTRIES | JAN FORECAST | FEB FORECAST | MAR FORECAST | APR FORECAST | MAY FORECAST | JUN FORECAS |
|---|---|---|---|---|---|---|
| REVENUE | | | | | | |
| Sales | (16,000) | (28,800) | (48,000) | (51,200) | (73,600) | (89,600) |
| Other Income | — | — | — | — | — | — |
| COST OF SALES | | | | | | |
| Opening Stock | — | — | — | — | — | — |
| Purchases | — | — | — | — | — | — |
| Rent | — | — | — | — | — | — |
| Wages | — | — | — | — | — | — |
| Closing Stock | — | — | — | — | — | — |
| OFFICE EXPENSES | | | | | | |
| Depreciation | 1,000 | 1,000 | 1,000 | 1,000 | 1,000 | 1,000 |
| Insurance & Workcare | — | — | — | — | — | — |
| Leave | — | — | — | — | — | — |
| Light & Power | — | — | — | — | — | — |
| Petty Cash & Sundry | — | — | — | — | — | — |
| Wages | — | — | — | — | — | — |
| Income Tax | — | — | — | — | — | — |
| BALANCE SHEET ENTRIES | | | | | | |
| CURRENT ASSETS | — | — | — | — | — | — |
| Cash at Bank | — | — | — | — | — | — |
| Debtors | — | — | — | — | — | — |
| Provision Doubtful Debts | — | — | — | — | — | — |
| Closing Stock - products | — | — | — | — | — | — |
| NON-CURRENT ASSETS | — | — | — | — | — | — |

TABLE 12-continued

| | | | | | | |
|---|---|---|---|---|---|---|
| Fixed Asset | | | | | | |
| Depreciation Provision | — | — | — | — | — | — |
| Investments at cost | — | — | — | — | — | — |
| CURRENT LIABILITIES | — | — | — | — | — | — |
| Trade Creditors | — | — | — | — | — | — |
| Provision for Income Tax | — | — | — | — | — | — |
| NON-CURRENT LIABILITIES | — | — | — | — | — | — |
| mortgage | — | — | — | — | — | — |
| SHAREHOLDERS EQUITY | | | | | | |
| Share Capital | — | — | — | — | — | — |
| Profit Current Year after tax | (16,000) | (27,800) | (47,000) | (60,200) | (72,600) | (88,600) |
| Totals | — | — | — | — | — | — |

TABLE 13

| PROFIT & LOSS ENTRIE | JUN ACTUAL | JUL ACTUAL | AUG ACTUAL | SEP FORECAST | OCT FORECAST | NOV FORECAST | DEC FORECAST |
|---|---|---|---|---|---|---|---|
| REVENUE | | | | | | | |
| Sales | | — | — | — | — | — | — |
| Other Income | | — | — | — | — | — | — |
| COST OF SALES | | | | | | | |
| Opening Stock | | — | — | — | — | — | — |
| Purchases | | — | — | — | — | — | — |
| Rent | | — | — | — | — | — | — |
| Wages | | — | — | — | — | — | — |
| Closing Stock | | — | — | — | — | — | — |
| OFFICE EXPENSES | | | | | | | |
| Depreciation | | — | — | — | — | — | — |
| Insurance & Workcare | | — | — | — | — | — | — |
| Leave | | — | — | — | — | — | — |
| Light & Power | | — | — | — | — | — | — |
| Petty Cash & Sundry | | — | — | — | — | — | — |
| Wages | | — | — | — | — | — | — |
| Income Tax | | — | — | — | — | — | — |
| BALANCE SHEET ENTRIES | | | | | | | |
| CURRENT ASSETS | | — | — | — | — | — | — |
| Cash at Bank | 200,000 | 302,400 | 408,000 | 497,600 | 517,800 | 664,400 | 702,400 |
| Debtors | | — | — | — | — | — | — |
| Provision Doubtful Debts | | — | — | — | — | — | — |
| Closing Stock - products | | — | — | — | — | — | — |
| NON-CURRENT ASSETS | | — | — | — | — | — | — |
| Fixed Asset | 110,000 | 110,000 | 110,000 | 110,000 | 110,000 | 110,000 | 110,000 |
| Depreciation Provision | (10,000) | (11,000) | (12,000) | (13,000) | (14,000) | (15,000) | (16,000) |
| Investments at cost | | — | — | — | — | — | — |
| CURRENT LIABILITIES | | — | — | — | — | — | — |
| Trade Creditors | | — | — | — | — | — | — |
| Provision for Income Tax | | — | — | — | — | — | — |
| NON-CURRENT LIABILITIES | | — | — | — | — | — | — |
| mortgage | | — | — | — | — | — | — |
| SHAREHOLDERS EQUITY | | | | | | | |
| Share Capital | (300,000) | (300,000) | (300,000) | (300,000) | (300,000) | (300,000) | (300,000) |
| Profit Current Year after | — | (101,400) | (206,000) | (294,600) | (373,600) | (449,400) | (496,400) |
| Totals | 0 | 0 | 0 | 0 | 0 | 0 | 0 |

| PROFIT & LOSS ENTRIES | JAN FORECAST | FEB FORECAST | MAR FORECAST | APR FORECAST | MAY FORECAST | JUN FORECAS |
|---|---|---|---|---|---|---|
| REVENUE | | | | | | |
| Sales | — | — | — | — | — | — |
| Other Income | — | — | — | — | — | — |
| COST OF SALES | | | | | | |
| Opening Stock | — | — | — | — | — | — |
| Purchases | — | — | — | — | — | — |
| Rent | — | — | — | — | — | — |
| Wages | — | — | — | — | — | — |
| Closing Stock | — | — | — | — | — | — |

TABLE 13-continued

| | | | | | | |
|---|---|---|---|---|---|---|
| OFFICE EXPENSES | | | | | | |
| Depreciation | — | — | — | — | — | — |
| Insurance & Workcare | — | — | — | — | — | — |
| Light & Power | — | — | — | — | — | — |
| Petty Cash & Sundry | — | — | — | — | — | — |
| Wages | — | — | — | — | — | — |
| Income Tax | — | — | — | — | — | — |
| BALANCE SHEET ENTRIES | | | | | | |
| CURRENT ASSETS | — | — | — | — | — | — |
| Cash at Bank | 718,400 | 747,200 | 796,200 | 896,400 | 920,000 | 1,004,600 |
| Debtors | — | — | — | — | — | — |
| Provision Doubtful Debts | — | — | — | — | — | — |
| Closing Stock - products | — | — | — | — | — | — |
| NON-CURRENT ASSETS | — | — | — | — | — | — |
| Fixed Asset | 110,000 | 110,000 | 110,000 | 110,000 | 110,000 | 110,000 |
| Depreciation Provision | (17,000) | (18,000) | (19,000) | (20,000) | (21,000) | (22,000) |
| Investments at cost | — | — | — | — | — | — |
| CURRENT LIABILITIES | — | — | — | — | — | — |
| Trade Creditors | | — | — | — | — | — |
| Provision for Income Tax | | — | — | — | — | — |
| NON-CURRENT LIABILITIES | — | — | — | — | — | — |
| mortgage | — | — | — | — | — | — |
| SHAREHOLDERS EQUITY | | | | | | |
| Share Capital | (300,000) | (300,000) | (300,000) | (300,000) | (300,000) | (300,000) |
| Profit Current Year after | (511,400) | (539,200) | (586,200) | (236,400) | (709,000) | (797,500) |
| Totals | 0 | 0 | 0 | 0 | 0 | 0 0 0 |

I claim:

1. A forecasting control system comprising: arrays of cells for the entry and processing of data items which may represent budget, historical and forecast data for each of a number of defined reporting periods within a time period; wherein each cell in each array corresponds to a change/growth category or system status category in respect of a particular reporting period; some of the arrays are designated data entry arrays and data concerning different items of growth are entered into different data entry arrays, each cell of a summary of change factors array is arranged to automatically display data which is the sum of the data entered for the respective item of growth and for the respective reporting period on all the data entry arrays; and each cell of a closing array automatically displays data which is the sum of: the data entered for the respective category of asset and the respective reporting period on all the other arrays; plus the value of the respective cell of the closing array in the immediately preceding reporting period.

2. A system according to claim 1 wherein in each array each column represents a reporting period and each row represents a change/growth category such as revenue or expense or a system status category such as assets, liabilities or equity.

3. A system according to claim 2 wherein each column is totalled to zero in a check row to provide a control.

4. A reporting system according to claim 3 wherein a summary array is generated by summing growth items over each reporting period and includes the sum of each column in a net change row.

5. A system according to claim 4 wherein the closing array is generated by summing system status categories over each reporting period and includes the net change row from the summary array.

6. A system according to claim 1 wherein the system is implemented in arrays, whether computerised or not.

7. A system according to claim 6 wherein the closing array shows a year to date system status and also includes a series of opening values a series of year to date values and a series of closing values.

8. A forecasting control method comprising the steps of:

displaying a plurality of data entry arrays containing cells for the entry of data representing growth and asset items for each of a number of defined reporting periods within a time period, wherein each cell in each data entry array corresponds to a particular item of growth or category of assets in respect of a particular reporting period;

entering items which may be budget, historical or forecast concerning different growth and assets data in the cells of different data entry arrays;

displaying a summary of change factors array in which each cell automatically contains the sum of the data entered for the respective items of growth and for the respective reporting period on all the data entry arrays; and displaying a closing array in which each cell automatically contains the sum of: the data entered for the respective category of asset and the respective reporting period on all the other sheets plus the value of the respective cell of the closing array in the immediately preceding reporting period.

9. A method according to claim 8 comprising the further step of arranging arrays so that each column represents a reporting period and each row represents a growth item such as revenue or expense or a category of assets including liabilities or equity.

10. A method according to claim 9 comprising the further step of presenting double entry bookkeeping procedures.

11. A method according to claim 10 comprising the further step of totalling each column in data input arrays to zero in a check row in order to provide a control.

12. A method according to claim 11 comprising the further step of automatically totalling the columns in the summary array in a profit row immediately proceeding the check row to provide a profit figure.

13. A method according to claim 12 comprising the further step of including the profit row in the closing array.

14. A method according to claim 8 comprising the further step of before any operational data or journal entries are made filling the arrays with forecast data and deleting the forecast data and overwriting it with the actual data as hereby are reported.

15. A method of operating a computer spreadsheet application to provide forcasting control comprising the steps of: constructing a plurality of arrays each having the same corresponding elements in which there is identified the same item of growth or category of assets in respect of the same reporting period;

designating one of the arrays as a summary of change factors array and inserting a formula into each growth factor cell to automatically calculate the sum of the entries in the corresponding cell in each of the other arrays;

designating another array as a closing array and inserting a formula into each asset cell to automatically calculate the sum of the entries in the corresponding cell of each of the other arrays plus in the first reporting periods an opening value and in the subsequent reporting periods the value of the respective cell of the closing array in the immediately preceding reporting period.

16. A computer system including a spreadsheet application arranged to provide forecast control comprising a plurality of arrays each having the same corresponding elements in which there is identified the same item of growth or category of assets in respect of the same reporting period;

one of the arrays is a summary of change factors array in which there is a formula in each growth factor cell to automatically calculate the sum of the entries in the corresponding cell in each of the other arrays;

another array is a closing array in which there is a formula in each asset cell to automatically calculate the sum of the entries in the corresponding cell of each of the other arrays plus the value of the respective cell of the closing array in the immediately preceding reporting period.

17. Computer software to control the operation of a computer spreadsheet application to perform the method of claim 15.

* * * * *

UNITED STATES PATENT AND TRADEMARK OFFICE

CERTIFICATE OF CORRECTION

PATENT NO. : 5,960,415

DATED : September 28, 1999
INVENTOR(S) : Geoff Williams

It is certified that error appears in the above-identified patent and that said Letters Patent is hereby corrected as shown below:

Column 2,
Line 28, delete the first occurrence of “may” and insert -- array --.
Line 30, delete “chance” and insert -- change --.

Column 7,
Line 19, after “Table” insert -- 9b --.
Line 26, delete “TABLE 9B” and insert -- TABLE 9b --.

Column 9,
Line 48, after “principle” insert -- as --.

Column 10,
Line 15, delete “A (1ij) =A (n+3ij-2)” and insert -- A (1ij) =A (n+3ij-1) --.
Line 24, after “Application to Annual Reporting” insert a -- : --.
Line 29, after “years” delete “;” and insert a -- : --.

Insert Table 11 between Table 10 and Table 12.
Tables 1-9a and Tables 10-13 should be deleted and substituted therefore with the attached Tables.

Column 30,
Line 2, delete “presenting” and insert -- preserving --.

Column 31,
Line 5, delete “hereby” and insert -- they --.

UNITED STATES PATENT AND TRADEMARK OFFICE

CERTIFICATE OF CORRECTION

PATENT NO. : 5,960,415 
DATED : September 28, 1999
INVENTOR(S) : Geoff Williams

It is certified that error appears in the above-identified patent and that said Letters Patent is hereby corrected as shown below:

Include in the patent ANNEXURE B entitled "SOFTWARE LISTING FOR AN EMBODIMENT OF THE INVENTION", comprising 43 pages including the title page, which was not part of the printed patent. ANNEXURE B does not constitute new matter, since it was included with the original filing of the application.

Signed and Sealed this

Third Day of August, 2004

JON W. DUDAS
*Acting Director of the United States Patent and Trademark Office*

TABLE 1

KNOWN POPULATION AT END OF PERIOD

| | 1986 | 1987 | 1988 | 1989 | 1990 | 1991 |
|---|---|---|---|---|---|---|
| NSW | 5531526 | 5612244 | 5701525 | 5771946 | 5826850 | 5901126 |
| VIC | 4160856 | 4208946 | 4261945 | 4321484 | 4379822 | 4427371 |
| QLD | 2624595 | 2676765 | 2743765 | 2834097 | 2906778 | 2972004 |
| SA | 1382550 | 1394154 | 1408255 | 1424647 | 1439121 | 1456712 |
| WA | 1459019 | 1500507 | 1544806 | 1594745 | 1633825 | 1665945 |
| TAS | 446473 | 447941 | 448457 | 451138 | 456633 | 460465 |
| NT | 154421 | 156674 | 155866 | 156323 | 157277 | 158779 |
| ACT | 258910 | 266088 | 273534 | 278705 | 285077 | 293531 |
| **TOTAL AUSTRALIA** | **16018350** | **16263319** | **16538153** | **16833085** | **17085383** | **17335933** |

Source: Commonwealth Year Book 1992: p150

TABLE 1

KNOWN POPULATION AT END OF PERIOD

| | 1986 | 1987 | 1988 | 1989 | 1990 | 1991 |
|---|---|---|---|---|---|---|
| NSW | 5531526 | 5612244 | 5701525 | 5771946 | 5826850 | 5901126 |
| VIC | 4160856 | 4208946 | 4261945 | 4321484 | 4379822 | 4427371 |
| QLD | 2624595 | 2676705 | 2743705 | 2834097 | 2906778 | 2972004 |
| SA | 1382550 | 1394154 | 1408255 | 1424647 | 1439121 | 1450712 |
| WA | 1459019 | 1500507 | 1544806 | 1594745 | 1633825 | 1665945 |
| TAS | 446473 | 447941 | 448457 | 451138 | 456633 | 460465 |
| NT | 154421 | 156674 | 155866 | 156323 | 157277 | 158779 |
| ACT | 258910 | 266088 | 273534 | 278705 | 285077 | 293531 |
| **TOTAL AUSTRALIA** | **16018350** | **16263319** | **16538153** | **16833085** | **17085383** | **17335933** |

Source: Commonwealth Year Book 1992: p150

Table 2

Population Births during the Year

| | 1986 | 1987 ACTUAL | 1988 ACTUAL | 1989 ACTUAL | 1990 ACTUAL | 1991 ACTUAL | 1992 F'CAST | 1993 F'CAST | 1994 F'CAST | 1995 F'CAST | 1996 F'CAST | 1997 F'CAST |
|---|---|---|---|---|---|---|---|---|---|---|---|---|
| GROWTH ITEM: ( ) is increase/income for country | | | | | | | | | | | | |
| (Births) | | (246,683) | (246,683) | (250,455) | (254,688) | (259,230) | (263,115) | (266,973) | (270,864) | (274,787) | (278,743) | (282,732) |
| (Migration) to Australia | | | | | | | | | | | | |
| Deaths | | | | | | | | | | | | |
| Permanent Departures | | | | | | | | | | | | |
| Net Interstate Migration | | | | | | | | | | | | |
| Statistical Errors | | | | | | | | | | | | |
| ASSET CATEGORY: () is decrease in asset | | | | | | | | | | | | |
| NSW | | 85,186 | 85,127 | 86,344 | 87,331 | 88,408 | 89,564 | 90,877 | 92,202 | 93,537 | 94,884 | 96,242 |
| VIC | | 64,077 | 63,841 | 64,543 | 65,385 | 66,453 | 67,196 | 68,182 | 69,175 | 70,177 | 71,187 | 72,206 |
| QLD | | 40,419 | 40,601 | 41,552 | 42,880 | 44,103 | 45,107 | 45,769 | 46,436 | 47,108 | 47,787 | 48,470 |
| SA | | 21,291 | 21,147 | 21,327 | 21,555 | 21,835 | 22,109 | 22,433 | 22,760 | 23,090 | 23,422 | 23,758 |
| WA | | 22,469 | 22,760 | 23,395 | 24,129 | 24,789 | 25,285 | 25,656 | 26,029 | 26,406 | 26,787 | 27,170 |
| TAS | | 6,876 | 6,794 | 6,791 | 6,826 | 6,928 | 6,989 | 7,091 | 7,195 | 7,299 | 7,404 | 7,510 |
| NT | | 2,378 | 2,376 | 2,360 | 2,365 | 2,386 | 2,410 | 2,445 | 2,481 | 2,517 | 2,553 | 2,590 |
| ACT | | 3,987 | 4,036 | 4,142 | 4,217 | 4,325 | 4,455 | 4,520 | 4,586 | 4,653 | 4,720 | 4,787 |
| CONTROL TOTAL | | (0) | (0) | 0 | (0) | (0) | 0 | 0 | 0 | 0 | 0 | 0 |
| Birth Rate, per thousand based on population end previous year | | 15 | 15 | 15 | 15 | 15 | 15 | 15 | 15 | 15 | 15 | 15 |

Source: Com'th Year Book 1992: p162 mentions crude rate
15.4 per thousand given and apportioned over States Table 3

Migration to Australia during the Year

| | 1986 | 1987 ACTUAL | 1988 ACTUAL | 1989 ACTUAL | 1990 ACTUAL | 1991 ACTUAL | 1992 F'CAST | 1993 F'CAST | 1994 F'CAST | 1995 F'CAST | 1996 F'CAST | 1997 F'CAST |
|---|---|---|---|---|---|---|---|---|---|---|---|---|
| GROWTH ITEM: ( ) is increase/income for country | | | | | | | | | | | | |
| (Births) | | | | | | | | | | | | |
| (Migration) to Australia | | (128,290) | (151,550) | (131,060) | (121,560) | (133,115) | (133,115) | (133,115) | (133,115) | (133,115) | (133,115) | (133,115) |
| Deaths | | | | | | | | | | | | |
| Permanent Departures | | | | | | | | | | | | |
| Net Interstate Migration | | | | | | | | | | | | |
| Statistical Errors | | | | | | | | | | | | |
| ASSET CATEGORY: () is decrease in asset | | | | | | | | | | | | |
| NSW | | 44,302 | 52,298 | 45,183 | 41,682 | 45,398 | 45,312 | 45,312 | 45,312 | 45,312 | 45,312 | 45,312 |
| VIC | | 33,324 | 39,221 | 33,775 | 31,208 | 34,124 | 33,996 | 33,996 | 33,996 | 33,996 | 33,996 | 33,996 |
| QLD | | 21,020 | 24,943 | 21,744 | 20,466 | 22,647 | 22,821 | 22,821 | 22,821 | 22,821 | 22,821 | 22,821 |
| SA | | 11,073 | 12,991 | 11,160 | 10,288 | 11,212 | 11,185 | 11,185 | 11,185 | 11,185 | 11,185 | 11,185 |
| WA | | 11,685 | 13,982 | 12,242 | 11,516 | 12,729 | 12,792 | 12,792 | 12,792 | 12,792 | 12,792 | 12,792 |
| TAS | | 3,576 | 4,174 | 3,554 | 3,258 | 3,558 | 3,536 | 3,536 | 3,536 | 3,536 | 3,536 | 3,536 |
| NT | | 1,237 | 1,460 | 1,235 | 1,129 | 1,225 | 1,219 | 1,219 | 1,219 | 1,219 | 1,219 | 1,219 |
| ACT | | 2,074 | 2,480 | 2,168 | 2,013 | 2,221 | 2,254 | 2,254 | 2,254 | 2,254 | 2,254 | 2,254 |
| CONTROL TOTAL | | (0) | (0) | 0 | (0) | 0 | 0 | 0 | 0 | 0 | 0 | 0 |

Source: Com'th Year Book 1992: p175: Australian totals given and apportioned over States above pro-rata to population at end of previous year
Data for 1991 onwards based on average of 1987–1990, then allocated pro-rata to States Table 4

DEATH Population Deaths during the Year

| | 1986 | 1987 ACTUAL | 1988 ACTUAL | 1989 ACTUAL | 1990 ACTUAL | 1991 ACTUAL | 1992 F'CAST | 1993 F'CAST | 1994 F'CAST | 1995 F'CAST | 1996 F'CAST | 1997 F'CAST |
|---|---|---|---|---|---|---|---|---|---|---|---|---|
| GROWTH ITEM: ( ) is increase/income for country | | | | | | | | | | | | |
| (Births) | | | | | | | | | | | | |
| (Migration) to Australia | | | | | | | | | | | | |
| Deaths | | 112,128 | 112,128 | 113,843 | 115,767 | 117,832 | 119,598 | 121,352 | 123,120 | 124,903 | 126,701 | 128,515 |
| Permanent Departures | | | | | | | | | | | | |
| Net Interstate Migration | | | | | | | | | | | | |
| Statistical Errors | | | | | | | | | | | | |
| ASSET CATEGORY: () is decrease in asset | | | | | | | | | | | | |
| NSW | | (38,721) | (38,694) | (39,247) | (39,696) | (40,186) | (40,711) | (41,308) | (41,910) | (42,517) | (43,129) | (43,746) |
| VIC | | (29,126) | (29,019) | (29,338) | (29,720) | (30,206) | (30,544) | (30,992) | (31,443) | (31,899) | (32,358) | (32,821) |
| QLD | | (18,372) | (18,455) | (18,887) | (19,491) | (20,047) | (20,503) | (20,804) | (21,107) | (21,413) | (21,721) | (22,032) |
| SA | | (9,678) | (9,612) | (9,694) | (9,798) | (9,925) | (10,050) | (10,197) | (10,346) | (10,495) | (10,647) | (10,799) |
| WA | | (10,213) | (10,345) | (10,634) | (10,968) | (11,268) | (11,493) | (11,662) | (11,832) | (12,003) | (12,176) | (12,350) |
| TAS | | (3,125) | (3,088) | (3,087) | (3,103) | (3,149) | (3,177) | (3,223) | (3,270) | (3,318) | (3,365) | (3,414) |
| NT | | (1,081) | (1,080) | (1,073) | (1,075) | (1,085) | (1,095) | (1,111) | (1,128) | (1,144) | (1,160) | (1,177) |
| ACT | | (1,812) | (1,835) | (1,883) | (1,917) | (1,966) | (2,025) | (2,055) | (2,085) | (2,115) | (2,145) | (2,176) |
| CONTROL TOTAL | | 0 | (0) | (0) | (0) | 0 | 0 | (0) | (0) | (0) | (0) | 0 |
| Death Rate, per thousand based on population end previous year | | 7 | 7 | 7 | 7 | 7 | 7 | 7 | 7 | 7 | 7 | 7 |

Source: Com'th Year Book 1992: p162 mentions crude rate
7.0 per thousand given and apportioned over States above Table 5

Population Permanent Departures during the Year

| | 1986 | 1987 ACTUAL | 1988 ACTUAL | 1989 ACTUAL | 1990 ACTUAL | 1991 ACTUAL | 1992 F'CAST | 1993 F'CAST | 1994 F'CAST | 1995 F'CAST | 1996 F'CAST | 1997 F'CAST |
|---|---|---|---|---|---|---|---|---|---|---|---|---|
| GROWTH ITEM: ( ) is increase/income for country | | | | | | | | | | | | |
| (Births) | | | | | | | | | | | | |
| (Migration) to Australia | | | | | | | | | | | | |
| Deaths | | | | | | | | | | | | |
| Permanent Departures | | 20,410 | 20,320 | 24,830 | 30,370 | 23,983 | 23,983 | 23,983 | 23,983 | 23,983 | 23,983 | 23,983 |
| Net Interstate Migration | | | | | | | | | | | | |
| Statistical Errors | | | | | | | | | | | | |
| ASSET CATEGORY: () is decrease in asset | | | | | | | | | | | | |
| NSW | | (7,048) | (7,012) | (8,560) | (10,414) | (8,179) | (8,164) | (8,164) | (8,164) | (8,164) | (8,164) | (8,164) |
| VIC | | (5,302) | (5,259) | (6,399) | (7,797) | (6,148) | (6,125) | (6,125) | (6,125) | (6,125) | (6,125) | (6,125) |
| QLD | | (3,344) | (3,344) | (4,119) | (5,113) | (4,080) | (4,111) | (4,111) | (4,111) | (4,111) | (4,111) | (4,111) |
| SA | | (1,762) | (1,742) | (2,114) | (2,570) | (2,020) | (2,015) | (2,015) | (2,015) | (2,015) | (2,015) | (2,015) |
| WA | | (1,859) | (1,875) | (2,319) | (2,877) | (2,293) | (2,305) | (2,305) | (2,305) | (2,305) | (2,305) | (2,305) |
| TAS | | (569) | (560) | (673) | (814) | (641) | (637) | (637) | (637) | (637) | (637) | (637) |
| NT | | (197) | (196) | (234) | (282) | (221) | (220) | (220) | (220) | (220) | (220) | (220) |
| ACT | | (330) | (332) | (411) | (503) | (400) | (406) | (406) | (406) | (406) | (406) | (406) |
| CONTROL TOTAL | | (0) | 0 | 0 | 0 | (0) | (0) | (0) | (0) | (0) | (0) | (0) |

Source: Com'th Year Book 1992: p162 Australian totals given.
Apportioned over States above pro–rata to population at end of previous year
Data for 1991 onwards based on average of 1987–1990, then allocated pro–rata to States Table 6

Population Interstate Migration during the Year

| | 1986 | 1987 ACTUAL | 1988 ACTUAL | 1989 ACTUAL | 1990 ACTUAL | 1991 ACTUAL | 1992 F'CAST | 1993 F'CAST | 1994 F'CAST | 1995 F'CAST | 1996 F'CAST | 1997 F'CAST |
|---|---|---|---|---|---|---|---|---|---|---|---|---|
| GROWTH ITEM: ( ) is increase/income for country | | | | | | | | | | | | |
| (Births) | | | | | | | | | | | | |
| (Migration) to Australia | | | | | | | | | | | | |
| Deaths | | | | | | | | | | | | |
| Permanent Departures | | | | | | | | | | | | |
| Net Interstate Migration | | (100) | (100) | 0 | (100) | 200 | | | | | | |
| Statistical Errors | | | | | | | | | | | | |
| ASSET CATEGORY: () is decrease in asset | | | | | | | | | | | | |
| NSW | | (10,300) | (14,200) | (39,100) | (37,000) | (18,800) | 0 | 0 | 0 | 0 | 0 | 0 |
| VIC | | (13,400) | (14,800) | (12,900) | (8,200) | (16,200) | 0 | 0 | 0 | 0 | 0 | 0 |
| QLD | | 18,100 | 26,200 | 45,300 | 36,600 | 27,400 | 0 | 0 | 0 | 0 | 0 | 0 |
| SA | | (3,200) | (300) | 800 | 700 | 3,100 | 0 | 0 | 0 | 0 | 0 | 0 |
| WA | | 10,400 | 8,400 | 9,500 | 7,100 | 2,500 | 0 | 0 | 0 | 0 | 0 | 0 |
| TAS | | (2,800) | (3,400) | (1,300) | 1,400 | (200) | 0 | 0 | 0 | 0 | 0 | 0 |
| NT | | (1,400) | (4,600) | (3,000) | (2,600) | (2,200) | 0 | 0 | 0 | 0 | 0 | 0 |
| ACT | | 2,700 | 2,600 | 700 | 2,100 | 4,200 | 0 | 0 | 0 | 0 | 0 | 0 |
| CONTROL TOTAL | | 0 | 0 | 0 | 0 | 0 | 0 | 0 | 0 | 0 | 0 | 0 |

Source: Com'th Year Book 1992: p178 for Aust totals

Table 7

Statistical Errors during the Year

| | 1986 | 1987 ACTUAL | 1988 ACTUAL | 1989 ACTUAL | 1990 ACTUAL | 1991 ACTUAL | 1992 F'CAST | 1993 F'CAST | 1994 F'CAST | 1995 F'CAST | 1996 F'CAST | 1997 F'CAST |
|---|---|---|---|---|---|---|---|---|---|---|---|---|
| GROWTH ITEM: ( ) is increase/income for country | | | | | | | | | | | | |
| (Births) | | | | | | | | | | | | |
| (Migration) to Australia | | | | | | | | | | | | |
| Deaths | | | | | | | | | | | | |
| Permanent Departures | | | | | | | | | | | | |
| Net Interstate Migration | | | | | | | | | | | | |
| Statistical Errors | | (2,435) | (6,950) | (52,090) | (22,088) | (220) | 0 | 0 | 0 | 0 | 0 | 0 |
| ASSET CATEGORY: () is decrease in asset | | | | | | | | | | | | |
| NSW | | 7,300 | 11,763 | 25,801 | 13,001 | 7,634 | | | | | | |
| VIC | | (1,484) | (986) | 9,858 | 7,463 | (474) | | | | | | |
| QLD | | (5,653) | (2,945) | 4,743 | (2,661) | (4,797) | | | | | | |
| SA | | (6,121) | (8,383) | (5,086) | (5,701) | (6,611) | | | | | | |
| WA | | 9,006 | 11,377 | 17,755 | 10,180 | 5,663 | | | | | | |
| TAS | | (2,489) | (3,404) | (2,604) | (2,072) | (2,664) | | | | | | |
| NT | | 1,316 | 1,232 | 1,168 | 1,417 | 1,396 | | | | | | |
| ACT | | 559 | 297 | 454 | 462 | 74 | | | | | | |
| CONTROL TOTAL | | 0 | 0 | 0 | 0 | 0 | 0 | 0 | 0 | 0 | 0 | 0 |

Table 8

Summary of Change Factors

| GROWTH ITEM: ( ) is increase/income for country | 1986 | 1987 ACTUAL | 1988 ACTUAL | 1989 ACTUAL | 1990 ACTUAL | 1991 ACTUAL | 1992 F'CAST | 1993 F'CAST | 1994 F'CAST | 1995 F'CAST | 1996 F'CAST | 1997 F'CAST |
|---|---|---|---|---|---|---|---|---|---|---|---|---|
| (Births) | | (246,683) | (246,683) | (250,455) | (254,688) | (259,230) | (263,115) | (266,973) | (270,864) | (274,787) | (278,743) | (282,732) |
| (Migration) to Australia | | (128,290) | (151,550) | (131,060) | (121,560) | (133,115) | (133,115) | (133,115) | (133,115) | (133,115) | (133,115) | (133,115) |
| | | 0 | 0 | 0 | 0 | 0 | 0 | 0 | 0 | 0 | 0 | 0 |
| Deaths | | 112,128 | 112,128 | 113,843 | 115,767 | 117,832 | 119,598 | 121,352 | 123,120 | 124,903 | 126,701 | 128,515 |
| Permanent Departures | | 20,410 | 20,320 | 24,830 | 30,370 | 23,983 | 23,983 | 23,983 | 23,983 | 23,983 | 23,983 | 23,983 |
| Net Interstate Migration | | (100) | (100) | 0 | (100) | 200 | 0 | 0 | 0 | 0 | 0 | 0 |
| Statistical Errors | | (2,435) | (8,950) | (52,090) | (22,088) | (220) | 0 | 0 | 0 | 0 | 0 | 0 |
| NET CHANGE:() = (PROFIT) | | (244,969) | (274,834) | (294,932) | (252,298) | (250,550) | (252,650) | (254,754) | (256,877) | (259,017) | (261,174) | (263,350) |
| | | | | | | | | | | | | |
| ASSET CATEGORY: () is decrease in asset | | | | | | | | | | | | |
| NSW | | - | - | - | - | - | - | - | - | - | - | - |
| VIC | | - | - | - | - | - | - | - | - | - | - | - |
| QLD | | - | - | - | - | - | - | - | - | - | - | - |
| SA | | - | - | - | - | - | - | - | - | - | - | - |
| WA | | - | - | - | - | - | - | - | - | - | - | - |
| TAS | | - | - | - | - | - | - | - | - | - | - | - |
| NT | | - | - | - | - | - | - | - | - | - | - | - |
| ACT | | - | - | - | - | - | - | - | - | - | - | - |
| | | - | - | - | - | - | - | - | - | - | - | - |
| CONTROL TOTAL | | - | - | - | - | - | - | - | - | - | - | - |

Table 9

Closing Total Population at End of Year

| GROWTH ITEM: ( ) is increase/income for country | 1986 | 1987 ACTUAL | 1988 ACTUAL | 1989 ACTUAL | 1990 ACTUAL | 1991 ACTUAL | 1992 F'CAST | 1993 F'CAST | 1994 F'CAST | 1995 F'CAST | 1996 F'CAST | 1997 F'CAST |
|---|---|---|---|---|---|---|---|---|---|---|---|---|
| (Births) | | – | – | – | – | – | – | – | – | – | – | – |
| (Migration) to Australia | | – | – | – | – | – | – | – | – | – | – | – |
| | | – | – | – | – | – | – | – | – | – | – | – |
| Deaths | | – | – | – | – | – | – | – | – | – | – | – |
| Permanent Departures | | – | – | – | – | – | – | – | – | – | – | – |
| Net Interstate Migration | | – | – | – | – | – | – | – | – | – | – | – |
| Statistical Errors | | – | – | – | – | – | – | – | – | – | – | – |
| NET CHANGE:()=(PF | 0 | (244,969) | (274,834) | (294,932) | (252,298) | (250,550) | (252,650) | (254,754) | (256,877) | (259,017) | (261,174) | (263,350) |
| PREVIOUS INVESTM | (16,018,350) | (16,018,350) | (16,263,319) | (16,538,153) | (16,833,085) | (17,085,383) | (17,335,933) | (17,588,583) | (17,843,337) | (18,100,214) | (18,359,230) | (18,620,404) |
| ASSET CATEGORY: | | | | | | | | | | | | |
| NSW | 5,531,526 | 5,612,244 | 5,701,525 | 5,771,946 | 5,826,850 | 5,901,126 | 5,987,128 | 6,073,846 | 6,161,286 | 6,249,455 | 6,338,358 | 6,428,002 |
| VIC | 4,160,856 | 4,208,946 | 4,261,945 | 4,321,484 | 4,379,822 | 4,427,371 | 4,491,894 | 4,556,955 | 4,622,558 | 4,688,708 | 4,755,408 | 4,822,664 |
| QLD | 2,624,595 | 2,676,765 | 2,743,765 | 2,834,097 | 2,906,778 | 2,972,004 | 3,015,317 | 3,058,991 | 3,103,029 | 3,147,434 | 3,192,209 | 3,237,356 |
| SA | 1,382,550 | 1,394,154 | 1,408,255 | 1,424,647 | 1,439,121 | 1,456,712 | 1,477,942 | 1,499,348 | 1,520,933 | 1,542,698 | 1,564,644 | 1,586,773 |
| WA | 1,459,019 | 1,500,507 | 1,544,806 | 1,594,745 | 1,633,825 | 1,665,945 | 1,690,224 | 1,714,705 | 1,739,391 | 1,764,282 | 1,789,380 | 1,814,687 |
| TAS | 446,473 | 447,941 | 448,457 | 451,138 | 456,633 | 460,465 | 467,176 | 473,942 | 480,765 | 487,645 | 494,582 | 501,577 |
| NT | 154,421 | 156,674 | 155,866 | 156,323 | 157,277 | 158,779 | 161,093 | 163,426 | 165,779 | 168,151 | 170,543 | 172,955 |
| ACT | 258,910 | 266,088 | 273,534 | 278,705 | 285,077 | 293,531 | 297,809 | 302,122 | 306,472 | 310,857 | 315,280 | 319,739 |
| CONTROL TOTAL | 0 | 0 | 0 | 0 | 0 | 0 | 0 | 0 | 0 | 0 | 0 | 0 |

Table 9a

Total population at year end

| 1992 YEARBOOK DATA: | 1986 | 87 ACTUAL | 88 ACTUAL | 89 ACTUAL | 90 ACTUAL | 91 ACTUAL | 92 F'CAST | 93 F'CAST | 94 F'CAST | 95 F'CAST | 96 F'CAST | 97 F'CAST |
|---|---|---|---|---|---|---|---|---|---|---|---|---|
| Total Population year-end | | 16,263,319 | 16,538,153 | 16,833,085 | 17,085,383 | 17,335,933 | 17,588,583 | 17,843,337 | 18,100,214 | 18,359,230 | 18,620,404 | 18,883,755 |
| | | | | | | | ACTUAL | ACTUAL | ACTUAL | F'CAST | F'CAST | F'CAST |
| | | | | | | 1995 YEARBOOK DATA: | 17,489,072 | 17,656,427 | 17,843,268 | 18,041,891 | 18,242,671 | 18,445,627 |
| | | | | | | errors | 99,511 | 186,910 | 256,946 | | | |
| | | | | | | error % | 0.57% | 1.06% | 1.44% | | | |

Table 10

| PROFIT & LOSS ENTRIES | JUL ACTUAL | AUG ACTUAL | SEP FORECAS | OCT FORECAS | NOV FORECAS | DEC FORECAS | JAN FORECAS | FEB FORECAS | MAR FORECAS | APR FORECAS | MAY FORECAS | JUN FORECAST |
|---|---|---|---|---|---|---|---|---|---|---|---|---|
| **REVENUE** | | | | | | | | | | | | |
| Sales | (102,400) | (105,600) | (89,600) | (80,000) | (76,800) | (48,000) | (16,000) | (28,800) | (48,000) | (51,200) | (73,600) | (89,600) |
| Other income | - | - | - | - | - | - | - | - | - | - | - | - |
| **COST OF SALES** | | | | | | | | | | | | |
| Opening Stock | - | - | - | - | - | - | - | - | - | - | - | - |
| Purchases | - | - | - | - | - | - | - | - | - | - | - | - |
| Rent | - | - | - | - | - | - | - | - | - | - | - | - |
| Wages | - | - | - | - | - | - | - | - | - | - | - | - |
| Closing Stock | - | - | - | - | - | - | - | - | - | - | - | - |
| **OFFICE EXPENSES** | | | | | | | | | | | | |
| Depreciation | - | - | - | - | - | - | - | - | - | - | - | - |
| Insurance & Workcare | - | - | - | - | - | - | - | - | - | - | - | - |
| Leave | - | - | - | - | - | - | - | - | - | - | - | - |
| Light & Power | - | - | - | - | - | - | - | - | - | - | - | - |
| Petty Cash & Sundry | - | - | - | - | - | - | - | - | - | - | - | - |
| Wages | - | - | - | - | - | - | - | - | - | - | - | - |
| Income Tax | - | - | - | - | - | - | - | - | - | - | - | - |
| **BALANCE SHEET ENTRIES** | | | | | | | | | | | | |
| **CURRENT ASSETS** | - | - | - | - | - | - | - | - | - | - | - | - |
| Cash at Bank | 102,400 | 105,600 | 89,600 | 80,000 | 76,800 | 48,000 | 16,000 | 28,800 | 48,000 | 51,200 | 73,600 | 89,600 |
| Debtors | - | - | - | - | - | - | - | - | - | - | - | - |
| Provision Doubtful Debts | - | - | - | - | - | - | - | - | - | - | - | - |
| Closing Stock - products | - | - | - | - | - | - | - | - | - | - | - | - |
| **NON-CURRENT ASSETS** | - | - | - | - | - | - | - | - | - | - | - | - |
| Depreciation Provision | - | - | - | - | - | - | - | - | - | - | - | - |
| Investments at cost | - | - | - | - | - | - | - | - | - | - | - | - |
| **CURRENT LIABILITIES** | - | - | - | - | - | - | - | - | - | - | - | - |
| Trade Creditors | - | - | - | - | - | - | - | - | - | - | - | - |
| Provision for Income Tax | - | - | - | - | - | - | - | - | - | - | - | - |
| **NON-CURRENT LIABILITIES** | - | - | - | - | - | - | - | - | - | - | - | - |
| mortgage | - | - | - | - | - | - | - | - | - | - | - | - |
| **SHAREHOLDERS EQUITY** | | | | | | | | | | | | |
| Share Capital | - | - | - | - | - | - | - | - | - | - | - | - |
| Profit Current Year after tax | 0 | 0 | 0 | 0 | 0 | 0 | 0 | 0 | 0 | 0 | 0 | 0 |
| **Totals** | - | - | - | - | - | - | - | - | - | - | - | - |

Table 11

| PROFIT & LOSS ENTRIES | | JUL ACTUAL | AUG ACTUAL | SEP FORECAST | OCT FORECAST | NOV FORECAST | DEC FORECAST | JAN FORECAST | FEB FORECAST | MAR FORECAST | APR ORECAS | MAY FORECAST | JUN FORECAST | | |
|---|---|---|---|---|---|---|---|---|---|---|---|---|---|---|---|
| REVENUE | | | | | | | | | | | | | | | |
| Sales | | - | - | - | - | - | - | - | - | - | - | - | - | | |
| Other income | | - | - | - | - | - | - | - | - | - | - | - | - | | |
| COST OF SALES | | | | | | | | | | | | | | | |
| Opening Stock | | - | - | - | - | - | - | - | - | - | - | - | - | | |
| Purchases | | - | - | - | - | - | - | - | - | - | - | - | - | | |
| Rent | | - | - | - | - | - | - | - | - | - | - | - | - | | |
| Wages | | - | - | - | - | - | - | - | - | - | - | - | - | | |
| Closing Stock | | - | - | - | - | - | - | - | - | - | - | - | - | | |
| OFFICE EXPENSES | | | | | | | | | | | | | | | |
| Depreciation | | 1,000 | 1,000 | 1,000 | 1,000 | 1,000 | 1,000 | 1,000 | 1,000 | 1,000 | 1,000 | 1,000 | 1,000 | | |
| Insurance & Workcare | | - | - | - | - | - | - | - | - | - | - | - | - | | |
| Leave | | - | - | - | - | - | - | - | - | - | - | - | - | | |
| Light & Power | | - | - | - | - | - | - | - | - | - | - | - | - | | |
| Petty Cash & Sundry | | - | - | - | - | - | - | - | - | - | - | - | - | | |
| Wages | | - | - | - | - | - | - | - | - | - | - | - | - | | |
| Income Tax | | - | - | - | - | - | - | - | - | - | - | - | - | | |
| BALANCE SHEET ENTRIES | | | | | | | | | | | | | | | |
| CURRENT ASSETS | | - | - | - | - | - | - | - | - | - | - | - | - | | |
| Cash at Bank | | - | - | - | - | - | - | - | - | - | - | - | - | | |
| Debtors | | - | - | - | - | - | - | - | - | - | - | - | - | | |
| Provision Doubtful Debts | | - | - | - | - | - | - | - | - | - | - | - | - | | |
| Closing Stock - products | | - | - | - | - | - | - | - | - | - | - | - | - | | |
| NON-CURRENT ASSETS | | - | - | - | - | - | - | - | - | - | - | - | - | | |
| Fixed Asset | | | | | | | | | | | | | | | |
| Depreciation Provision | | (1,000) | (1,000) | (1,000) | (1,000) | (1,000) | (1,000) | (1,000) | (1,000) | (1,000) | (1,000) | (1,000) | (1,000) | | |
| Investments at cost | | - | - | - | - | - | - | - | - | - | - | - | - | | |
| CURRENT LIABILITIES | | - | - | - | - | - | - | - | - | - | - | - | - | | |
| Trade Creditors | | - | - | - | - | - | - | - | - | - | - | - | - | | |
| Provision for Income Tax | | - | - | - | - | - | - | - | - | - | - | - | - | | |
| NON-CURRENT LIABILITIES | | - | - | - | - | - | - | - | - | - | - | - | - | | |
| mortgage | | - | - | - | - | - | - | - | - | - | - | - | - | | |
| SHAREHOLDERS EQUITY | | | | | | | | | | | | | | | |
| Share Capital | | - | - | - | - | - | - | - | - | - | - | - | - | | |
| Profit Current Year after tax | | - | - | - | - | - | - | - | - | - | - | - | - | | |
| Totals | 0 | 0 | 0 | 0 | 0 | 0 | 0 | 0 | 0 | 0 | 0 | 0 | 0 | 0 | 0 |

Table 12

| PROFIT & LOSS ENTRIES | JUL ACTUAL | AUG ACTUAL | SEP FORECAST | OCT FORECAST | NOV FORECAST | DEC FORECAST | JAN FORECAST | FEB FORECAST | MAR FORECAST | APR FORECAST | MAY FORECAST | JUN FORECAST |
|---|---|---|---|---|---|---|---|---|---|---|---|---|
| REVENUE | | | | | | | | | | | | |
| Sales | (102,400) | (105,600) | (89,600) | (80,000) | (76,800) | (48,000) | (16,000) | (28,800) | (48,000) | (51,200) | (73,600) | (89,600) |
| Other income | - | - | - | - | - | - | - | - | - | - | - | - |
| COST OF SALES | | | | | | | | | | | | |
| Opening Stock | - | - | - | - | - | - | - | - | - | - | - | - |
| Purchases | - | - | - | - | - | - | - | - | - | - | - | - |
| Rent | - | - | - | - | - | - | - | - | - | - | - | - |
| Wages | - | - | - | - | - | - | - | - | - | - | - | - |
| Closing Stock | - | - | - | - | - | - | - | - | - | - | - | - |
| OFFICE EXPENSES | | | | | | | | | | | | |
| Depreciation | 1,000 | 1,000 | 1,000 | 1,000 | 1,000 | 1,000 | 1,000 | 1,000 | 1,000 | 1,000 | 1,000 | 1,000 |
| Insurance & Workcare | - | - | - | - | - | - | - | - | - | - | - | - |
| Leave | - | - | - | - | - | - | - | - | - | - | - | - |
| Light & Power | - | - | - | - | - | - | - | - | - | - | - | - |
| Petty Cash & Sundry | - | - | - | - | - | - | - | - | - | - | - | - |
| Wages | - | - | - | - | - | - | - | - | - | - | - | - |
| Income Tax | - | - | - | - | - | - | - | - | - | - | - | - |
| ------------------- | | | | | | | | | | | | |
| BALANCE SHEET ENTRIES | | | | | | | | | | | | |
| CURRENT ASSETS | - | - | - | - | - | - | - | - | - | - | - | - |
| Cash at Bank | - | - | - | - | - | - | - | - | - | - | - | - |
| Debtors | - | - | - | - | - | - | - | - | - | - | - | - |
| Provision Doubtful Debts | - | - | - | - | - | - | - | - | - | - | - | - |
| Closing Stock - products | - | - | - | - | - | - | - | - | - | - | - | - |
| NON-CURRENT ASSETS | - | - | - | - | - | - | - | - | - | - | - | - |
| Fixed Asset | | | | | | | | | | | | |
| Depreciation Provision | - | - | - | - | - | - | - | - | - | - | - | - |
| Investments at cost | - | - | - | - | - | - | - | - | - | - | - | - |
| CURRENT LIABILITIES | - | - | - | - | - | - | - | - | - | - | - | - |
| Trade Creditors | - | - | - | - | - | - | - | - | - | - | - | - |
| Provision for Income Tax | - | - | - | - | - | - | - | - | - | - | - | - |
| NON-CURRENT LIABILITIES | - | - | - | - | - | - | - | - | - | - | - | - |
| mortgage | - | - | - | - | - | - | - | - | - | - | - | - |
| SHAREHOLDERS EQUITY | | | | | | | | | | | | |
| Share Capital | - | - | - | - | - | - | - | - | - | - | - | - |
| Profit Current Year after tax | (101,400) | (104,600) | (88,600) | (79,000) | (75,800) | (47,000) | (15,000) | (27,800) | (47,000) | (50,200) | (72,600) | (88,600) |
| Totals | - | - | - | - | - | - | - | - | - | - | - | - |

Table 13

| PROFIT & LOSS ENTRIE | JUN ACTUAL | JUL ACTUAL | AUG ACTUAL | SEP FORECAST | OCT FORECAST | NOV FORECAST | DEC FORECAST | JAN FORECAST | FEB FORECAST | MAR FORECAST | APR FORECAST | MAY FORECAST | JUN FORECAST |
|---|---|---|---|---|---|---|---|---|---|---|---|---|---|
| **REVENUE** | | | | | | | | | | | | | |
| Sales | | . | . | . | . | . | . | . | . | . | . | . | . |
| Other income | | . | . | . | . | . | . | . | . | . | . | . | . |
| **COST OF SALES** | | | | | | | | | | | | | |
| Opening Stock | | . | . | . | . | . | . | . | . | . | . | . | . |
| Purchases | | . | . | . | . | . | . | . | . | . | . | . | . |
| Rent | | . | . | . | . | . | . | . | . | . | . | . | . |
| Wages | | . | . | . | . | . | . | . | . | . | . | . | . |
| Closing Stock | | . | . | . | . | . | . | . | . | . | . | . | . |
| **OFFICE EXPENSES** | | | | | | | | | | | | | |
| Depreciation | | . | . | . | . | . | . | | . | . | . | . | . |
| Insurance & Workcare | | . | . | . | . | . | . | | . | . | . | . | . |
| Leave | | . | . | . | . | . | . | | . | . | . | . | . |
| Light & Power | | . | . | . | . | . | . | . | . | . | . | . | . |
| Petty Cash & Sundry | | . | . | . | . | . | . | . | . | . | . | . | . |
| Wages | | . | . | . | . | . | . | | . | . | . | . | . |
| Income Tax | | . | . | . | . | . | . | | . | . | . | . | . |
| ------------------ | | | | | | | | | | | | | |
| **BALANCE SHEET ENTRIES** | | | | | | | | | | | | | |
| **CURRENT ASSETS** | | | | | | | | | | | | | |
| Cash at Bank | 200,000 | 302,400 | 408,000 | 497,600 | 517,800 | 654,400 | 702,400 | 718,400 | 747,200 | 795,200 | 896,400 | 920,000 | 1,004,600 |
| Debtors | | . | . | . | . | . | . | | . | . | . | . | . |
| Provision Doubtful Debts | | . | . | . | . | . | . | | . | . | . | . | . |
| Closing Stock - products | | . | . | . | . | . | . | | . | . | . | . | . |
| **NON-CURRENT ASSETS** | | | | | | | | | | | | | |
| Fixed Asset | 110,000 | 110,000 | 110,000 | 110,000 | 110,000 | 110,000 | 110,000 | 110,000 | 110,000 | 110,000 | 110,000 | 110,000 | 110,000 |
| Depreciation Provision | (10,000) | (11,000) | (12,000) | (13,000) | (14,000) | (15,000) | (16,000) | (17,000) | (18,000) | (19,000) | (20,000) | (21,000) | (22,000) |
| Investments at cost | | . | . | . | . | . | . | | . | . | . | . | . |
| **CURRENT LIABILITIES** | | | | | | | | | | | | | |
| Trade Creditors | | . | . | . | . | . | . | . | . | . | . | . | . |
| Provision for Income Tax | | . | . | . | . | . | . | | . | . | . | . | . |
| **NON-CURRENT LIABILITIES** | | | | | | | | | | | | | |
| mortgage | | . | . | . | . | . | . | . | . | . | . | . | . |
| **SHAREHOLDERS EQUITY** | | | | | | | | | | | | | |
| Share Capital | (300,000) | (300,000) | (300,000) | (300,000) | (300,000) | (300,000) | (300,000) | (300,000) | (300,000) | (300,000) | (300,000) | (300,000) | (300,000) |
| Profit Current Year after | . | (101,400) | (206,000) | (294,600) | (373,600) | (449,400) | (496,400) | (511,400) | (539,200) | (586,200) | (236,400) | (709,000) | (797,600) |
| Totals | 0 | 0 | 0 | 0 | 0 | 0 | 0 | 0 | 0 | 0 | 0 | 0 | 0 0 0 |

ANNEXURE B

SOFTWARE LISTING FOR AN EMBODIMENT OF THE INVENTION

```
X

Y REPORTING MODEL
OW
 ACCOUNTING AND FORECASTING (MAP)
a
1
UPPLIER:

5
P(+B4,I5..J10,1)
FTWARE PTY LTD
' TABLE:

  1996/7
2,   53 Queen St

{

ABC PTY LTD
elbourne VIC 3000

ST
LIA

EMBER
hone
9629 7448

MBER
mile
9629 7464

EMBER
T:

CEMBER
1

HLY REPORTING MODEL
@NOW
MOE BASED SYSTEM WITH BUDGETS
EB} '(c) GLW SOFTWARE PTY LTD 1995,1996

1} 'OPERATIONAL DATA
1} '      JUL
1} '      AUG
1} '      SEP
1} '      OCT
1} '      NOV
1} '      DEC
1} '      JAN
1} '      FEB
1} '      MAR
1} '      APR
```

```
A:N18: {Bold} '      MAY
A:O18: {Bold} '      JUN
A:A19: {Bold} 'CHANGE FACTORS
A:D19: {Bold} @IF(D17>$B$4,"FORECAST","   ACTUAL")
A:E19: {Bold} @IF(E17>$B$4,"FORECAST","   ACTUAL")
A:F19: {Bold} @IF(F17>$B$4,"FORECAST","   ACTUAL")
A:G19: {Bold} @IF(G17>$B$4,"FORECAST","   ACTUAL")
A:H19: {Bold} @IF(H17>$B$4,"FORECAST","   ACTUAL")
A:I19: {Bold} @IF(I17>$B$4,"FORECAST","   ACTUAL")
A:J19: {Bold} @IF(J17>$B$4,"FORECAST","   ACTUAL")
A:K19: {Bold} @IF(K17>$B$4,"FORECAST","   ACTUAL")
A:L19: {Bold} @IF(L17>$B$4,"FORECAST","   ACTUAL")
A:M19: {Bold} @IF(M17>$B$4,"FORECAST","   ACTUAL")
A:N19: {Bold} @IF(N17>$B$4,"FORECAST","   ACTUAL")
A:O19: {Bold} @IF(O17>$B$4,"FORECAST","   ACTUAL")
A:A21: 'Units Despatched
A:D21: 310
A:E21: 320
A:F21: 330
A:G21: 330
A:H21: 340
A:I21: 350
A:J21: 360
A:K21: 370
A:L21: 370
A:M21: 370
A:N21: 370
A:O21: 370
A:A23: 'Units Received
A:A25: '-------------
A:A26: {Bold} 'STATUS FACTORS
A:A28: 'Stocks of Units Held
A:D28: -D21
A:E28: -E21
A:F28: -F21
A:G28: -G21
A:H28: -H21
A:I28: -I21
A:J28: -J21
A:K28: -K21
A:L28: -L21
A:M28: -M21
A:N28: -N21
A:O28: -O21
A:A31: 'Totals
A:D31: {B} (,0) @SUM(D20..D30)
A:E31: {B} (,0) @SUM(E20..E30)
A:F31: {B} (,0) @SUM(F20..F30)
A:G31: {B} (,0) @SUM(G20..G30)
A:H31: {B} (,0) @SUM(H20..H30)
A:I31: {B} (,0) @SUM(I20..I30)
A:J31: {B} (,0) @SUM(J20..J30)
A:K31: {B} (,0) @SUM(K20..K30)
A:L31: {B} (,0) @SUM(L20..L30)
A:M31: {B} (,0) @SUM(M20..M30)
A:N31: {B} (,0) @SUM(N20..N30)
A:O31: {B} (,0) @SUM(O20..O30)
A:A38: +$A:A1
A:B38: 'SALE
A:C38: 'MONTHLY REPORTING MODEL
A:F38: 'GLW SOFTWARE PTY LTD
A:A39: (D4) @NOW
A:C39: 'MATRIX ACCOUNTING AND FORECASTING   Version 1.1
A:A40: {DUTCH8} '(c) GLW SOFTWARE PTY LTD 1995,1996
A:A42: {Bold} 'FINANCIAL DATA
A:D42: 1
A:E42: 2
```

```
'PROFIT & LOSS
'      JUL
'      AUG
'      SEP
'      OCT
'      NOV
'      DEC
'      JAN
'      FEB
'      MAR
'      APR
'      MAY
'      JUN
'ACCOUNT
@IF(D42>$B$4,"FORECAST","   ACTUAL")
@IF(E42>$B$4,"FORECAST","   ACTUAL")
@IF(F42>$B$4,"FORECAST","   ACTUAL")
@IF(G42>$B$4,"FORECAST","   ACTUAL")
@IF(H42>$B$4,"FORECAST","   ACTUAL")
@IF(I42>$B$4,"FORECAST","   ACTUAL")
@IF(J42>$B$4,"FORECAST","   ACTUAL")
@IF(K42>$B$4,"FORECAST","   ACTUAL")
@IF(L42>$B$4,"FORECAST","   ACTUAL")
@IF(M42>$B$4,"FORECAST","   ACTUAL")
@IF(N42>$B$4,"FORECAST","   ACTUAL")
@IF(O42>$B$4,"FORECAST","   ACTUAL")
'REVENUE
s
.00
100
100
100
100
100
100
100
100
100
100
100
r income

8
8
8
8
8
8
8
}) 'COST OF SALES
chases
}) 'ADMINISTRATION EXPENSES
ertising
```

```
A:A55: 'Depreciation
A:A56: 'Wages
A:A59: '-------------------
A:A60: {Bold} 'BALANCE SHEET ENTRIES
A:A61: {Bold} 'CURRENT ASSETS
A:A62: 'Trade Debtors
A:D62: -D47
A:E62: -E47
A:F62: -F47
A:G62: -G47
A:H62: -H47
A:I62: -I47
A:J62: -J47
A:K62: -K47
A:L62: -L47
A:M62: -M47
A:N62: -N47
A:O62: -O47
A:A63: 'Cash at Bank
A:D63: -D48
A:E63: -E48
A:F63: -F48
A:G63: -G48
A:H63: -H48
A:I63: -I48
A:J63: -J48
A:K63: -K48
A:L63: -L48
A:M63: -M48
A:N63: -N48
A:O63: -O48
A:A65: {Bold} 'NON-CURRENT ASSETS
A:A66: 'Fixed Assets at Cost
A:A67: 'Depreciation Provision
A:A69: {Bold} 'CURRENT LIABILITIES
A:A70: 'Trade Creditors
A:A72: {Bold} 'SHAREHOLDERS EQUITY
A:A73: 'Share Capital
A:A74: 'Reserves
A:A75: 'Retained Earnings
A:A76: 'Profit Current Year after Tax
A:A78: 'Totals
A:D78: @SUM(D47..D76)
A:E78: @SUM(E47..E76)
A:F78: @SUM(F47..F76)
A:G78: @SUM(G47..G76)
A:H78: @SUM(H47..H76)
A:I78: @SUM(I47..I76)
A:J78: @SUM(J47..J76)
A:K78: @SUM(K47..K76)
A:L78: @SUM(L47..L76)
A:M78: @SUM(M47..M76)
A:N78: @SUM(N47..N76)
A:O78: @SUM(O47..O76)
```

```
' REPORTING MODEL
:A2
ACCOUNTING AND FORECASTING (MAP)
'
:$D$3
UPPLIER:

-$A:$B$4
'
TWARE PTY LTD

$A:$B$5
,   53 Queen St

$A:$B$6
lbourne VIC 3000
IA
one
529 7448
ile
529 7464
:


LY REPORTING MODEL
NOW
UR BASED SYSTEM WITH BUDGETS
8} '(c) GLW SOFTWARE PTY LTD 1995,1996
@IF($A:A17>"",+$A:A17,"")


@IF($A:A18>"",+$A:A18,"")
'      JUL
'      AUG
'      SEP
'      OCT
'      NOV
'      DEC
'      JAN
'      FEB
'      MAR
'      APR
'      MAY
'      JUN
@IF($A:A19>"",+$A:A19,"")
@IF(D17>$A:$B$4,"FORECAST","   ACTUAL")
@IF(E17>$A:$B$4,"FORECAST","   ACTUAL")
@IF(F17>$A:$B$4,"FORECAST","   ACTUAL")
@IF(G17>$A:$B$4,"FORECAST","   ACTUAL")
@IF(H17>$A:$B$4,"FORECAST","   ACTUAL")
@IF(I17>$A:$B$4,"FORECAST","   ACTUAL")
@IF(J17>$A:$B$4,"FORECAST","   ACTUAL")
@IF(K17>$A:$B$4,"FORECAST","   ACTUAL")
@IF(L17>$A:$B$4,"FORECAST","   ACTUAL")
@IF(M17>$A:$B$4,"FORECAST","   ACTUAL")
```

```
B:N19: {Bold} @IF(N17>$A:$B$4,"FORECAST","   ACTUAL")
B:O19: {Bold} @IF(O17>$A:$B$4,"FORECAST","   ACTUAL")
B:A20: @IF($A:A20>"",+$A:A20,"")
B:A21: @IF($A:A21>"",+$A:A21,"")
B:A22: @IF($A:A22>"",+$A:A22,"")
B:A23: @IF($A:A23>"",+$A:A23,"")
B:D23: -310
B:E23: -320
B:F23: -330
B:G23: -330
B:H23: -340
B:I23: -350
B:J23: -360
B:K23: -370
B:L23: -370
B:M23: -370
B:N23: -370
B:O23: -370
B:A24: @IF($A:A24>"",+$A:A24,"")
B:A25: @IF($A:A25>"",+$A:A25,"")
B:A26: {Bold} @IF($A:A26>"",+$A:A26,"")
B:A27: {Bold} @IF($A:A27>"",+$A:A27,"")
B:A28: @IF($A:A28>"",+$A:A28,"")
B:D28: -D23
B:E28: -E23
B:F28: -F23
B:G28: -G23
B:H28: -H23
B:I28: -I23
B:J28: -J23
B:K28: -K23
B:L28: -L23
B:M28: -M23
B:N28: -N23
B:O28: -O23
B:A29: @IF($A:A29>"",+$A:A29,"")
B:A30: @IF($A:A30>"",+$A:A30,"")
B:A31: @IF($A:A31>"",+$A:A31,"")
B:D31: {B} (,0) @SUM(D20..D30)
B:E31: {B} (,0) @SUM(E20..E30)
B:F31: {B} (,0) @SUM(F20..F30)
B:G31: {B} (,0) @SUM(G20..G30)
B:H31: {B} (,0) @SUM(H20..H30)
B:I31: {B} (,0) @SUM(I20..I30)
B:J31: {B} (,0) @SUM(J20..J30)
B:K31: {B} (,0) @SUM(K20..K30)
B:L31: {B} (,0) @SUM(L20..L30)
B:M31: {B} (,0) @SUM(M20..M30)
B:N31: {B} (,0) @SUM(N20..N30)
B:O31: {B} (,0) @SUM(O20..O30)
B:A32: {Bold} @IF($A:A32>"",+$A:A32,"")
B:A33: {Bold} @IF($A:A33>"",+$A:A33,"")
B:A34: {Bold} @IF($A:A34>"",+$A:A34,"")
B:A35: {Bold} @IF($A:A35>"",+$A:A35,"")
B:A36: {Bold} @IF($A:A36>"",+$A:A36,"")
B:A38: +$A:A1
B:B38: 'FOR
B:C38: 'MONTHLY REPORTING MODEL
B:F38: 'GLW SOFTWARE PTY LTD
B:A39: (D4) @NOW
B:C39: 'MATRIX ACCOUNTING AND FORECASTING  Version 1.1
B:A40: {DUTCH8} '(c) GLW SOFTWARE PTY LTD 1995,1996
B:A42: {Bold} @IF($A:A42>"",+$A:A42,"")
B:D42: 1
B:E42: 2
B:F42: 3
B:G42: 4
```

```
@IF($A:A43>"",+$A:A43,"")
'      JUL
'      AUG
'      SEP
'      OCT
'      NOV
'      DEC
'      JAN
'      FEB
'      MAR
'      APR
'      MAY
'      JUN
@IF($A:A44>"",+$A:A44,"")
@IF($A:B44>"",+$A:B44,"")
@IF(D42>$A:$B$4,"FORECAST","   ACTUAL")
@IF(E42>$A:$B$4,"FORECAST","   ACTUAL")
@IF(F42>$A:$B$4,"FORECAST","   ACTUAL")
@IF(G42>$A:$B$4,"FORECAST","   ACTUAL")
@IF(H42>$A:$B$4,"FORECAST","   ACTUAL")
@IF(I42>$A:$B$4,"FORECAST","   ACTUAL")
@IF(J42>$A:$B$4,"FORECAST","   ACTUAL")
@IF(K42>$A:$B$4,"FORECAST","   ACTUAL")
@IF(L42>$A:$B$4,"FORECAST","   ACTUAL")
@IF(M42>$A:$B$4,"FORECAST","   ACTUAL")
@IF(N42>$A:$B$4,"FORECAST","   ACTUAL")
@IF(O42>$A:$B$4,"FORECAST","   ACTUAL")
@IF($A:A45>"",+$A:A45,"")
@IF($A:B45>"",+$A:B45,"")
@IF($A:A46>"",+$A:A46,"")
A:A47>"",+$A:A47,"")
@IF($A:C47>"",+$A:C47,"")
A:A48>"",+$A:A48,"")
@IF($A:C48>"",+$A:C48,"")
A:A49>"",+$A:A49,"")
@IF($A:A50>"",+$A:A50,"")
A:A51>"",+$A:A51,"")
@IF($A:C51>"",+$A:C51,"")
40
40
40
40
40
40
40
40
40
40
40
40
A:A52>"",+$A:A52,"")
@IF($A:C52>"",+$A:C52,"")
@IF($A:A53>"",+$A:A53,"")
@IF($A:C53>"",+$A:C53,"")
A:A54>"",+$A:A54,"")
@IF($A:C54>"",+$A:C54,"")
A:A55>"",+$A:A55,"")
@IF($A:C55>"",+$A:C55,"")
A:A56>"",+$A:A56,"")
```

```
B:C56: (F0) @IF($A:C56>"",+$A:C56,"")
B:A57: @IF($A:A57>"",+$A:A57,"")
B:C57: (F0) @IF($A:C57>"",+$A:C57,"")
B:A58: @IF($A:A58>"",+$A:A58,"")
B:C58: (F0) @IF($A:C58>"",+$A:C58,"")
B:A59: @IF($A:A59>"",+$A:A59,"")
B:C59: (F0) @IF($A:C59>"",+$A:C59,"")
B:A60: {Bold} @IF($A:A60>"",+$A:A60,"")
B:C60: (F0) @IF($A:C60>"",+$A:C60,"")
B:A61: {Bold} @IF($A:A61>"",+$A:A61,"")
B:C61: (F0) @IF($A:C61>"",+$A:C61,"")
B:A62: @IF($A:A62>"",+$A:A62,"")
B:C62: (,0) @IF($A:C62>"",+$A:C62,"")
B:A63: @IF($A:A63>"",+$A:A63,"")
B:C63: (,0) @IF($A:C63>"",+$A:C63,"")
B:A64: @IF($A:A64>"",+$A:A64,"")
B:C64: (,0) @IF($A:C64>"",+$A:C64,"")
B:A65: {Bold} @IF($A:A65>"",+$A:A65,"")
B:C65: (,0) @IF($A:C65>"",+$A:C65,"")
B:A66: @IF($A:A66>"",+$A:A66,"")
B:C66: (,0) @IF($A:C66>"",+$A:C66,"")
B:A67: @IF($A:A67>"",+$A:A67,"")
B:C67: (,0) @IF($A:C67>"",+$A:C67,"")
B:A68: @IF($A:A68>"",+$A:A68,"")
B:C68: (,0) @IF($A:C68>"",+$A:C68,"")
B:A69: {Bold} @IF($A:A69>"",+$A:A69,"")
B:C69: (,0) @IF($A:C69>"",+$A:C69,"")
B:A70: @IF($A:A70>"",+$A:A70,"")
B:C70: (,0) @IF($A:C70>"",+$A:C70,"")
B:D70: -D51
B:E70: -E51
B:F70: -F51
B:G70: -G51
B:H70: -H51
B:I70: -I51
B:J70: -J51
B:K70: -K51
B:L70: -L51
B:M70: -M51
B:N70: -N51
B:O70: -O51
B:A71: @IF($A:A71>"",+$A:A71,"")
B:C71: (,0) @IF($A:C71>"",+$A:C71,"")
B:A72: {Bold} @IF($A:A72>"",+$A:A72,"")
B:C72: (,0) @IF($A:C72>"",+$A:C72,"")
B:A73: @IF($A:A73>"",+$A:A73,"")
B:C73: (,0) @IF($A:C73>"",+$A:C73,"")
B:A74: @IF($A:A74>"",+$A:A74,"")
B:C74: (,0) @IF($A:C74>"",+$A:C74,"")
B:A75: @IF($A:A75>"",+$A:A75,"")
B:C75: (,0) @IF($A:C75>"",+$A:C75,"")
B:A76: @IF($A:A76>"",+$A:A76,"")
B:C76: (,0) @IF($A:C76>"",+$A:C76,"")
B:A77: @IF($A:A77>"",+$A:A77,"")
B:C77: (,0) @IF($A:C77>"",+$A:C77,"")
B:A78: @IF($A:A78>"",+$A:A78,"")
B:C78: {B} @IF($A:C78>"",+$A:C78,"")
B:D78: @SUM(D47..D76)
B:E78: @SUM(E47..E76)
B:F78: @SUM(F47..F76)
B:G78: @SUM(G47..G76)
B:H78: @SUM(H47..H76)
B:I78: @SUM(I47..I76)
B:J78: @SUM(J47..J76)
B:K78: @SUM(K47..K76)
B:L78: @SUM(L47..L76)
B:M78: @SUM(M47..M76)
```

```
47..N76)
47..O76)
```

```
C:A1: +$A:A1
C:C1: 'MONTHLY REPORTING MODEL
C:A2: {D4} +$A:A2
C:C2: 'MATRIX ACCOUNTING AND FORECASTING (MAF)
C:C3: 'Version
C:D3: {F2} +$A:$D$3
C:B3: '      SUPPLIER:
C:A4: +$A:A4
C:B4: {LRTB} +$A:$B$4
C:C4: +$A:$C$4
C:E4: 'GLW SOFTWARE PTY LTD
C:A5: +$A:A5
C:B5: {LRB} +$A:$B$5
C:E5: 'Level 2,   53 Queen St
C:A6: +$A:A6
C:B6: {LB} +$A:$B$6
C:E6: {L} 'Melbourne VIC 3000
C:E7: 'AUSTRALIA
C:E8: 'Telephone
C:F8: '(03) 9629 7448
C:E9: 'Facsimile
C:F9: '(03) 9629 7464
C:A10: 'SHEET:
C:B10: 'CIN
C:A14: +$A:A1
C:B14: 'OPER
C:C14: 'MONTHLY REPORTING MODEL
C:A15: {D4} @NOW
C:C15: 'REVENUE BASED SYSTEM WITH BUDGETS
C:A16: {DUTCH8} '(c) GLW SOFTWARE PTY LTD 1995,1996
C:A17: {Bold} @IF($A:A17>"",+$A:A17,"")
C:D17: 1
C:E17: 2
C:F17: 3
C:G17: 4
C:H17: 5
C:I17: 6
C:J17: 7
C:K17: 8
C:L17: 9
C:M17: 10
C:N17: 11
C:O17: 12
C:A18: {Bold} @IF($A:A18>"",+$A:A18,"")
C:D18: {Bold} '      JUL
C:E18: {Bold} '      AUG
C:F18: {Bold} '      SEP
C:G18: {Bold} '      OCT
C:H18: {Bold} '      NOV
C:I18: {Bold} '      DEC
C:J18: {Bold} '      JAN
C:K18: {Bold} '      FEB
C:L18: {Bold} '      MAR
C:M18: {Bold} '      APR
C:N18: {Bold} '      MAY
C:O18: {Bold} '      JUN
C:A19: {Bold} @IF($A:A19>"",+$A:A19,"")
C:D19: {Bold} @IF(D17>$A:$B$4,"FORECAST","   ACTUAL")
C:E19: {Bold} @IF(E17>$A:$B$4,"FORECAST","   ACTUAL")
C:F19: {Bold} @IF(F17>$A:$B$4,"FORECAST","   ACTUAL")
C:G19: {Bold} @IF(G17>$A:$B$4,"FORECAST","   ACTUAL")
C:H19: {Bold} @IF(H17>$A:$B$4,"FORECAST","   ACTUAL")
C:I19: {Bold} @IF(I17>$A:$B$4,"FORECAST","   ACTUAL")
C:J19: {Bold} @IF(J17>$A:$B$4,"FORECAST","   ACTUAL")
C:K19: {Bold} @IF(K17>$A:$B$4,"FORECAST","   ACTUAL")
C:L19: {Bold} @IF(L17>$A:$B$4,"FORECAST","   ACTUAL")
C:M19: {Bold} @IF(M17>$A:$B$4,"FORECAST","   ACTUAL")
```

```
?(N17>$A:$B$4,"FORECAST","    ACTUAL")
?(O17>$A:$B$4,"FORECAST","    ACTUAL")
)>"",+$A:A20,"")
1>"",+$A:A21,"")
2>"",+$A:A22,"")
3>"",+$A:A23,"")
4>"",+$A:A24,"")
5>"",+$A:A25,"")
F($A:A26>"",+$A:A26,"")
F($A:A27>"",+$A:A27,"")
8>"",+$A:A28,"")
9>"",+$A:A29,"")
0>"",+$A:A30,"")
1>"",+$A:A31,"")
@SUM(D20..D30)
@SUM(E20..E30)
@SUM(F20..F30)
@SUM(G20..G30)
@SUM(H20..H30)
@SUM(I20..I30)
@SUM(J20..J30)
@SUM(K20..K30)
@SUM(L20..L30)
@SUM(M20..M30)
@SUM(N20..N30)
@SUM(O20..O30)

' REPORTING MODEL
TWARE PTY LTD
W
ACCOUNTING AND FORECASTING   Version 1.1
. '(c) GLW SOFTWARE PTY LTD 1995,1996
!IF($A:A42>"",+$A:A42,"")

@IF($A:A43>"",+$A:A43,"")
'    JUL
'    AUG
'    SEP
'    OCT
'    NOV
'    DEC
'    JAN
'    FEB
'    MAR
'    APR
'    MAY
'    JUN
@IF($A:A44>"",+$A:A44,"")
@IF($A:B44>"",+$A:B44,"")
@IF(D42>$A:$B$4,"FORECAST","    ACTUAL")
@IF(E42>$A:$B$4,"FORECAST","    ACTUAL")
@IF(F42>$A:$B$4,"FORECAST","    ACTUAL")
@IF(G42>$A:$B$4,"FORECAST","    ACTUAL")
@IF(H42>$A:$B$4,"FORECAST","    ACTUAL")
@IF(I42>$A:$B$4,"FORECAST","    ACTUAL")
```

```
C:J44: {Bold} @IF(J42>$A:$B$4,"FORECAST","    ACTUAL")
C:K44: {Bold} @IF(K42>$A:$B$4,"FORECAST","    ACTUAL")
C:L44: {Bold} @IF(L42>$A:$B$4,"FORECAST","    ACTUAL")
C:M44: {Bold} @IF(M42>$A:$B$4,"FORECAST","    ACTUAL")
C:N44: {Bold} @IF(N42>$A:$B$4,"FORECAST","    ACTUAL")
C:O44: {Bold} @IF(O42>$A:$B$4,"FORECAST","    ACTUAL")
C:A45: {Bold} @IF($A:A45>"",+$A:A45,"")
C:B45: (F0) @IF($A:B45>"",+$A:B45,"")
C:A46: {Bold} @IF($A:A46>"",+$A:A46,"")
C:A47: @IF($A:A47>"",+$A:A47,"")
C:C47: (F0) @IF($A:C47>"",+$A:C47,"")
C:A48: @IF($A:A48>"",+$A:A48,"")
C:C48: (F0) @IF($A:C48>"",+$A:C48,"")
C:A49: @IF($A:A49>"",+$A:A49,"")
C:A50: {Bold} @IF($A:A50>"",+$A:A50,"")
C:A51: @IF($A:A51>"",+$A:A51,"")
C:C51: (F0) @IF($A:C51>"",+$A:C51,"")
C:A52: @IF($A:A52>"",+$A:A52,"")
C:C52: (F0) @IF($A:C52>"",+$A:C52,"")
C:A53: {Bold} @IF($A:A53>"",+$A:A53,"")
C:C53: (F0) @IF($A:C53>"",+$A:C53,"")
C:A54: @IF($A:A54>"",+$A:A54,"")
C:C54: (F0) @IF($A:C54>"",+$A:C54,"")
C:A55: @IF($A:A55>"",+$A:A55,"")
C:C55: (F0) @IF($A:C55>"",+$A:C55,"")
C:A56: @IF($A:A56>"",+$A:A56,"")
C:C56: (F0) @IF($A:C56>"",+$A:C56,"")
C:A57: @IF($A:A57>"",+$A:A57,"")
C:C57: (F0) @IF($A:C57>"",+$A:C57,"")
C:A58: @IF($A:A58>"",+$A:A58,"")
C:C58: (F0) @IF($A:C58>"",+$A:C58,"")
C:A59: @IF($A:A59>"",+$A:A59,"")
C:C59: (F0) @IF($A:C59>"",+$A:C59,"")
C:A60: {Bold} @IF($A:A60>"",+$A:A60,"")
C:C60: (F0) @IF($A:C60>"",+$A:C60,"")
C:A61: {Bold} @IF($A:A61>"",+$A:A61,"")
C:C61: (F0) @IF($A:C61>"",+$A:C61,"")
C:A62: @IF($A:A62>"",+$A:A62,"")
C:C62: (,0) @IF($A:C62>"",+$A:C62,"")
C:D62: -40000
C:E62: -25000
C:F62: -30000
C:G62: -20000
C:H62: -40000
C:I62: @IF(H:H62>0,-H:H62*0.9,0)
C:J62: @IF(H:I62>0,-H:I62*0.9,0)
C:K62: @IF(H:J62>0,-H:J62*0.9,0)
C:L62: @IF(H:K62>0,-H:K62*0.9,0)
C:M62: @IF(H:L62>0,-H:L62*0.9,0)
C:N62: @IF(H:M62>0,-H:M62*0.9,0)
C:O62: @IF(H:N62>0,-H:N62*0.9,0)
C:A63: @IF($A:A63>"",+$A:A63,"")
C:C63: (,0) @IF($A:C63>"",+$A:C63,"")
C:D63: 40000
C:E63: 25000
C:F63: 30000
C:G63: 20000
C:H63: 40000
C:I63: -I62
C:J63: -J62
C:K63: -K62
C:L63: -L62
C:M63: -M62
C:N63: -N62
C:O63: -O62
C:A64: @IF($A:A64>"",+$A:A64,"")
C:C64: (,0) @IF($A:C64>"",+$A:C64,"")
```

```
 @IF($A:A65>"",+$A:A65,"")
IF($A:C65>"",+$A:C65,"")
:A66>"",+$A:A66,"")
IF($A:C66>"",+$A:C66,"")
:A67>"",+$A:A67,"")
IF($A:C67>"",+$A:C67,"")
:A68>"",+$A:A68,"")
IF($A:C68>"",+$A:C68,"")
 @IF($A:A69>"",+$A:A69,"")
IF($A:C69>"",+$A:C69,"")
:A70>"",+$A:A70,"")
IF($A:C70>"",+$A:C70,"")
:A71>"",+$A:A71,"")
IF($A:C71>"",+$A:C71,"")
 @IF($A:A72>"",+$A:A72,"")
IF($A:C72>"",+$A:C72,"")
:A73>"",+$A:A73,"")
IF($A:C73>"",+$A:C73,"")
:A74>"",+$A:A74,"")
IF($A:C74>"",+$A:C74,"")
:A75>"",+$A:A75,"")
IF($A:C75>"",+$A:C75,"")
:A76>"",+$A:A76,"")
IF($A:C76>"",+$A:C76,"")
:A77>"",+$A:A77,"")
IF($A:C77>"",+$A:C77,"")
:A78>"",+$A:A78,"")
IF($A:C78>"",+$A:C78,"")
)47..D76)
347..E76)
?47..F76)
347..G76)
347..H76)
I47..I76)
J47..J76)
K47..K76)
L47..L76)
M47..M76)
N47..N76)
O47..O76)
```

```
D:A1: +$A:A1
D:C1: 'MONTHLY REPORTING MODEL
D:A2: (D4) +$A:A2
D:C2: 'MATRIX ACCOUNTING AND FORECASTING (MAP)
D:C3: 'Version
D:D3: (F2) +$A:$D$3
D:B3: '     SUPPLIER:
D:A4: +$A:A4
D:B4: {LRTB} +$A:$B$4
D:C4: +$A:$C$4
D:E4: 'GLW SOFTWARE PTY LTD
D:A5: +$A:A5
D:B5: {LRB} +$A:$B$5
D:E5: 'Level 2,   53 Queen St
D:A6: +$A:A6
D:B6: {LB} +$A:$B$6
D:E6: {L} 'Melbourne VIC 3000
D:E7: 'AUSTRALIA
D:E8: 'Telephone
D:F8: '(03) 9629 7448
D:E9: 'Facsimile
D:F9: '(03) 9629 7464
D:A10: 'SHEET:
D:B10: 'COUT
D:A14: +$A:A1
D:B14: 'OPER
D:C14: 'MONTHLY REPORTING MODEL
D:A15: (D4) @NOW
D:C15: 'REVENUE BASED SYSTEM WITH BUDGETS
D:A16: {DUTCH8} '(c) GLW SOFTWARE PTY LTD 1995,1996
D:A17: {Bold} @IF($A:A17>"",+$A:A17,"")
D:D17: 1
D:E17: 2
D:F17: 3
D:G17: 4
D:H17: 5
D:I17: 6
D:J17: 7
D:K17: 8
D:L17: 9
D:M17: 10
D:N17: 11
D:O17: 12
D:A18: {Bold} @IF($A:A18>"",+$A:A18,"")
D:D18: {Bold} '     JUL
D:E18: {Bold} '     AUG
D:F18: {Bold} '     SEP
D:G18: {Bold} '     OCT
D:H18: {Bold} '     NOV
D:I18: {Bold} '     DEC
D:J18: {Bold} '     JAN
D:K18: {Bold} '     FEB
D:L18: {Bold} '     MAR
D:M18: {Bold} '     APR
D:N18: {Bold} '     MAY
D:O18: {Bold} '     JUN
D:A19: {Bold} @IF($A:A19>"",+$A:A19,"")
D:D19: {Bold} @IF(D17>$A:$B$4,"FORECAST","  ACTUAL")
D:E19: {Bold} @IF(E17>$A:$B$4,"FORECAST","  ACTUAL")
D:F19: {Bold} @IF(F17>$A:$B$4,"FORECAST","  ACTUAL")
D:G19: {Bold} @IF(G17>$A:$B$4,"FORECAST","  ACTUAL")
D:H19: {Bold} @IF(H17>$A:$B$4,"FORECAST","  ACTUAL")
D:I19: {Bold} @IF(I17>$A:$B$4,"FORECAST","  ACTUAL")
D:J19: {Bold} @IF(J17>$A:$B$4,"FORECAST","  ACTUAL")
D:K19: {Bold} @IF(K17>$A:$B$4,"FORECAST","  ACTUAL")
D:L19: {Bold} @IF(L17>$A:$B$4,"FORECAST","  ACTUAL")
D:M19: {Bold} @IF(M17>$A:$B$4,"FORECAST","  ACTUAL")
```

```
@IF(N17>$A:$B$4,"FORBCAST","   ACTUAL")
@IF(O17>$A:$B$4,"FORBCAST","   ACTUAL")
A20>"",+$A:A20,"")
A21>"",+$A:A21,"")
A22>"",+$A:A22,"")
A23>"",+$A:A23,"")
A24>"",+$A:A24,"")
A25>"",+$A:A25,"")
@IF($A:A26>"",+$A:A26,"")
@IF($A:A27>"",+$A:A27,"")
A28>"",+$A:A28,"")
A29>"",+$A:A29,"")
A30>"",+$A:A30,"")
A31>"",+$A:A31,"")
) @SUM(D20..D30)
) @SUM(E20..E30)
) @SUM(F20..F30)
) @SUM(G20..G30)
) @SUM(H20..H30)
) @SUM(I20..I30)
) @SUM(J20..J30)
) @SUM(K20..K30)
) @SUM(L20..L30)
) @SUM(M20..M30)
0) @SUM(N20..N30)
0) @SUM(O20..O30)

LY REPORTING MODEL
OFTWARE PTY LTD
NOW
X ACCOUNTING AND FORECASTING   Version 1.1
B) '(c) GLW SOFTWARE PTY LTD 1995,1996
 @IF($A:A42>"",+$A:A42,"")

) @IF($A:A43>"",+$A:A43,"")
) '     JUL
) '     AUG
) '     SEP
) '     OCT
) '     NOV
) '     DEC
) '     JAN
) '     FEB
) '     MAR
) '     APR
) '     MAY
) '     JUN
) @IF($A:A44>"",+$A:A44,"")
) @IF($A:B44>"",+$A:B44,"")
) @IF(D42>$A:$B$4,"FORBCAST","   ACTUAL")
) @IF(E42>$A:$B$4,"FORBCAST","   ACTUAL")
) @IF(F42>$A:$B$4,"FORBCAST","   ACTUAL")
) @IF(G42>$A:$B$4,"FORBCAST","   ACTUAL")
) @IF(H42>$A:$B$4,"FORBCAST","   ACTUAL")
) @IF(I42>$A:$B$4,"FORBCAST","   ACTUAL")
```

```
D:J44: {Bold} @IF(J42>$A:$B$4,"FORBCAST","   ACTUAL")
D:K44: {Bold} @IF(K42>$A:$B$4,"FORBCAST","   ACTUAL")
D:L44: {Bold} @IF(L42>$A:$B$4,"FORBCAST","   ACTUAL")
D:M44: {Bold} @IF(M42>$A:$B$4,"FORBCAST","   ACTUAL")
D:N44: {Bold} @IF(N42>$A:$B$4,"FORBCAST","   ACTUAL")
D:O44: {Bold} @IF(O42>$A:$B$4,"FORBCAST","   ACTUAL")
D:A45: {Bold} @IF($A:A45>"",+$A:A45,"")
D:B45: (F0) @IF($A:B45>"",+$A:B45,"")
D:A46: {Bold} @IF($A:A46>"",+$A:A46,"")
D:A47: @IF($A:A47>"",+$A:A47,"")
D:C47: (F0) @IF($A:C47>"",+$A:C47,"")
D:A48: @IF($A:A48>"",+$A:A48,"")
D:C48: (F0) @IF($A:C48>"",+$A:C48,"")
D:A49: @IF($A:A49>"",+$A:A49,"")
D:A50: {Bold} @IF($A:A50>"",+$A:A50,"")
D:A51: @IF($A:A51>"",+$A:A51,"")
D:C51: (F0) @IF($A:C51>"",+$A:C51,"")
D:A52: @IF($A:A52>"",+$A:A52,"")
D:C52: (F0) @IF($A:C52>"",+$A:C52,"")
D:A53: {Bold} @IF($A:A53>"",+$A:A53,"")
D:C53: (F0) @IF($A:C53>"",+$A:C53,"")
D:A54: @IF($A:A54>"",+$A:A54,"")
D:C54: (F0) @IF($A:C54>"",+$A:C54,"")
D:D54: 200
D:E54: 200
D:F54: 200
D:G54: 200
D:H54: 200
D:I54: 200
D:J54: 300
D:K54: 300
D:L54: 300
D:M54: 300
D:N54: 300
D:O54: 300
D:A55: @IF($A:A55>"",+$A:A55,"")
D:C55: (F0) @IF($A:C55>"",+$A:C55,"")
D:A56: @IF($A:A56>"",+$A:A56,"")
D:C56: (F0) @IF($A:C56>"",+$A:C56,"")
D:D56: 3000
D:E56: 3000
D:F56: 3000
D:G56: 3000
D:H56: 3000
D:I56: 3000
D:J56: 3200
D:K56: 3200
D:L56: 3200
D:M56: 3200
D:N56: 3200
D:O56: 3200
D:A57: @IF($A:A57>"",+$A:A57,"")
D:C57: (F0) @IF($A:C57>"",+$A:C57,"")
D:A58: @IF($A:A58>"",+$A:A58,"")
D:C58: (F0) @IF($A:C58>"",+$A:C58,"")
D:A59: @IF($A:A59>"",+$A:A59,"")
D:C59: (F0) @IF($A:C59>"",+$A:C59,"")
D:A60: {Bold} @IF($A:A60>"",+$A:A60,"")
D:C60: (F0) @IF($A:C60>"",+$A:C60,"")
D:A61: {Bold} @IF($A:A61>"",+$A:A61,"")
D:C61: (F0) @IF($A:C61>"",+$A:C61,"")
D:A62: @IF($A:A62>"",+$A:A62,"")
D:C62: (,0) @IF($A:C62>"",+$A:C62,"")
D:A63: @IF($A:A63>"",+$A:A63,"")
D:C63: (,0) @IF($A:C63>"",+$A:C63,"")
D:D63: -(@SUM(D47..D57)+@SUM(D64..D70))
D:E63: -(@SUM(E47..E57)+@SUM(E64..E70))
```

```
17..F57)+@SUM(F64..F70))
17..G57)+@SUM(G64..G70))
17..H57)+@SUM(H64..H70))
17..I57)+@SUM(I64..I70))
17..J57)+@SUM(J64..J70))
17..K57)+@SUM(K64..K70))
17..L57)+@SUM(L64..L70))
47..M57)+@SUM(M64..M70))
47..N57)+@SUM(N64..N70))
47..O57)+@SUM(O64..O70))
64>"",+$A:A64,"")
'($A:C64>"",+$A:C64,"")
IF($A:A65>"",+$A:A65,"")
'($A:C65>"",+$A:C65,"")
66>"",+$A:A66,"")
'($A:C66>"",+$A:C66,"")

A67>"",+$A:A67,"")
F($A:C67>"",+$A:C67,"")
A68>"",+$A:A68,"")
F($A:C68>"",+$A:C68,"")
@IF($A:A69>"",+$A:A69,"")
F($A:C69>"",+$A:C69,"")
A70>"",+$A:A70,"")
F($A:C70>"",+$A:C70,"")

A71>"",+$A:A71,"")
IF($A:C71>"",+$A:C71,"")
@IF($A:A72>"",+$A:A72,"")
IF($A:C72>"",+$A:C72,"")
:A73>"",+$A:A73,"")
IF($A:C73>"",+$A:C73,"")
:A74>"",+$A:A74,"")
IF($A:C74>"",+$A:C74,"")
:A75>"",+$A:A75,"")
IF($A:C75>"",+$A:C75,"")
:A76>"",+$A:A76,"")
IF($A:C76>"",+$A:C76,"")
:A77>"",+$A:A77,"")
IF($A:C77>"",+$A:C77,"")
:A78>"",+$A:A78,"")
F($A:C78>"",+$A:C78,"")
47..D76)
47..E76)
47..F76)
47..G76)
47..H76)
47..I76)
47..J76)
47..K76)
```

```
D:L78: @SUM(L47..L76)
D:M78: @SUM(M47..M76)
D:N78: @SUM(N47..N76)
D:O78: @SUM(O47..O76)
```

```
REPORTING MODEL
A2
CCOUNTING AND FORECASTING (MAF)

$D$3
PLIER:

A:$B$4

WARE PTY LTD

:$B$5
 53 Queen St

$B$6
ourne VIC 3000
IA
le
29 7448
le
29 7464


Y REPORTING MODEL
OW
B BASED SYSTEM WITH BUDGETS
 '(c) GLW SOFTWARE PTY LTD 1995,1996
@IF($A:A17>"",+$A:A17,"")


@IF($A:A18>"",+$A:A18,"")
'     JUL
'     AUG
'     SEP
'     OCT
'     NOV
'     DEC
'     JAN
'     FEB
'     MAR
'     APR
'     MAY
'     JUN
@IF($A:A19>"",+$A:A19,"")
@IF(D17>$A:$B$4,"FORECAST","   ACTUAL")
@IF(E17>$A:$B$4,"FORECAST","   ACTUAL")
@IF(F17>$A:$B$4,"FORECAST","   ACTUAL")
@IF(G17>$A:$B$4,"FORECAST","   ACTUAL")
@IF(H17>$A:$B$4,"FORECAST","   ACTUAL")
@IF(I17>$A:$B$4,"FORECAST","   ACTUAL")
@IF(J17>$A:$B$4,"FORECAST","   ACTUAL")
@IF(K17>$A:$B$4,"FORECAST","   ACTUAL")
@IF(L17>$A:$B$4,"FORECAST","   ACTUAL")
@IF(M17>$A:$B$4,"FORECAST","   ACTUAL")
```

```
B:N19: {Bold} @IF(N17>$A:$B$4,"FORECAST","   ACTUAL")
B:O19: {Bold} @IF(O17>$A:$B$4,"FORECAST","   ACTUAL")
B:A20: @IF($A:A20>"",+$A:A20,"")
B:A21: @IF($A:A21>"",+$A:A21,"")
B:A22: @IF($A:A22>"",+$A:A22,"")
B:A23: @IF($A:A23>"",+$A:A23,"")
B:A24: @IF($A:A24>"",+$A:A24,"")
B:A25: @IF($A:A25>"",+$A:A25,"")
B:A26: {Bold} @IF($A:A26>"",+$A:A26,"")
B:A27: {Bold} @IF($A:A27>"",+$A:A27,"")
B:A28: @IF($A:A28>"",+$A:A28,"")
B:A29: @IF($A:A29>"",+$A:A29,"")
B:A30: @IF($A:A30>"",+$A:A30,"")
B:A31: @IF($A:A31>"",+$A:A31,"")
B:D31: {B} (,0) @SUM(D20..D30)
B:E31: {B} (,0) @SUM(E20..E30)
B:F31: {B} (,0) @SUM(F20..F30)
B:G31: {B} (,0) @SUM(G20..G30)
B:H31: {B} (,0) @SUM(H20..H30)
B:I31: {B} (,0) @SUM(I20..I30)
B:J31: {B} (,0) @SUM(J20..J30)
B:K31: {B} (,0) @SUM(K20..K30)
B:L31: {B} (,0) @SUM(L20..L30)
B:M31: {B} (,0) @SUM(M20..M30)
B:N31: {B} (,0) @SUM(N20..N30)
B:O31: {B} (,0) @SUM(O20..O30)
B:A38: +$A:A1
B:B38: 'JNL
B:C38: 'MONTHLY REPORTING MODEL
B:F38: 'GLW SOFTWARE PTY LTD
B:A39: (D4) @NOW
B:C39: 'MATRIX ACCOUNTING AND FORECASTING   Version 1.1
B:A40: {DUTCH8} '(c) GLW SOFTWARE PTY LTD 1995,1996
B:A42: {Bold} @IF($A:A42>"",+$A:A42,"")
B:D42: 1
B:E42: 2
B:F42: 3
B:G42: 4
B:H42: 5
B:I42: 6
B:J42: 7
B:K42: 8
B:L42: 9
B:M42: 10
B:N42: 11
B:O42: 12
B:A43: {Bold} @IF($A:A43>"",+$A:A43,"")
B:D43: {Bold} '     JUL
B:E43: {Bold} '     AUG
B:F43: {Bold} '     SEP
B:G43: {Bold} '     OCT
B:H43: {Bold} '     NOV
B:I43: {Bold} '     DEC
B:J43: {Bold} '     JAN
B:K43: {Bold} '     FEB
B:L43: {Bold} '     MAR
B:M43: {Bold} '     APR
B:N43: {Bold} '     MAY
B:O43: {Bold} '     JUN
B:A44: {Bold} @IF($A:A44>"",+$A:A44,"")
B:B44: {Bold} @IF($A:B44>"",+$A:B44,"")
B:D44: {Bold} @IF(D42>$A:$B$4,"FORECAST","   ACTUAL")
B:E44: {Bold} @IF(E42>$A:$B$4,"FORECAST","   ACTUAL")
B:F44: {Bold} @IF(F42>$A:$B$4,"FORECAST","   ACTUAL")
B:G44: {Bold} @IF(G42>$A:$B$4,"FORECAST","   ACTUAL")
B:H44: {Bold} @IF(H42>$A:$B$4,"FORECAST","   ACTUAL")
B:I44: {Bold} @IF(I42>$A:$B$4,"FORECAST","   ACTUAL")
```

```
?(J42>$A:$B$4,"FORECAST","    ACTUAL")
?(K42>$A:$B$4,"FORECAST","    ACTUAL")
?(L42>$A:$B$4,"FORECAST","    ACTUAL")
?(M42>$A:$B$4,"FORECAST","    ACTUAL")
?(N42>$A:$B$4,"FORECAST","    ACTUAL")
F(O42>$A:$B$4,"FORECAST","    ACTUAL")
F($A:A45>"",+$A:A45,"")
$A:B45>"",+$A:B45,"")
F($A:A46>"",+$A:A46,"")
7>"",+$A:A47,"")
$A:C47>"",+$A:C47,"")
8>"",+$A:A48,"")
$A:C48>"",+$A:C48,"")
i9>"",+$A:A49,"")
IF($A:A50>"",+$A:A50,"")
51>"",+$A:A51,"")
($A:C51>"",+$A:C51,"")
52>"",+$A:A52,"")
($A:C52>"",+$A:C52,"")
IF($A:A53>"",+$A:A53,"")
($A:C53>"",+$A:C53,"")
54>"",+$A:A54,"")
($A:C54>"",+$A:C54,"")
55>"",+$A:A55,"")
'($A:C55>"",+$A:C55,"")

A56>"",+$A:A56,"")
:F($A:C56>"",+$A:C56,"")
:A57>"",+$A:A57,"")
IF($A:C57>"",+$A:C57,"")
:A58>"",+$A:A58,"")
IF($A:C58>"",+$A:C58,"")
:A59>"",+$A:A59,"")
IF($A:C59>"",+$A:C59,"")
 @IF($A:A60>"",+$A:A60,"")
IF($A:C60>"",+$A:C60,"")
 @IF($A:A61>"",+$A:A61,"")
)IF($A:C61>"",+$A:C61,"")
:A62>"",+$A:A62,"")
)IF($A:C62>"",+$A:C62,"")
:A63>"",+$A:A63,"")
)IF($A:C63>"",+$A:C63,"")
:A64>"",+$A:A64,"")
)IF($A:C64>"",+$A:C64,"")
} @IF($A:A65>"",+$A:A65,"")
@IF($A:C65>"",+$A:C65,"")
A:A66>"",+$A:A66,"")
@IF($A:C66>"",+$A:C66,"")
A:A67>"",+$A:A67,"")
@IF($A:C67>"",+$A:C67,"")
```

```
B:J67: -J55
B:K67: -K55
B:L67: -L55
B:M67: -M55
B:N67: -N55
B:O67: -O55
B:A68: @IF($A:A68>"",+$A:A68,"")
B:C68: (,0) @IF($A:C68>"",+$A:C68,"")
B:A69: {Bold} @IF($A:A69>"",+$A:A69,"")
B:C69: (,0) @IF($A:C69>"",+$A:C69,"")
B:A70: @IF($A:A70>"",+$A:A70,"")
B:C70: (,0) @IF($A:C70>"",+$A:C70,"")
B:A71: @IF($A:A71>"",+$A:A71,"")
B:C71: (,0) @IF($A:C71>"",+$A:C71,"")
B:A72: {Bold} @IF($A:A72>"",+$A:A72,"")
B:C72: (,0) @IF($A:C72>"",+$A:C72,"")
B:A73: @IF($A:A73>"",+$A:A73,"")
B:C73: (,0) @IF($A:C73>"",+$A:C73,"")
B:A74: @IF($A:A74>"",+$A:A74,"")
B:C74: (,0) @IF($A:C74>"",+$A:C74,"")
B:A75: @IF($A:A75>"",+$A:A75,"")
B:C75: (,0) @IF($A:C75>"",+$A:C75,"")
B:A76: @IF($A:A76>"",+$A:A76,"")
B:C76: (,0) @IF($A:C76>"",+$A:C76,"")
B:A77: @IF($A:A77>"",+$A:A77,"")
B:C77: (,0) @IF($A:C77>"",+$A:C77,"")
B:A78: @IF($A:A78>"",+$A:A78,"")
B:C78: {B} @IF($A:C78>"",+$A:C78,"")
B:D78: @SUM(D47..D76)
B:E78: @SUM(E47..E76)
B:F78: @SUM(F47..F76)
B:G78: @SUM(G47..G76)
B:H78: @SUM(H47..H76)
B:I78: @SUM(I47..I76)
B:J78: @SUM(J47..J76)
B:K78: @SUM(K47..K76)
B:L78: @SUM(L47..L76)
B:M78: @SUM(M47..M76)
B:N78: @SUM(N47..N76)
B:O78: @SUM(O47..O76)
```

```
REPORTING MODEL
A2
CCOUNTING AND FORECASTING (MAF)

$D$3
PLIER:

A:$B$4

WARE PTY LTD

.:$B$5
  53 Queen St

$B$6
ourne VIC 3000
A
e
9 7448
e
9 7464


Y REPORTING MODEL
OW
B BASED SYSTEM WITH BUDGETS
 '(c) GLW SOFTWARE PTY LTD 1995,1996
@IF($A:A17>"",+$A:A17,"")




@IF($A:A18>"",+$A:A18,"")
'      JUL
'      AUG
'      SEP
'      OCT
'      NOV
'      DEC
'      JAN
'      FEB
'      MAR
'      APR
'      MAY
'      JUN
@IF($A:A19>"",+$A:A19,"")
@IF(D17>$A:$B$4,"FORECAST","   ACTUAL")
@IF(E17>$A:$B$4,"FORECAST","   ACTUAL")
@IF(F17>$A:$B$4,"FORECAST","   ACTUAL")
@IF(G17>$A:$B$4,"FORECAST","   ACTUAL")
@IF(H17>$A:$B$4,"FORECAST","   ACTUAL")
@IF(I17>$A:$B$4,"FORECAST","   ACTUAL")
@IF(J17>$A:$B$4,"FORECAST","   ACTUAL")
@IF(K17>$A:$B$4,"FORECAST","   ACTUAL")
@IF(L17>$A:$B$4,"FORECAST","   ACTUAL")
@IF(M17>$A:$B$4,"FORECAST","   ACTUAL")
```

```
P:N19: {Bold} @IF(N17>$A:$B$4,"FORECAST","   ACTUAL")
P:O19: {Bold} @IF(O17>$A:$B$4,"FORECAST","   ACTUAL")
P:A20: @IF($A:A20>"",+$A:A20,"")
P:A21: @IF($A:A21>"",+$A:A21,"")
P:A22: @IF($A:A22>"",+$A:A22,"")
P:A23: @IF($A:A23>"",+$A:A23,"")
P:A24: @IF($A:A24>"",+$A:A24,"")
P:A25: @IF($A:A25>"",+$A:A25,"")
P:A26: {Bold} @IF($A:A26>"",+$A:A26,"")
P:A27: {Bold} @IF($A:A27>"",+$A:A27,"")
P:A28: @IF($A:A28>"",+$A:A28,"")
P:A29: @IF($A:A29>"",+$A:A29,"")
P:A30: @IF($A:A30>"",+$A:A30,"")
P:A31: @IF($A:A31>"",+$A:A31,"")
P:D31: {B} {,0} @SUM(D20..D30)
P:E31: {B} {,0} @SUM(E20..E30)
P:F31: {B} {,0} @SUM(F20..F30)
P:G31: {B} {,0} @SUM(G20..G30)
P:H31: {B} {,0} @SUM(H20..H30)
P:I31: {B} {,0} @SUM(I20..I30)
P:J31: {B} {,0} @SUM(J20..J30)
P:K31: {B} {,0} @SUM(K20..K30)
P:L31: {B} {,0} @SUM(L20..L30)
P:M31: {B} {,0} @SUM(M20..M30)
P:N31: {B} {,0} @SUM(N20..N30)
P:O31: {B} {,0} @SUM(O20..O30)
P:A38: +$A:A1
P:B38: 'JNLR
P:C38: 'MONTHLY REPORTING MODEL
P:F38: 'GLW SOFTWARE PTY LTD
P:A39: (D4) @NOW
P:C39: 'MATRIX ACCOUNTING AND FORECASTING  Version 1.1
P:A40: {DUTCH8} '(c) GLW SOFTWARE PTY LTD 1995,1996
P:A42: {Bold} @IF($A:A42>"",+$A:A42,"")
P:D42: 1
P:E42: 2
P:F42: 3
P:G42: 4
P:H42: 5
P:I42: 6
P:J42: 7
P:K42: 8
P:L42: 9
P:M42: 10
P:N42: 11
P:O42: 12
P:A43: {Bold} @IF($A:A43>"",+$A:A43,"")
P:D43: {Bold} '      JUL
P:E43: {Bold} '      AUG
P:F43: {Bold} '      SEP
P:G43: {Bold} '      OCT
P:H43: {Bold} '      NOV
P:I43: {Bold} '      DEC
P:J43: {Bold} '      JAN
P:K43: {Bold} '      FEB
P:L43: {Bold} '      MAR
P:M43: {Bold} '      APR
P:N43: {Bold} '      MAY
P:O43: {Bold} '      JUN
P:A44: {Bold} @IF($A:A44>"",+$A:A44,"")
P:B44: {Bold} @IF($A:B44>"",+$A:B44,"")
P:D44: {Bold} @IF(D42>$A:$B$4,"FORECAST","   ACTUAL")
P:E44: {Bold} @IF(E42>$A:$B$4,"FORECAST","   ACTUAL")
P:F44: {Bold} @IF(F42>$A:$B$4,"FORECAST","   ACTUAL")
P:G44: {Bold} @IF(G42>$A:$B$4,"FORECAST","   ACTUAL")
P:H44: {Bold} @IF(H42>$A:$B$4,"FORECAST","   ACTUAL")
P:I44: {Bold} @IF(I42>$A:$B$4,"FORECAST","   ACTUAL")
```

```
 IF(J42>$A:$B$4,"FORECAST","   ACTUAL")
 IF(K42>$A:$B$4,"FORECAST","   ACTUAL")
 IF(L42>$A:$B$4,"FORECAST","   ACTUAL")
 IF(M42>$A:$B$4,"FORECAST","   ACTUAL")
 IF(N42>$A:$B$4,"FORECAST","   ACTUAL")
 IF(O42>$A:$B$4,"FORECAST","   ACTUAL")
 IF($A:A45>"",+$A:A45,"")
 F($A:B45>"",+$A:B45,"")
 IF($A:A46>"",+$A:A46,"")
 A47>"",+$A:A47,"")
 F($A:C47>"",+$A:C47,"")
 A48>"",+$A:A48,"")
 F($A:C48>"",+$A:C48,"")
 A49>"",+$A:A49,"")
 @IF($A:A50>"",+$A:A50,"")
 A51>"",+$A:A51,"")
 F($A:C51>"",+$A:C51,"")
 A52>"",+$A:A52,"")
 F($A:C52>"",+$A:C52,"")
 @IF($A:A53>"",+$A:A53,"")
 F($A:C53>"",+$A:C53,"")
 A54>"",+$A:A54,"")
 F($A:C54>"",+$A:C54,"")
 A55>"",+$A:A55,"")
 F($A:C55>"",+$A:C55,"")
 A56>"",+$A:A56,"")
 F($A:C56>"",+$A:C56,"")
 :A57>"",+$A:A57,"")
 IF($A:C57>"",+$A:C57,"")
 :A58>"",+$A:A58,"")
 IF($A:C58>"",+$A:C58,"")
 :A59>"",+$A:A59,"")
 IF($A:C59>"",+$A:C59,"")
  @IF($A:A60>"",+$A:A60,"")
 IF($A:C60>"",+$A:C60,"")
  @IF($A:A61>"",+$A:A61,"")
 IF($A:C61>"",+$A:C61,"")
 :A62>"",+$A:A62,"")
 IF($A:C62>"",+$A:C62,"")
 :A63>"",+$A:A63,"")
 IF($A:C63>"",+$A:C63,"")
 :A64>"",+$A:A64,"")
 IF($A:C64>"",+$A:C64,"")
  @IF($A:A65>"",+$A:A65,"")
 IF($A:C65>"",+$A:C65,"")
 A:A66>"",+$A:A66,"")
 IF($A:C66>"",+$A:C66,"")
 A:A67>"",+$A:A67,"")
 IF($A:C67>"",+$A:C67,"")
 A:A68>"",+$A:A68,"")
 IF($A:C68>"",+$A:C68,"")
  @IF($A:A69>"",+$A:A69,"")
 IF($A:C69>"",+$A:C69,"")
 A:A70>"",+$A:A70,"")
 @IF($A:C70>"",+$A:C70,"")
 A:A71>"",+$A:A71,"")
 @IF($A:C71>"",+$A:C71,"")
  @IF($A:A72>"",+$A:A72,"")
 @IF($A:C72>"",+$A:C72,"")
 A:A73>"",+$A:A73,"")
 @IF($A:C73>"",+$A:C73,"")
 A:A74>"",+$A:A74,"")
 @IF($A:C74>"",+$A:C74,"")
 A:A75>"",+$A:A75,"")
 @IF($A:C75>"",+$A:C75,"")
 A:A76>"",+$A:A76,"")
 @IF($A:C76>"",+$A:C76,"")
```

```
F:A77: @IF($A:A77>"",+$A:A77,"")
F:C77: (,0) @IF($A:C77>"",+$A:C77,"")
F:A78: @IF($A:A78>"",+$A:A78,"")
F:C78: {B} @IF($A:C78>"",+$A:C78,"")
F:D78: @SUM(D47..D76)
F:E78: @SUM(E47..E76)
F:F78: @SUM(F47..F76)
F:G78: @SUM(G47..G76)
F:H78: @SUM(H47..H76)
F:I78: @SUM(I47..I76)
F:J78: @SUM(J47..J76)
F:K78: @SUM(K47..K76)
F:L78: @SUM(L47..L76)
F:M78: @SUM(M47..M76)
F:N78: @SUM(N47..N76)
F:O78: @SUM(O47..O76)
F:A79: @IF($A:A79>"",+$A:A79,"")
```

```
' REPORTING MODEL
\:A2
 ACCOUNTING AND FORECASTING (MAF)
1
\:$D$3
JPPLIER:

+$A:$B$4
'
FTWARE PTY LTD

$A:$B$5
2,   53 Queen St

A:$B$6
lbourne VIC 3000
ATION:
for DOS
LIA
n 4.0
one
629 7448
ile
629 7464
':


LY REPORTING MODEL
NOW
X ACCOUNTING AND FORECASTING   Version 1.1
B} '(c) GLW SOFTWARE PTY LTD 1995,1996
 @IF($A:A17>"",+$A:A17,"")



} @IF($A:A18>"",+$A:A18,"")
}  '      JUL
}  '      AUG
}  '      SEP
}  '      OCT
}  '      NOV
}  '      DEC
}  '      JAN
}  '      FEB
}  '      MAR
}  '      APR
}  '      MAY
}  '      JUN
} @IF($A:A19>"",+$A:A19,"")
} @IF(D17>$A:$B$4,"FORECAST","   ACTUAL")
} @IF(E17>$A:$B$4,"FORECAST","   ACTUAL")
} @IF(F17>$A:$B$4,"FORECAST","   ACTUAL")
} @IF(G17>$A:$B$4,"FORECAST","   ACTUAL")
} @IF(H17>$A:$B$4,"FORECAST","   ACTUAL")
} @IF(I17>$A:$B$4,"FORECAST","   ACTUAL")
} @IF(J17>$A:$B$4,"FORECAST","   ACTUAL")
```

```
G:K19: {Bold} @IF(K17>$A:$B$4,"FORECAST","   ACTUAL")
G:L19: {Bold} @IF(L17>$A:$B$4,"FORECAST","   ACTUAL")
G:M19: {Bold} @IF(M17>$A:$B$4,"FORECAST","   ACTUAL")
G:N19: {Bold} @IF(N17>$A:$B$4,"FORECAST","   ACTUAL")
G:O19: {Bold} @IF(O17>$A:$B$4,"FORECAST","   ACTUAL")
G:A20: @IF($A:A20>"",+$A:A20,"")
G:A21: @IF($A:A21>"",+$A:A21,"")
G:D21: @SUM(A:D21..F:D21)
G:E21: @SUM(A:E21..F:E21)
G:F21: @SUM(A:F21..F:F21)
G:G21: @SUM(A:G21..F:G21)
G:H21: @SUM(A:H21..F:H21)
G:I21: @SUM(A:I21..F:I21)
G:J21: @SUM(A:J21..F:J21)
G:K21: @SUM(A:K21..F:K21)
G:L21: @SUM(A:L21..F:L21)
G:M21: @SUM(A:M21..F:M21)
G:N21: @SUM(A:N21..F:N21)
G:O21: @SUM(A:O21..F:O21)
G:A22: @IF($A:A22>"",+$A:A22,"")
G:A23: @IF($A:A23>"",+$A:A23,"")
G:D23: @SUM(A:D23..F:D23)
G:E23: @SUM(A:E23..F:E23)
G:F23: @SUM(A:F23..F:F23)
G:G23: @SUM(A:G23..F:G23)
G:H23: @SUM(A:H23..F:H23)
G:I23: @SUM(A:I23..F:I23)
G:J23: @SUM(A:J23..F:J23)
G:K23: @SUM(A:K23..F:K23)
G:L23: @SUM(A:L23..F:L23)
G:M23: @SUM(A:M23..F:M23)
G:N23: @SUM(A:N23..F:N23)
G:O23: @SUM(A:O23..F:O23)
G:A24: @IF($A:A24>"",+$A:A24,"")
G:A25: @IF($A:A25>"",+$A:A25,"")
G:A26: {Bold} @IF($A:A26>"",+$A:A26,"")
G:A27: {Bold} @IF($A:A27>"",+$A:A27,"")
G:A28: @IF($A:A28>"",+$A:A28,"")
G:A29: @IF($A:A29>"",+$A:A29,"")
G:A30: @IF($A:A30>"",+$A:A30,"")
G:A31: @IF($A:A31>"",+$A:A31,"")
G:D31: {B} (,0) @SUM(D20..D30)
G:E31: {B} (,0) @SUM(E20..E30)
G:F31: {B} (,0) @SUM(F20..F30)
G:G31: {B} (,0) @SUM(G20..G30)
G:H31: {B} (,0) @SUM(H20..H30)
G:I31: {B} (,0) @SUM(I20..I30)
G:J31: {B} (,0) @SUM(J20..J30)
G:K31: {B} (,0) @SUM(K20..K30)
G:L31: {B} (,0) @SUM(L20..L30)
G:M31: {B} (,0) @SUM(M20..M30)
G:N31: {B} (,0) @SUM(N20..N30)
G:O31: {B} (,0) @SUM(O20..O30)
G:A38: +$A:A1
G:B38: 'REV
G:C38: 'MONTHLY REPORTING MODEL
G:F38: 'GLW SOFTWARE PTY LTD
G:A39: (D4) @NOW
G:C39: 'MATRIX ACCOUNTING AND FORECASTING   Version 1.1
G:A40: {DUTCH8} '(c) GLW SOFTWARE PTY LTD 1995,1996
G:A42: {Bold} @IF($A:A42>"",+$A:A42,"")
G:D42: 1
G:E42: 2
G:F42: 3
G:G42: 4
G:H42: 5
G:I42: 6
```

```
@IF($A:A43>"",+$A:A43,"")
'      JUL
'      AUG
'      SEP
'      OCT
'      NOV
'      DEC
'      JAN
'      FEB
'      MAR
'      APR
'      MAY
'      JUN
@IF($A:A44>"",+$A:A44,"")
@IF($A:B44>"",+$A:B44,"")
@IF(D42>$A:$B$4,"FORECAST","   ACTUAL")
@IF(E42>$A:$B$4,"FORECAST","   ACTUAL")
@IF(F42>$A:$B$4,"FORECAST","   ACTUAL")
@IF(G42>$A:$B$4,"FORECAST","   ACTUAL")
@IF(H42>$A:$B$4,"FORECAST","   ACTUAL")
@IF(I42>$A:$B$4,"FORECAST","   ACTUAL")
@IF(J42>$A:$B$4,"FORECAST","   ACTUAL")
@IF(K42>$A:$B$4,"FORECAST","   ACTUAL")
@IF(L42>$A:$B$4,"FORECAST","   ACTUAL")
@IF(M42>$A:$B$4,"FORECAST","   ACTUAL")
@IF(N42>$A:$B$4,"FORECAST","   ACTUAL")
@IF(O42>$A:$B$4,"FORECAST","   ACTUAL")
@IF($A:A45>"",+$A:A45,"")
F($A:B45>"",+$A:B45,"")
@IF($A:A46>"",+$A:A46,"")
A47>"",+$A:A47,"")
:D47..F:D47)
:E47..F:E47)
:F47..F:F47)
:G47..F:G47)
:H47..F:H47)
:I47..F:I47)
:J47..F:J47)
:K47..F:K47)
:L47..F:L47)
:M47..F:M47)
:N47..F:N47)
:O47..F:O47)
:A48>"",+$A:A48,"")
:D48..F:D48)
:E48..F:E48)
:F48..F:F48)
:G48..F:G48)
:H48..F:H48)
:I48..F:I48)
:J48..F:J48)
:K48..F:K48)
:L48..F:L48)
:M48..F:M48)
:N48..F:N48)
:O48..F:O48)
:A49>"",+$A:A49,"")
@IF($A:A50>"",+$A:A50,"")
:A51>"",+$A:A51,"")
:D51..F:D51)
:E51..F:E51)
```

```
G:F51: @SUM(A:F51..F:F51)
G:G51: @SUM(A:G51..F:G51)
G:H51: @SUM(A:H51..F:H51)
G:I51: @SUM(A:I51..F:I51)
G:J51: @SUM(A:J51..F:J51)
G:K51: @SUM(A:K51..F:K51)
G:L51: @SUM(A:L51..F:L51)
G:M51: @SUM(A:M51..F:M51)
G:N51: @SUM(A:N51..F:N51)
G:O51: @SUM(A:O51..F:O51)
G:A52: @IF($A:A52>"",+$A:A52,"")
G:A53: {Bold} @IF($A:A53>"",+$A:A53,"")
G:A54: @IF($A:A54>"",+$A:A54,"")
G:D54: @SUM(A:D54..F:D54)
G:E54: @SUM(A:E54..F:E54)
G:F54: @SUM(A:F54..F:F54)
G:G54: @SUM(A:G54..F:G54)
G:H54: @SUM(A:H54..F:H54)
G:I54: @SUM(A:I54..F:I54)
G:J54: @SUM(A:J54..F:J54)
G:K54: @SUM(A:K54..F:K54)
G:L54: @SUM(A:L54..F:L54)
G:M54: @SUM(A:M54..F:M54)
G:N54: @SUM(A:N54..F:N54)
G:O54: @SUM(A:O54..F:O54)
G:A55: @IF($A:A55>"",+$A:A55,"")
G:D55: @SUM(A:D55..F:D55)
G:E55: @SUM(A:E55..F:E55)
G:F55: @SUM(A:F55..F:F55)
G:G55: @SUM(A:G55..F:G55)
G:H55: @SUM(A:H55..F:H55)
G:I55: @SUM(A:I55..F:I55)
G:J55: @SUM(A:J55..F:J55)
G:K55: @SUM(A:K55..F:K55)
G:L55: @SUM(A:L55..F:L55)
G:M55: @SUM(A:M55..F:M55)
G:N55: @SUM(A:N55..F:N55)
G:O55: @SUM(A:O55..F:O55)
G:A56: @IF($A:A56>"",+$A:A56,"")
G:D56: @SUM(A:D56..F:D56)
G:E56: @SUM(A:E56..F:E56)
G:F56: @SUM(A:F56..F:F56)
G:G56: @SUM(A:G56..F:G56)
G:H56: @SUM(A:H56..F:H56)
G:I56: @SUM(A:I56..F:I56)
G:J56: @SUM(A:J56..F:J56)
G:K56: @SUM(A:K56..F:K56)
G:L56: @SUM(A:L56..F:L56)
G:M56: @SUM(A:M56..F:M56)
G:N56: @SUM(A:N56..F:N56)
G:O56: @SUM(A:O56..F:O56)
G:A57: @IF($A:A57>"",+$A:A57,"")
G:D57: @SUM(A:D57..F:D57)
G:E57: @SUM(A:E57..F:E57)
G:F57: @SUM(A:F57..F:F57)
G:G57: @SUM(A:G57..F:G57)
G:H57: @SUM(A:H57..F:H57)
G:I57: @SUM(A:I57..F:I57)
G:J57: @SUM(A:J57..F:J57)
G:K57: @SUM(A:K57..F:K57)
G:L57: @SUM(A:L57..F:L57)
G:M57: @SUM(A:M57..F:M57)
G:N57: @SUM(A:N57..F:N57)
G:O57: @SUM(A:O57..F:O57)
G:A58: @IF($A:A58>"",+$A:A58,"")
G:A59: @IF($A:A59>"",+$A:A59,"")
G:A60: {Bold} @IF($A:A60>"",+$A:A60,"")
```

```
 @IF($A:A61>"",+$A:A61,"")
:A62>"",+$A:A62,"")
:A63>"",+$A:A63,"")
:A64>"",+$A:A64,"")
 @IF($A:A65>"",+$A:A65,"")
:A66>"",+$A:A66,"")
:A67>"",+$A:A67,"")
:A68>"",+$A:A68,"")
 @IF($A:A69>"",+$A:A69,"")
:A70>"",+$A:A70,"")
:A71>"",+$A:A71,"")
 @IF($A:A72>"",+$A:A72,"")
:A73>"",+$A:A73,"")
:A74>"",+$A:A74,"")
:A75>"",+$A:A75,"")
:A76>"",+$A:A76,"")
47..D57)
47..E57)
47..F57)
47..G57)
47..H57)
47..I57)
47..J57)
47..K57)
47..L57)
47..M57)
47..N57)
47..O57)
:A77>"",+$A:A77,"")
:A78>"",+$A:A78,"")
:A79>"",+$A:A79,"")

TA
LY REPORTING MODEL
$4
NOW
X ACCOUNTING AND FORECASTING Version 1.1
$5

T DATA
JUL
AUG
SEP
OCT
NOV
DEC
JAN
FEB
MAR
APR
MAY
JUN
'
{B} '(c) GLW SOFTWARE PTY LTD 1995,1996
'4>$A:$B$4,"FORECAST","   ACTUAL")
'4>$A:$B$4,"FORECAST","   ACTUAL")
```

```
G:F96: @IF(F94>$A:$B$4,"FORECAST","   ACTUAL")
G:G96: @IF(G94>$A:$B$4,"FORECAST","   ACTUAL")
G:H96: @IF(H94>$A:$B$4,"FORECAST","   ACTUAL")
G:I96: @IF(I94>$A:$B$4,"FORECAST","   ACTUAL")
G:J96: @IF(J94>$A:$B$4,"FORECAST","   ACTUAL")
G:K96: @IF(K94>$A:$B$4,"FORECAST","   ACTUAL")
G:L96: @IF(L94>$A:$B$4,"FORECAST","   ACTUAL")
G:M96: @IF(M94>$A:$B$4,"FORECAST","   ACTUAL")
G:N96: @IF(N94>$A:$B$4,"FORECAST","   ACTUAL")
G:O96: @IF(O94>$A:$B$4,"FORECAST","   ACTUAL")
G:Q96: '  FOR YEAR
G:D97: {Bold} @IF(D$17>($A:$B$4)," ","AAAAAAAAA")
G:E97: {Bold} @IF(E$17>($A:$B$4)," ","AAAAAAAAA")
G:F97: {Bold} @IF(F$17>($A:$B$4)," ","AAAAAAAAA")
G:G97: {Bold} @IF(G$17>($A:$B$4)," ","AAAAAAAAA")
G:H97: {Bold} @IF(H$17>($A:$B$4)," ","AAAAAAAAA")
G:I97: {Bold} @IF(I$17>($A:$B$4)," ","AAAAAAAAA")
G:J97: {Bold} @IF(J$17>($A:$B$4)," ","AAAAAAAAA")
G:K97: {Bold} @IF(K$17>($A:$B$4)," ","AAAAAAAAA")
G:L97: {Bold} @IF(L$17>($A:$B$4)," ","AAAAAAAAA")
G:M97: {Bold} @IF(M$17>($A:$B$4)," ","AAAAAAAAA")
G:N97: {Bold} @IF(N$17>($A:$B$4)," ","AAAAAAAAA")
G:O97: {Bold} @IF(O$17>($A:$B$4)," ","AAAAAAAAA")
G:A98: 'OPERATIONS
G:A99: 'Units sold
G:D99: +D21
G:E99: +E21
G:F99: +F21
G:G99: +G21
G:H99: +H21
G:I99: +I21
G:J99: +J21
G:K99: +K21
G:L99: +L21
G:M99: +M21
G:N99: +N21
G:O99: +O21
G:Q99: @SUM(D99..O99)
G:A100: 'Stocks Held
G:D100: +H:D28
G:E100: +H:E28
G:F100: +H:F28
G:G100: +H:G28
G:H100: +H:H28
G:I100: +H:I28
G:J100: +H:J28
G:K100: +H:K28-
G:L100: +H:L28
G:M100: +H:M28
G:N100: +H:N28
G:O100: +H:O28
G:Q100: +O100
G:A103: 'REVENUE
G:A104: 'Sales & Other Income
G:D104: {B} -@SUM(D47..D48)
G:E104: {B} -@SUM(E47..E48)
G:F104: {B} -@SUM(F47..F48)
G:G104: {B} -@SUM(G47..G48)
G:H104: {B} -@SUM(H47..H48)
G:I104: {B} -@SUM(I47..I48)
G:J104: {B} -@SUM(J47..J48)
G:K104: {B} -@SUM(K47..K48)
G:L104: {B} -@SUM(L47..L48)
G:M104: {B} -@SUM(M47..M48)
G:N104: {B} -@SUM(N47..N48)
G:O104: {B} -@SUM(O47..O48)
G:Q104: {B} @SUM(D104..O104)
```

```
 OF SALES
iases
)51
351
?51
351
I51
[51
J51
K51
L51
M51
N51
O51
SUM(D107..O107)
S PROFIT
D104-D107
E104-E107
F104-F107
G104-G107
H104-H107
I104-I107
J104-J107
K104-K107
L104-L107
M104-M107
N104-N107
O104-O107
SUM(D110..O110)
 Revenue
@IF(D104>0,D110/D104,"")
@IF(E104>0,E110/E104,"")
@IF(F104>0,F110/F104,"")
@IF(G104>0,G110/G104,"")
@IF(H104>0,H110/H104,"")
@IF(I104>0,I110/I104,"")
@IF(J104>0,J110/J104,"")
@IF(K104>0,K110/K104,"")
@IF(L104>0,L110/L104,"")
@IF(M104>0,M110/M104,"")
@IF(N104>0,N110/N104,"")
@IF(O104>0,O110/O104,"")
@IF(Q104>0,Q110/Q104,"")
NISTRATION EXPENSES
rtising

(D114..O114)
eciation
```

```
G:L115: +L55
G:M115: +M55
G:N115: +N55
G:O115: +O55
G:Q115: @SUM(D115..O115)
G:A116: 'Wages
G:D116: {B} +D56
G:E116: {B} +E56
G:F116: {B} +F56
G:G116: {B} +G56
G:H116: {B} +H56
G:I116: {B} +I56
G:J116: {B} +J56
G:K116: {B} +K56
G:L116: {B} +L56
G:M116: {B} +M56
G:N116: {B} +N56
G:O116: {B} +O56
G:Q116: {B} @SUM(D116..O116)
G:D117: {B} @SUM(D114..D116)
G:E117: {B} @SUM(E114..E116)
G:F117: {B} @SUM(F114..F116)
G:G117: {B} @SUM(G114..G116)
G:H117: {B} @SUM(H114..H116)
G:I117: {B} @SUM(I114..I116)
G:J117: {B} @SUM(J114..J116)
G:K117: {B} @SUM(K114..K116)
G:L117: {B} @SUM(L114..L116)
G:M117: {B} @SUM(M114..M116)
G:N117: {B} @SUM(N114..N116)
G:O117: {B} @SUM(O114..O116)
G:Q117: {B} @SUM(D117..O117)
G:A120: 'NET PROFIT(LOSS)
G:D120: {B} +D110-D117
G:E120: {B} +E110-E117
G:F120: {B} +F110-F117
G:G120: {B} +G110-G117
G:H120: {B} +H110-H117
G:I120: {B} +I110-I117
G:J120: {B} +J110-J117
G:K120: {B} +K110-K117
G:L120: {B} +L110-L117
G:M120: {B} +M110-M117
G:N120: {B} +N110-N117
G:O120: {B} +O110-O117
G:Q120: {B} @SUM(D120..O120)
G:L135: '
G:M135: '
G:N135: '
G:L136: '
G:M136: '
G:N136: '
G:L137: '
G:M137: '
G:N137: '
G:L138: '
G:M138: '
G:N138: '
G:L139: {Bold} '
G:M139: {Bold} '
G:N139: {Bold} '
G:L140: '
G:M140: '
G:N140: '
G:L144: {Bold} '
G:M144: {Bold} '
G:N144: {Bold} '
```

```
1/1} 'G\PATEX
} 'ONE
SWISS14 Bold} +$A:$B$6
Bold} (,0) +$A:$C$4
Bold} (,0) +$A:$B$5
} (D4) @NOW
mple of One page monthly operations/financial report ]
(,0) '            CURRENT MONTH
'                   FULL YEAR
Bold LB} 'OPERATIONS STATEMENT
(,0) ^ACTUAL
,0} ^BUDGET
,0} ^DIFF
COMMENT ON CURRENT MONTH
(,0) 'FORECAST
(,0} ^BUDGET
(,0) ^DIFF
e L} 'Sales: No. of Units
(,0} @INDEX(G:$A$1..$Z$161,$A:$B$4+2,@ROWS(G:$A$1..A99)-1)
(,0} @INDEX(O:$A$1..O:$Z$161,$A:$B$4+2,@ROWS(O:$A$1..A99)-1)
(,0} +D173-E173
(,0} ' Sales quantities 13% up due to customer exports
(,0} +Q99
(,0} +O:Q99
(,0) +M173-N173
e L} 'Stocks held
(,0} @INDEX(G:$A$1..$Z$161,$A:$B$4+2,@ROWS(G:$A$1..A100)-1)
(,0} @INDEX(O:$A$1..O:$Z$161,$A:$B$4+2,@ROWS(O:$A$1..A100)-1)
(,0} +D174-E174
(P2} ' On budget
(,0} +Q100
(,0} +O:Q100
(,0) +M174-N174
(P2) '            CURRENT MONTH
} '                 FULL YEAR
e Bold LB} 'PROFIT STATEMENT
} (P2) ^ACTUAL
(P2) ^BUDGET
(P2) ^DIFF
(P2) 'COMMENT ON CURRENT MONTH
} (,0) 'FORECAST
(P2) ^BUDGET
} (P2) ^DIFF
```

```
G:A178: {Page L} 'SALES and other Income
G:D178: {LB} (,0) @INDEX(G:$A$1..$Z$161,$A:$B$4+2,@ROWS(G:$A$1..A104)-1)
G:E178: {LB} @INDEX(O:$A$1..O:$Z$161,$A:$B$4+2,@ROWS(O:$A$1..A104)-1)
G:F178: {LB} +D178-E178
G:G178: {L} ' Reflects 13% higher quantities at constant prices
G:M178: {LB} (,0) +Q104
G:N178: {LB} +O:Q104
G:O178: {LRB} +M178-N178
G:A179: {Page L} ' Cost of Sales
G:D179: {LB} (,0) @INDEX(G:$A$1..$Z$161,$A:$B$4+2,@ROWS(G:$A$1..A107)-1)
G:E179: {LB} @INDEX(O:$A$1..O:$Z$161,$A:$B$4+2,@ROWS(O:$A$1..A107)-1)
G:F179: {LB} +D179-E179
G:G179: {L} ' Purchase unit cost up with supply shortage: $40 actual vs $30 budget
G:M179: {LB} (,0) +Q107
G:N179: {LB} +O:Q107
G:O179: {LRB} +M179-N179
G:A180: {Page L} 'GROSS PROFIT
G:D180: {LB} +D178-D179
G:E180: {LB} +E178-E179
G:F180: {LB} +F178-F179
G:M180: {LB} +M178-M179
G:N180: {LB} +N178-N179
G:O180: {LRB} +O178-O179
G:A181: {Page L} '                    % to Sales Revenue
G:D181: {L} (P2) @IF(D178>0,D180/D178,"")
G:E181: {L} (P2) @IF(E178>0,E180/E178,"")
G:F181: {L} (P2) +D181-E181
G:G181: {L} ' Decline in margin: higher unit purchase cost not recovered in sale price
G:M181: {L} (P2) @IF(M178>0,M180/M178,"")
G:N181: {L} (P2) @IF(N178>0,N180/N178,"")
G:O181: {LR} (P2) +M181-N181
G:A183: {Page L} ' Administration Expenses
G:D183: {LB} (,0) @INDEX(G:$A$1..$Z$161,$A:$B$4+2,@ROWS(G:$A$1..A117)-1)
G:E183: {LB} @INDEX(O:$A$1..O:$Z$161,$A:$B$4+2,@ROWS(O:$A$1..A117)-1)
G:F183: {LB} +D183-E183
G:G183: {L} ' Advertising costs $300 vs $200 budget for month
G:M183: {LB} (,0) +Q117
G:N183: {LB} +O:Q117
G:O183: {LRB} +M183-N183
G:A185: {Page L} 'NET PROFIT
G:D185: {LB} +D180-D183
G:E185: {LB} +E180-E183
G:F185: {LB} +F180-F183
G:G185: {L} ' Lower net profit on higher volumes sold due to lower margin
G:M185: {LB} +M180-M183
G:N185: {LB} +N180-N183
G:O185: {LRB} +O180-O183
G:E186: {DUTCH8 B} '(c) GLW SOFTWARE PTY LTD 1995,1996
G:A207: {Page Bold U1 LT} 'TREND COMMENTS:
G:A208: {Page L} 'OPERATIONS
G:E208: 'GROSS PROFIT MARGIN % TO SALES
G:I208: 'NET PROFIT
G:M208: 'CASH AT BANK
G:A209: {Page L} '  *  Sales of units 13% up
G:E209: '  *  Higher purchase costs all year
G:I209: '  *  Increase in total profit through year
G:M209: '  *  Increasing gap below budget
G:A210: {Page L} '  *  Workforce constant
G:E210: '  *  Unit purcahse cost up 33% to $40
G:I210: '  *  Sales of units up at lower margin
G:M210: '  *  Debtors constantly slow paying
G:A211: {Page L} '  *  Productivity up 13%
G:E211: '  *  Constant sale price all year
G:M211: '  *  Cash inadequate to fund fixed
G:A212: {Page L} '  *  Zero stocks held: on budget
G:E212: '  *  Margin down for full year
G:M212: '      asset purchase budgeted for
```

```
H:A1: +$A:A1
H:C1: 'MONTHLY REPORTING MODEL
H:A2: (D4) +$A:A2
H:C2: 'MATRIX ACCOUNTING AND FORECASTING (MAP)
H:C3: 'Version
H:D3: (F2) +$A:$D$3
H:B3: '     SUPPLIER:
H:A4: +$A:A4
H:B4: {LRTB} +$A:$B$4
H:C4: +$A:$C$4
H:E4: 'GLW SOFTWARE PTY LTD
H:A5: +$A:A5
H:B5: {LRB} +$A:$B$5
H:E5: 'Level 2,   53 Queen St
H:A6: +$A:A6
H:B6: {LB} +$A:$B$6
H:E6: {L} 'Melbourne VIC 3000
H:E7: 'AUSTRALIA
H:E8: 'Telephone
H:F8: '(03) 9629 7448
H:E9: 'Facsimile
H:F9: '(03) 9629 7464
H:A10: 'SHEET:
H:B10: 'CLOSE
H:A14: +$A:A1
H:B14: 'OPER
H:C14: 'MONTHLY REPORTING MODEL
H:A15: (D4) @NOW
H:C15: 'REVENUE BASED SYSTEM WITH BUDGETS
H:A16: {DUTCH8} '(c) GLW SOFTWARE PTY LTD 1995,1996
H:A17: {Bold} @IF($A:A17>"",+$A:A17,"")
H:D17: 1
H:E17: 2
H:F17: 3
H:G17: 4
H:H17: 5
H:I17: 6
H:J17: 7
H:K17: 8
H:L17: 9
H:M17: 10
H:N17: 11
H:O17: 12
H:A18: {Bold} @IF($A:A18>"",+$A:A18,"")
H:D18: {Bold} '     JUL
H:E18: {Bold} '     AUG
H:F18: {Bold} '     SEP
H:G18: {Bold} '     OCT
H:H18: {Bold} '     NOV
H:I18: {Bold} '     DEC
H:J18: {Bold} '     JAN
H:K18: {Bold} '     FEB
H:L18: {Bold} '     MAR
H:M18: {Bold} '     APR
H:N18: {Bold} '     MAY
H:O18: {Bold} '     JUN
H:A19: {Bold} @IF($A:A19>"",+$A:A19,"")
H:D19: {Bold} @IF(D17>$A:$B$4,"FORECAST","   ACTUAL")
H:E19: {Bold} @IF(E17>$A:$B$4,"FORECAST","   ACTUAL")
H:F19: {Bold} @IF(F17>$A:$B$4,"FORECAST","   ACTUAL")
H:G19: {Bold} @IF(G17>$A:$B$4,"FORECAST","   ACTUAL")
H:H19: {Bold} @IF(H17>$A:$B$4,"FORECAST","   ACTUAL")
H:I19: {Bold} @IF(I17>$A:$B$4,"FORECAST","   ACTUAL")
H:J19: {Bold} @IF(J17>$A:$B$4,"FORECAST","   ACTUAL")
H:K19: {Bold} @IF(K17>$A:$B$4,"FORECAST","   ACTUAL")
H:L19: {Bold} @IF(L17>$A:$B$4,"FORECAST","   ACTUAL")
H:M19: {Bold} @IF(M17>$A:$B$4,"FORECAST","   ACTUAL")
```

```
IF(N17>$A:$B$4,"FORECAST","   ACTUAL")
IF(O17>$A:$B$4,"FORECAST","   ACTUAL")
20>"",+$A:A20,"")
21>"",+$A:A21,"")
22>"",+$A:A22,"")
23>"",+$A:A23,"")
24>"",+$A:A24,"")
25>"",+$A:A25,"")
IF($A:A26>"",+$A:A26,"")
IF($A:A27>"",+$A:A27,"")
28>"",+$A:A28,"")

M(A:D28..F:D28)
M(A:E28..F:E28)
M(A:F28..F:F28)
M(A:G28..F:G28)
UM(A:H28..F:H28)
UM(A:I28..F:I28)
UM(A:J28..F:J28)
UM(A:K28..F:K28)
UM(A:L28..F:L28)
UM(A:M28..F:M28)
UM(A:N28..F:N28)
UM(A:O28..F:O28)
A29>"",+$A:A29,"")
A30>"",+$A:A30,"")
A31>"",+$A:A31,"")
) @SUM(C20..C30)
) @SUM(D20..D30)
) @SUM(E20..E30)
) @SUM(F20..F30)
) @SUM(G20..G30)
) @SUM(H20..H30)
) @SUM(I20..I30)
) @SUM(J20..J30)
) @SUM(K20..K30)
) @SUM(L20..L30)
) @SUM(M20..M30)
) @SUM(N20..N30)
) @SUM(O20..O30)


LY REPORTING MODEL
OFTWARE PTY LTD
NOW
X ACCOUNTING AND FORECASTING   Version 1.1
8} '(c) GLW SOFTWARE PTY LTD 1995,1996
 @IF($A:A42>"",+$A:A42,"")




 @IF($A:A43>"",+$A:A43,"")
 '      JUL
 '      AUG
 '      SEP
 '      OCT
 '      NOV
 '      DEC
```

(C)GLW SOFWARE PTY LTD 1995,1996

```
H:J43: {Bold} '      JAN
H:K43: {Bold} '      FEB
H:L43: {Bold} '      MAR
H:M43: {Bold} '      APR
H:N43: {Bold} '      MAY
H:O43: {Bold} '      JUN
H:A44: {Bold} @IF($A:A44>"",+$A:A44,"")
H:B44: {Bold} @IF($A:B44>"",+$A:B44,"")
H:D44: {Bold} @IF(D42>$A:$B$4,"FORECAST","   ACTUAL")
H:E44: {Bold} @IF(E42>$A:$B$4,"FORECAST","   ACTUAL")
H:F44: {Bold} @IF(F42>$A:$B$4,"FORECAST","   ACTUAL")
H:G44: {Bold} @IF(G42>$A:$B$4,"FORECAST","   ACTUAL")
H:H44: {Bold} @IF(H42>$A:$B$4,"FORECAST","   ACTUAL")
H:I44: {Bold} @IF(I42>$A:$B$4,"FORECAST","   ACTUAL")
H:J44: {Bold} @IF(J42>$A:$B$4,"FORECAST","   ACTUAL")
H:K44: {Bold} @IF(K42>$A:$B$4,"FORECAST","   ACTUAL")
H:L44: {Bold} @IF(L42>$A:$B$4,"FORECAST","   ACTUAL")
H:M44: {Bold} @IF(M42>$A:$B$4,"FORECAST","   ACTUAL")
H:N44: {Bold} @IF(N42>$A:$B$4,"FORECAST","   ACTUAL")
H:O44: {Bold} @IF(O42>$A:$B$4,"FORECAST","   ACTUAL")
H:A45: {Bold} @IF($A:A45>"",+$A:A45,"")
H:B45: (F0) @IF($A:B45>"",+$A:B45,"")
H:A46: {Bold} @IF($A:A46>"",+$A:A46,"")
H:A47: @IF($A:A47>"",+$A:A47,"")
H:A48: @IF($A:A48>"",+$A:A48,"")
H:A49: @IF($A:A49>"",+$A:A49,"")
H:A50: {Bold} @IF($A:A50>"",+$A:A50,"")
H:A51: @IF($A:A51>"",+$A:A51,"")
H:A52: @IF($A:A52>"",+$A:A52,"")
H:A53: {Bold} @IF($A:A53>"",+$A:A53,"")
H:A54: @IF($A:A54>"",+$A:A54,"")
H:A55: @IF($A:A55>"",+$A:A55,"")
H:A56: @IF($A:A56>"",+$A:A56,"")
H:A57: @IF($A:A57>"",+$A:A57,"")
H:A58: @IF($A:A58>"",+$A:A58,"")
H:A59: @IF($A:A59>"",+$A:A59,"")
H:A60: {Bold} @IF($A:A60>"",+$A:A60,"")
H:A61: {Bold} @IF($A:A61>"",+$A:A61,"")
H:C61: (F0) +P:C61
H:A62: @IF($A:A62>"",+$A:A62,"")
H:C62: (,0) +P:C62
H:D62: +C62+@SUM(A:D62..F:D62)
H:E62: +D62+@SUM(A:E62..F:E62)
H:F62: +E62+@SUM(A:F62..F:F62)
H:G62: +F62+@SUM(A:G62..F:G62)
H:H62: +G62+@SUM(A:H62..F:H62)
H:I62: +H62+@SUM(A:I62..F:I62)
H:J62: +I62+@SUM(A:J62..F:J62)
H:K62: +J62+@SUM(A:K62..F:K62)
H:L62: +K62+@SUM(A:L62..F:L62)
H:M62: +L62+@SUM(A:M62..F:M62)
H:N62: +M62+@SUM(A:N62..F:N62)
H:O62: +N62+@SUM(A:O62..F:O62)
H:A63: @IF($A:A63>"",+$A:A63,"")
H:C63: (,0) +P:C63
H:D63: +C63+@SUM(A:D63..F:D63)
H:E63: +D63+@SUM(A:E63..F:E63)
H:F63: +E63+@SUM(A:F63..F:F63)
H:G63: +F63+@SUM(A:G63..F:G63)
H:H63: +G63+@SUM(A:H63..F:H63)
H:I63: +H63+@SUM(A:I63..F:I63)
H:J63: +I63+@SUM(A:J63..F:J63)
H:K63: +J63+@SUM(A:K63..F:K63)
H:L63: +K63+@SUM(A:L63..F:L63)
H:M63: +L63+@SUM(A:M63..F:M63)
H:N63: +M63+@SUM(A:N63..F:N63)
H:O63: +N63+@SUM(A:O63..F:O63)
```

```
\64>"",+$A:A64,"")
!IF($A:A65>"",+$A:A65,"")
\66>"",+$A:A66,"")
:C66
JM(A:D66..P:D66)
JM(A:E66..P:E66)
JM(A:F66..P:F66)
JM(A:G66..P:G66)
JM(A:H66..P:H66)
JM(A:I66..P:I66)
JM(A:J66..P:J66)
JM(A:K66..P:K66)
JM(A:L66..P:L66)
JM(A:M66..P:M66)
JM(A:N66..P:N66)
JM(A:O66..P:O66)
\67>"",+$A:A67,"")
:C67
JM(A:D67..P:D67)
JM(A:E67..P:E67)
JM(A:F67..P:F67)
JM(A:G67..P:G67)
JM(A:H67..P:H67)
JM(A:I67..P:I67)
UM(A:J67..P:J67)
UM(A:K67..P:K67)
UM(A:L67..P:L67)
UM(A:M67..P:M67)
UM(A:N67..P:N67)
UM(A:O67..P:O67)
A68>"",+$A:A68,"")
@IF($A:A69>"",+$A:A69,"")
A70>"",+$A:A70,"")
:C70
UM(A:D70..P:D70)
UM(A:E70..P:E70)
UM(A:F70..P:F70)
UM(A:G70..P:G70)
UM(A:H70..P:H70)
UM(A:I70..P:I70)
UM(A:J70..P:J70)
UM(A:K70..P:K70)
UM(A:L70..P:L70)
UM(A:M70..P:M70)
UM(A:N70..P:N70)
UM(A:O70..P:O70)
A71>"",+$A:A71,"")
@IF($A:A72>"",+$A:A72,"")
A73>"",+$A:A73,"")
:C73
UM(A:D73..P:D73)
UM(A:E73..P:E73)
UM(A:F73..P:F73)
UM(A:G73..P:G73)
UM(A:H73..P:H73)
UM(A:I73..P:I73)
UM(A:J73..P:J73)
UM(A:K73..P:K73)
UM(A:L73..P:L73)
UM(A:M73..P:M73)
UM(A:N73..P:N73)
UM(A:O73..P:O73)
A74>"",+$A:A74,"")
:C74
UM(A:D74..P:D74)
UM(A:E74..P:E74)
UM(A:F74..P:F74)
```

```
H:G74: +F74+@SUM(A:G74..P:G74)
H:H74: +G74+@SUM(A:H74..P:H74)
H:I74: +H74+@SUM(A:I74..P:I74)
H:J74: +I74+@SUM(A:J74..P:J74)
H:K74: +J74+@SUM(A:K74..P:K74)
H:L74: +K74+@SUM(A:L74..P:L74)
H:M74: +L74+@SUM(A:M74..P:M74)
H:N74: +M74+@SUM(A:N74..P:N74)
H:O74: +N74+@SUM(A:O74..P:O74)
H:A75: @IF($A:A75>"",+$A:A75,"")
H:C75: (,0) +P:C75
H:D75: +C75+@SUM(A:D75..P:D75)
H:E75: +D75+G:D76
H:F75: +E75+G:E76
H:G75: +F75+G:F76
H:H75: +G75+G:G76
H:I75: +H75+G:H76
H:J75: +I75+G:I76
H:K75: +J75+G:J76
H:L75: +K75+G:K76
H:M75: +L75+G:L76
H:N75: +M75+G:M76
H:O75: +N75+G:N76
H:A76: @IF($A:A76>"",+$A:A76,"")
H:C76: (,0) +P:C76
H:D76: +C76+@SUM(A:D76..G:D76)
H:E76: +G:E76
H:F76: +G:F76
H:G76: +G:G76
H:H76: +G:H76
H:I76: +G:I76
H:J76: +G:J76
H:K76: +G:K76
H:L76: +G:L76
H:M76: +G:M76
H:N76: +G:N76
H:O76: +G:O76
H:A77: @IF($A:A77>"",+$A:A77,"")
H:A78: @IF($A:A78>"",+$A:A78,"")
H:C78: (B) @SUM(C47..C76)
H:D78: @SUM(D47..D76)
H:E78: @SUM(E47..E76)
H:F78: @SUM(F47..F76)
H:G78: @SUM(G47..G76)
H:H78: @SUM(H47..H76)
H:I78: @SUM(I47..I76)
H:J78: @SUM(J47..J76)
H:K78: @SUM(K47..K76)
H:L78: @SUM(L47..L76)
H:M78: @SUM(M47..M76)
H:N78: @SUM(N47..N76)
H:O78: @SUM(O47..O76)
H:A79: @IF($A:A79>"",+$A:A79,"")
H:A134: +$A:A1
H:B134: 'BALDATA
H:D134: 'MONTHLY REPORTING MODEL
H:H134: +$A:$C$4
H:I134: 'GLW SOFTWARE PTY LTD
H:A135: (D4) @NOW
H:D135: 'MATRIX ACCOUNTING AND FORECASTING
H:H135: +$A:$B$5
H:A137: {DUTCH8} '(c) GLW SOFTWARE PTY LTD 1995,1996
H:D137: 1
H:E137: 2
H:F137: 3
H:G137: 4
H:H137: 5
```

```
Prev
JUL
AUG
SEP
OCT
NOV
DEC
JAN
FEB
MAR
AFR
MAY
JUN
'END YEAR BALANCES:
Year
} @IF(D$17>($A:$B$4),' ',"AAAAAAAA")
} @IF(E$17>($A:$B$4),' ',"AAAAAAAA")
} @IF(F$17>($A:$B$4),' ',"AAAAAAAA")
} @IF(G$17>($A:$B$4),' ',"AAAAAAAA")
} @IF(H$17>($A:$B$4),' ',"AAAAAAAA")
} @IF(I$17>($A:$B$4),' ',"AAAAAAAA")
} @IF(J$17>($A:$B$4),' ',"AAAAAAAA")
} @IF(K$17>($A:$B$4),' ',"AAAAAAAA")
} @IF(L$17>($A:$B$4),' ',"AAAAAAAA")
} @IF(M$17>($A:$B$4),' ',"AAAAAAAA")
} @IF(N$17>($A:$B$4),' ',"AAAAAAAA")
} @IF(O$17>($A:$B$4),' ',"AAAAAAAA")
'HOLDINGS

D28
E28
F28
G28
-H28
-I28
-J28
-K28
-L28
-M28
-N28
+O28
ETS
le Debtors

h at Bank
```

```
H:P146: +P63
H:G146: +G63
H:H146: +H63
H:I146: +I63
H:J146: +J63
H:K146: +K63
H:L146: +L63
H:M146: +M63
H:N146: +N63
H:O146: +O63
H:A147: 'Fixed Assets at Cost
H:C147: +C66
H:D147: +D66
H:E147: +E66
H:F147: +F66
H:G147: +G66
H:H147: +H66
H:I147: +I66
H:J147: +J66
H:K147: +K66
H:L147: +L66
H:M147: +M66
H:N147: +N66
H:O147: +O66
H:A148: 'Depreciation Provision
H:C148: +C67
H:D148: +D67
H:E148: +E67
H:F148: +F67
H:G148: +G67
H:H148: +H67
H:I148: +I67
H:J148: +J67
H:K148: +K67
H:L148: +L67
H:M148: +M67
H:N148: +N67
H:O148: +O67
H:C151: @SUM(C144..C150)
H:D151: {B} @SUM(D144..D150)
H:E151: {B} @SUM(E144..E150)
H:F151: {B} @SUM(F144..F150)
H:G151: {B} @SUM(G144..G150)
H:H151: {B} @SUM(H144..H150)
H:I151: {B} @SUM(I144..I150)
H:J151: {B} @SUM(J144..J150)
H:K151: {B} @SUM(K144..K150)
H:L151: {B} @SUM(L144..L150)
H:M151: {B} @SUM(M144..M150)
H:N151: {B} @SUM(N144..N150)
H:O151: {B} @SUM(O144..O150)
H:A152: 'LIABILITIES
H:A153: 'Trade Creditors
H:C153: -C70
H:D153: -D70
H:E153: -E70
H:F153: -F70
H:G153: -G70
H:H153: -H70
H:I153: -I70
H:J153: -J70
H:K153: -K70
H:L153: -L70
H:M153: -M70
H:N153: -N70
H:O153: -O70
H:A155: 'Share Capital
```

H:O160: {B} @SUM(O153..O159)

res ned Earnings it Current Year

```
(C153..C159)
@SUM(D153..D159)
@SUM(E153..E159)
@SUM(F153..F159)
@SUM(G153..G159)
@SUM(H153..H159)
@SUM(I153..I159)
@SUM(J153..J159)
@SUM(K153..K159)
@SUM(L153..L159)
@SUM(M153..M159)
@SUM(N153..N159)
```

```
REPORTING MODEL
A2
CCOUNTING AND FORECASTING (MAF)

$D$3
PLIER:

A:$B$4

WARE PTY LTD

.:$B$5
  53 Queen St

$B$6
ourne VIC 3000
A
e
9 7448
e
9 7464

' REPORTING MODEL
W
3 BASED SYSTEM WITH BUDGETS
 '(c) GLW SOFTWARE PTY LTD 1995,1996
@IF($A:A17>"",+$A:A17,"")

@IF($A:A18>"",+$A:A18,"")
'    JUL
'    AUG
'    SEP
'    OCT
'    NOV
'    DEC
'    JAN
'    FEB
'    MAR
'    APR
'    MAY
'    JUN
@IF($A:A19>"",+$A:A19,"")
@IF(D17>$A:$B$4,"FORECAST","  ACTUAL")
@IF(E17>$A:$B$4,"FORECAST","  ACTUAL")
@IF(F17>$A:$B$4,"FORECAST","  ACTUAL")
@IF(G17>$A:$B$4,"FORECAST","  ACTUAL")
@IF(H17>$A:$B$4,"FORECAST","  ACTUAL")
@IF(I17>$A:$B$4,"FORECAST","  ACTUAL")
@IF(J17>$A:$B$4,"FORECAST","  ACTUAL")
@IF(K17>$A:$B$4,"FORECAST","  ACTUAL")
@IF(L17>$A:$B$4,"FORECAST","  ACTUAL")
@IF(M17>$A:$B$4,"FORECAST","  ACTUAL")
```

```
I:N19: {Bold} @IF(N17>$A:$B$4,"FORECAST","  ACTUAL")
I:O19: {Bold} @IF(O17>$A:$B$4,"FORECAST","  ACTUAL")
I:A20: @IF($A:A20>"",+$A:A20,"")
I:A21: @IF($A:A21>"",+$A:A21,"")
I:D21: 300
I:E21: 300
I:F21: 300
I:G21: 300
I:H21: 300
I:I21: 350
I:J21: 350
I:K21: 350
I:L21: 350
I:M21: 350
I:N21: 350
I:O21: 350
I:A22: @IF($A:A22>"",+$A:A22,"")
I:A23: @IF($A:A23>"",+$A:A23,"")
I:A24: @IF($A:A24>"",+$A:A24,"")
I:A25: @IF($A:A25>"",+$A:A25,"")
I:A26: {Bold} @IF($A:A26>"",+$A:A26,"")
I:A27: {Bold} @IF($A:A27>"",+$A:A27,"")
I:A28: @IF($A:A28>"",+$A:A28,"")
I:D28: -D21
I:E28: -E21
I:F28: -F21
I:G28: -G21
I:H28: -H21
I:I28: -I21
I:J28: -J21
I:K28: -K21
I:L28: -L21
I:M28: -M21
I:N28: -N21
I:O28: -O21
I:A29: @IF($A:A29>"",+$A:A29,"")
I:A30: @IF($A:A30>"",+$A:A30,"")
I:A31: @IF($A:A31>"",+$A:A31,"")
I:D31: {B} {,0} @SUM(D20..D30)
I:E31: {B} {,0} @SUM(E20..E30)
I:F31: {B} {,0} @SUM(F20..F30)
I:G31: {B} {,0} @SUM(G20..G30)
I:H31: {B} {,0} @SUM(H20..H30)
I:I31: {B} {,0} @SUM(I20..I30)
I:J31: {B} {,0} @SUM(J20..J30)
I:K31: {B} {,0} @SUM(K20..K30)
I:L31: {B} {,0} @SUM(L20..L30)
I:M31: {B} {,0} @SUM(M20..M30)
I:N31: {B} {,0} @SUM(N20..N30)
I:O31: {B} {,0} @SUM(O20..O30)
I:A38: +$A:A1
I:B38: 'BSALE
I:C38: 'MONTHLY REPORTING MODEL
I:F38: 'GLW SOFTWARE PTY LTD
I:A39: {D4} @NOW
I:C39: 'MATRIX ACCOUNTING AND FORECASTING  Version 1.1
I:A40: {DUTCH8} '(c) GLW SOFTWARE PTY LTD 1995,1996
I:A42: {Bold} @IF($A:A42>"",+$A:A42,"")
I:A43: {Bold} @IF($A:A43>"",+$A:A43,"")
I:D43: {Bold} '    JUL
I:E43: {Bold} '    AUG
I:F43: {Bold} '    SEP
I:G43: {Bold} '    OCT
I:H43: {Bold} '    NOV
I:I43: {Bold} '    DEC
I:J43: {Bold} '    JAN
I:K43: {Bold} '    FEB
```

```
ORTING MODEL
UNTING AND FORECASTING (MAF)
3
ER:
$B$4
RE PTY LTD
3$5
 53 Queen St
$6
rne VIC 3000
7448
7464

REPORTING MODEL
BASED SYSTEM WITH BUDGETS
'(c) GLW SOFTWARE PTY LTD 1995,1996
F($A:A17>"",+$A:A17,"")

IF($A:A18>"",+$A:A18,"")
    JUL
    AUG
    SEP
    OCT
    NOV
    DEC
'   JAN
'   FEB
'   MAR
'   APR
'   MAY
'   JUN
@IF($A:A19>"",+$A:A19,"")
@IF(D17>$A:$B$4,"FORECAST","   ACTUAL")
@IF(E17>$A:$B$4,"FORECAST","   ACTUAL")
@IF(F17>$A:$B$4,"FORECAST","   ACTUAL")
@IF(G17>$A:$B$4,"FORECAST","   ACTUAL")
@IF(H17>$A:$B$4,"FORECAST","   ACTUAL")
@IF(I17>$A:$B$4,"FORECAST","   ACTUAL")
@IF(J17>$A:$B$4,"FORECAST","   ACTUAL")
@IF(K17>$A:$B$4,"FORECAST","   ACTUAL")
@IF(L17>$A:$B$4,"FORECAST","   ACTUAL")
@IF(M17>$A:$B$4,"FORECAST","   ACTUAL")
```

```
J:N19: {Bold} @IF(N17>$A:$B$4,"FORECAST","   ACTUAL")
J:O19: {Bold} @IF(O17>$A:$B$4,"FORECAST","   ACTUAL")
J:A20: @IF($A:A20>"",+$A:A20,"")
J:A21: @IF($A:A21>"",+$A:A21,"")
J:A22: @IF($A:A22>"",+$A:A22,"")
J:A23: @IF($A:A23>"",+$A:A23,"")
J:D23: -300
J:E23: -300
J:F23: -300
J:G23: -300
J:H23: -300
J:I23: -350
J:J23: -350
J:K23: -350
J:L23: -350
J:M23: -350
J:N23: -350
J:O23: -350
J:A24: @IF($A:A24>"",+$A:A24,"")
J:A25: @IF($A:A25>"",+$A:A25,"")
J:A26: {Bold} @IF($A:A26>"",+$A:A26,"")
J:A27: {Bold} @IF($A:A27>"",+$A:A27,"")
J:A28: @IF($A:A28>"",+$A:A28,"")
J:D28: 300
J:E28: 300
J:F28: 300
J:G28: 300
J:H28: 300
J:I28: 350
J:J28: 350
J:K28: 350
J:L28: 350
J:M28: 350
J:N28: 350
J:O28: 350
J:A29: @IF($A:A29>"",+$A:A29,"")
J:A30: @IF($A:A30>"",+$A:A30,"")
J:A31: @IF($A:A31>"",+$A:A31,"")
J:D31: {B} {,0} @SUM(D20..D30)
J:E31: {B} {,0} @SUM(E20..E30)
J:F31: {B} {,0} @SUM(F20..F30)
J:G31: {B} {,0} @SUM(G20..G30)
J:H31: {B} {,0} @SUM(H20..H30)
J:I31: {B} {,0} @SUM(I20..I30)
J:J31: {B} {,0} @SUM(J20..J30)
J:K31: {B} {,0} @SUM(K20..K30)
J:L31: {B} {,0} @SUM(L20..L30)
J:M31: {B} {,0} @SUM(M20..M30)
J:N31: {B} {,0} @SUM(N20..N30)
J:O31: {B} {,0} @SUM(O20..O30)
J:A38: +$A:A1
J:B38: 'BPUR
J:C38: 'MONTHLY REPORTING MODEL
J:F38: 'GLW SOFTWARE PTY LTD
J:A39: {D4} @NOW
J:C39: 'MATRIX ACCOUNTING AND FORECASTING   Version 1.1
J:A40: {DUTCH8} '(c) GLW SOFTWARE PTY LTD 1995,1996
J:A42: {Bold} @IF($A:A42>"",+$A:A42,"")
J:A43: {Bold} @IF($A:A43>"",+$A:A43,"")
J:D43: {Bold} '    JUL
J:E43: {Bold} '    AUG
J:F43: {Bold} '    SEP
J:G43: {Bold} '    OCT
J:H43: {Bold} '    NOV
J:I43: {Bold} '    DEC
J:J43: {Bold} '    JAN
J:K43: {Bold} '    FEB
```

```
MAR
APR
MAY
JUN
IF($A:A44>"",+$A:A44,"")
IF($A:B44>"",+$A:B44,"")
IF($A:A45>"",+$A:A45,"")
($A:B45>"",+$A:B45,"")
IF($A:A46>"",+$A:A46,"")
47>"",+$A:A47,"")

48>"",+$A:A48,"")

A49>"",+$A:A49,"")
@IF($A:A50>"",+$A:A50,"")
A51>"",+$A:A51,"")
A52>"",+$A:A52,"")
@IF($A:A53>"",+$A:A53,"")
A54>"",+$A:A54,"")
A55>"",+$A:A55,"")
A56>"",+$A:A56,"")
A57>"",+$A:A57,"")
A58>"",+$A:A58,"")
A59>"",+$A:A59,"")
@IF($A:A60>"",+$A:A60,"")
@IF($A:A61>"",+$A:A61,"")
:A62>"",+$A:A62,"")

:A63>"",+$A:A63,"")
```

```
I:I63: -I48
I:J63: -J48
I:K63: -K48
I:L63: -L48
I:M63: -M48
I:N63: -N48
I:O63: -O48
I:A64: @IF($A:A64>"",+$A:A64,"")
I:A65: {Bold} @IF($A:A65>"",+$A:A65,"")
I:A66: @IF($A:A66>"",+$A:A66,"")
I:A67: @IF($A:A67>"",+$A:A67,"")
I:A68: @IF($A:A68>"",+$A:A68,"")
I:A69: {Bold} @IF($A:A69>"",+$A:A69,"")
I:A70: @IF($A:A70>"",+$A:A70,"")
I:A71: @IF($A:A71>"",+$A:A71,"")
I:A72: {Bold} @IF($A:A72>"",+$A:A72,"")
I:A73: @IF($A:A73>"",+$A:A73,"")
I:A74: @IF($A:A74>"",+$A:A74,"")
I:A75: @IF($A:A75>"",+$A:A75,"")
I:A76: @IF($A:A76>"",+$A:A76,"")
I:A77: @IF($A:A77>"",+$A:A77,"")
I:A78: @IF($A:A78>"",+$A:A78,"")
I:D78: @SUM(D47..D76)
I:E78: @SUM(E47..E76)
I:F78: @SUM(F47..F76)
I:G78: @SUM(G47..G76)
I:H78: @SUM(H47..H76)
I:I78: @SUM(I47..I76)
I:J78: @SUM(J47..J76)
I:K78: @SUM(K47..K76)
I:L78: @SUM(L47..L76)
I:M78: @SUM(M47..M76)
I:N78: @SUM(N47..N76)
I:O78: @SUM(O47..O76)
```

```
MAR
APR
MAY
JUN
@IF($A:A44>"",+$A:A44,"")
@IF($A:B44>"",+$A:B44,"")
@IF($A:A45>"",+$A:A45,"")
?($A:B45>"",+$A:B45,"")
@IF($A:A46>"",+$A:A46,"")
A47>"",+$A:A47,"")
A48>"",+$A:A48,"")
A49>"",+$A:A49,"")
@IF($A:A50>"",+$A:A50,"")
A51>"",+$A:A51,"")

A52>"",+$A:A52,"")
@IF($A:A53>"",+$A:A53,"")
A54>"",+$A:A54,"")
A55>"",+$A:A55,"")
A56>"",+$A:A56,"")
A57>"",+$A:A57,"")
A58>"",+$A:A58,"")
A59>"",+$A:A59,"")
@IF($A:A60>"",+$A:A60,"")
@IF($A:A61>"",+$A:A61,"")
A62>"",+$A:A62,"")
A63>"",+$A:A63,"")
A64>"",+$A:A64,"")
@IF($A:A65>"",+$A:A65,"")
A66>"",+$A:A66,"")
A67>"",+$A:A67,"")
A68>"",+$A:A68,"")
@IF($A:A69>"",+$A:A69,"")
A70>"",+$A:A70,"")

:A71>"",+$A:A71,"")
@IF($A:A72>"",+$A:A72,"")
:A73>"",+$A:A73,"")
:A74>"",+$A:A74,"")
:A75>"",+$A:A75,"")
:A76>"",+$A:A76,"")
:A77>"",+$A:A77,"")
:A78>"",+$A:A78,"")
F($A:C78>"",+$A:C78,"")
47..D76)
```

```
J:E78: @SUM(E47..E76)
J:F78: @SUM(F47..F76)
J:G78: @SUM(G47..G76)
J:H78: @SUM(H47..H76)
J:I78: @SUM(I47..I76)
J:J78: @SUM(J47..J76)
J:K78: @SUM(K47..K76)
J:L78: @SUM(L47..L76)
J:M78: @SUM(M47..M76)
J:N78: @SUM(N47..N76)
J:O78: @SUM(O47..O76)
```

```
RTING MODEL
NTING AND FORECASTING (MAF)

R:
$4
3 PTY LTD
55
53 Queen St
6
ne VIC 3000
'448
7464

EPORTING MODEL
ASED SYSTEM WITH BUDGETS
 (c) GLW SOFTWARE PTY LTD 1995,1996
'($A:A17>"",+$A:A17,"")

IF($A:A18>"",+$A:A18,"")
     JUL
     AUG
     SEP
     OCT
     NOV
     DEC
     JAN
     FEB
     MAR
     APR
'    MAY
'    JUN
@IF($A:A19>"",+$A:A19,"")
@IF(D17>$A:$B$4,"FORECAST","   ACTUAL")
@IF(E17>$A:$B$4,"FORECAST","   ACTUAL")
@IF(F17>$A:$B$4,"FORECAST","   ACTUAL")
@IF(G17>$A:$B$4,"FORECAST","   ACTUAL")
@IF(H17>$A:$B$4,"FORECAST","   ACTUAL")
@IF(I17>$A:$B$4,"FORECAST","   ACTUAL")
@IF(J17>$A:$B$4,"FORECAST","   ACTUAL")
@IF(K17>$A:$B$4,"FORECAST","   ACTUAL")
@IF(L17>$A:$B$4,"FORECAST","   ACTUAL")
@IF(M17>$A:$B$4,"FORECAST","   ACTUAL")
```

```
K:N19: {Bold} @IF(N17>$A:$B$4,"FORECAST","   ACTUAL")
K:O19: {Bold} @IF(O17>$A:$B$4,"FORECAST","   ACTUAL")
K:A20: @IF($A:A20>"",+$A:A20,"")
K:A21: @IF($A:A21>"",+$A:A21,"")
K:A22: @IF($A:A22>"",+$A:A22,"")
K:A23: @IF($A:A23>"",+$A:A23,"")
K:A24: @IF($A:A24>"",+$A:A24,"")
K:A25: @IF($A:A25>"",+$A:A25,"")
K:A26: {Bold} @IF($A:A26>"",+$A:A26,"")
K:A27: {Bold} @IF($A:A27>"",+$A:A27,"")
K:A28: @IF($A:A28>"",+$A:A28,"")
K:A29: @IF($A:A29>"",+$A:A29,"")
K:A30: @IF($A:A30>"",+$A:A30,"")
K:A31: @IF($A:A31>"",+$A:A31,"")
K:D31: {B} (,0) @SUM(D20..D30)
K:E31: {B} (,0) @SUM(E20..E30)
K:F31: {B} (,0) @SUM(F20..F30)
K:G31: {B} (,0) @SUM(G20..G30)
K:H31: {B} (,0) @SUM(H20..H30)
K:I31: {B} (,0) @SUM(I20..I30)
K:J31: {B} (,0) @SUM(J20..J30)
K:K31: {B} (,0) @SUM(K20..K30)
K:L31: {B} (,0) @SUM(L20..L30)
K:M31: {B} (,0) @SUM(M20..M30)
K:N31: {B} (,0) @SUM(N20..N30)
K:O31: {B} (,0) @SUM(O20..O30)
K:A38: +$A:A1
K:B38: 'ECIN
K:C38: 'MONTHLY REPORTING MODEL
K:F38: 'GLW SOFTWARE PTY LTD
K:A39: (D4) @NOW
K:C39: 'MATRIX ACCOUNTING AND FORECASTING   Version 1.1
K:A40: {DUTCH8} '(c) GLW SOFTWARE PTY LTD 1995,1996
K:A42: {Bold} @IF($A:A42>"",+$A:A42,"")
K:A43: {Bold} @IF($A:A43>"",+$A:A43,"")
K:D43: {Bold} '      JUL
K:E43: {Bold} '      AUG
K:F43: {Bold} '      SEP
K:G43: {Bold} '      OCT
K:H43: {Bold} '      NOV
K:I43: {Bold} '      DEC
K:J43: {Bold} '      JAN
K:K43: {Bold} '      FEB
K:L43: {Bold} '      MAR
K:M43: {Bold} '      APR
K:N43: {Bold} '      MAY
K:O43: {Bold} '      JUN
K:A44: {Bold} @IF($A:A44>"",+$A:A44,"")
K:B44: {Bold} @IF($A:B44>"",+$A:B44,"")
K:A45: {Bold} @IF($A:A45>"",+$A:A45,"")
K:B45: (F0) @IF($A:B45>"",+$A:B45,"")
K:A46: {Bold} @IF($A:A46>"",+$A:A46,"")
K:A47: @IF($A:A47>"",+$A:A47,"")
K:A48: @IF($A:A48>"",+$A:A48,"")
K:A49: @IF($A:A49>"",+$A:A49,"")
K:A50: {Bold} @IF($A:A50>"",+$A:A50,"")
K:A51: @IF($A:A51>"",+$A:A51,"")
K:A52: @IF($A:A52>"",+$A:A52,"")
K:A53: {Bold} @IF($A:A53>"",+$A:A53,"")
K:A54: @IF($A:A54>"",+$A:A54,"")
K:A55: @IF($A:A55>"",+$A:A55,"")
K:A56: @IF($A:A56>"",+$A:A56,"")
K:A57: @IF($A:A57>"",+$A:A57,"")
K:A58: @IF($A:A58>"",+$A:A58,"")
K:A59: @IF($A:A59>"",+$A:A59,"")
K:A60: {Bold} @IF($A:A60>"",+$A:A60,"")
K:A61: {Bold} @IF($A:A61>"",+$A:A61,"")
```

```
62>"",+$A:A62,"")
2>0,-P:C62,0)
2>0,-P:D62,0)
2>0,-P:E62,0)
2>0,-P:F62,0)
2>0,-P:G62,0)
2>0,-P:H62,0)
2>0,-P:I62,0)
2>0,-P:J62,0)
2>0,-P:K62,0)
2>0,-P:L62,0)
2>0,-P:M62,0)
2>0,-P:N62,0)
A63>"",+$A:A63,"")

A64>"",+$A:A64,"")
@IF($A:A65>"",+$A:A65,"")
A66>"",+$A:A66,"")
A67>"",+$A:A67,"")
A68>"",+$A:A68,"")
@IF($A:A69>"",+$A:A69,"")
:A70>"",+$A:A70,"")
:A71>"",+$A:A71,"")
@IF($A:A72>"",+$A:A72,"")
:A73>"",+$A:A73,"")
:A74>"",+$A:A74,"")
:A75>"",+$A:A75,"")
:A76>"",+$A:A76,"")
:A77>"",+$A:A77,"")
:A78>"",+$A:A78,"")
F($A:C78>"",+$A:C78,"")
47..D76)
47..E76)
47..F76)
47..G76)
47..H76)
47..I76)
47..J76)
47..K76)
47..L76)
47..M76)
47..N76)
47..O76)
```

```
L:A1: +$A:A1
L:C1: 'MONTHLY REPORTING MODEL
L:A2: (D4) +$A:A2
L:C2: 'MATRIX ACCOUNTING AND FORECASTING (MAF)
L:C3: 'Version
L:D3: (F2) +$A:$D$3
L:B3: '      SUPPLIER:
L:A4: +$A:A4
L:B4: {LRTB} +$A:$B$4
L:C4: +$A:$C$4
L:B4: 'GLW SOFTWARE PTY LTD
L:A5: +$A:A5
L:B5: {LRB} +$A:$B$5
L:B5: 'Level 2,   53 Queen St
L:A6: +$A:A6
L:B6: {LB} +$A:$B$6
L:B6: {L} 'Melbourne VIC 3000
L:B7: 'AUSTRALIA
L:B8: 'Telephone
L:F8: '(03) 9629 7448
L:B9: 'Facsimile
L:F9: '(03) 9629 7464
L:A10: 'SHEET:
L:B10: 'BCOUT
L:A14: +$A:A1
L:B14: 'OPER
L:C14: 'MONTHLY REPORTING MODEL
L:A15: (D4) @NOW
L:C15: 'REVENUE BASED SYSTEM WITH BUDGETS
L:A16: {DUTCH8} '(c) GLW SOFTWARE PTY LTD 1995,1996
L:A17: {Bold} @IF($A:A17>"",+$A:A17,"")
L:D17: 1
L:E17: 2
L:F17: 3
L:G17: 4
L:H17: 5
L:I17: 6
L:J17: 7
L:K17: 8
L:L17: 9
L:M17: 10
L:N17: 11
L:O17: 12
L:A18: {Bold} @IF($A:A18>"",+$A:A18,"")
L:D18: {Bold} '     JUL
L:E18: {Bold} '     AUG
L:F18: {Bold} '     SEP
L:G18: {Bold} '     OCT
L:H18: {Bold} '     NOV
L:I18: {Bold} '     DEC
L:J18: {Bold} '     JAN
L:K18: {Bold} '     FEB
L:L18: {Bold} '     MAR
L:M18: {Bold} '     APR
L:N18: {Bold} '     MAY
L:O18: {Bold} '     JUN
L:A19: {Bold} @IF($A:A19>"",+$A:A19,"")
L:D19: {Bold} @IF(D17>$A:$B$4,"FORECAST","  ACTUAL")
L:E19: {Bold} @IF(E17>$A:$B$4,"FORECAST","  ACTUAL")
L:F19: {Bold} @IF(F17>$A:$B$4,"FORECAST","  ACTUAL")
L:G19: {Bold} @IF(G17>$A:$B$4,"FORECAST","  ACTUAL")
L:H19: {Bold} @IF(H17>$A:$B$4,"FORECAST","  ACTUAL")
L:I19: {Bold} @IF(I17>$A:$B$4,"FORECAST","  ACTUAL")
L:J19: {Bold} @IF(J17>$A:$B$4,"FORECAST","  ACTUAL")
L:K19: {Bold} @IF(K17>$A:$B$4,"FORECAST","  ACTUAL")
L:L19: {Bold} @IF(L17>$A:$B$4,"FORECAST","  ACTUAL")
L:M19: {Bold} @IF(M17>$A:$B$4,"FORECAST","  ACTUAL")
```

```
IP(N17>$A:$B$4,"FORECAST","   ACTUAL")
IP(O17>$A:$B$4,"FORECAST","   ACTUAL")
20>"",+$A:A20,"")
21>"",+$A:A21,"")
22>"",+$A:A22,"")
23>"",+$A:A23,"")
24>"",+$A:A24,"")
25>"",+$A:A25,"")
IP($A:A26>"",+$A:A26,"")
IP($A:A27>"",+$A:A27,"")
28>"",+$A:A28,"")
29>"",+$A:A29,"")
30>"",+$A:A30,"")
31>"",+$A:A31,"")
) @SUM(D20..D30)
) @SUM(E20..E30)
) @SUM(F20..F30)
) @SUM(G20..G30)
) @SUM(H20..H30)
) @SUM(I20..I30)
) @SUM(J20..J30)
) @SUM(K20..K30)
) @SUM(L20..L30)
) @SUM(M20..M30)
) @SUM(N20..N30)
) @SUM(O20..O30)

Y REPORTING MODEL
FTWARE PTY LTD
OW
 ACCOUNTING AND FORECASTING   Version 1.1
) '(c) GLW SOFTWARE PTY LTD 1995,1996
@IP($A:A42>"",+$A:A42,"")
@IP($A:A43>"",+$A:A43,"")
'      JUL
'      AUG
'      SEP
'      OCT
'      NOV
'      DEC
'      JAN
'      FEB
'      MAR
'      APR
'      MAY
'      JUN
@IF($A:A44>"",+$A:A44,"")
@IF($A:B44>"",+$A:B44,"")
@IF($A:A45>"",+$A:A45,"")
IF($A:B45>"",+$A:B45,"")
@IF($A:A46>"",+$A:A46,"")
:A47>"",+$A:A47,"")
:A48>"",+$A:A48,"")
:A49>"",+$A:A49,"")
) @IF($A:A50>"",+$A:A50,"")
:A51>"",+$A:A51,"")
:A52>"",+$A:A52,"")
) @IF($A:A53>"",+$A:A53,"")
:A54>"",+$A:A54,"")
```

```
L:K54: 500
L:L54: 500
L:M54: 500
L:N54: 500
L:O54: 500
L:A55: @IF($A:A55>"",+$A:A55,"")
L:A56: @IF($A:A56>"",+$A:A56,"")
L:D56: 3000
L:E56: 3000
L:F56: 3000
L:G56: 3000
L:H56: 3000
L:I56: 4000
L:J56: 3500
L:K56: 3500
L:L56: 3500
L:M56: 3500
L:N56: 3500
L:O56: 3500
L:A57: @IF($A:A57>"",+$A:A57,"")
L:A58: @IF($A:A58>"",+$A:A58,"")
L:A59: @IF($A:A59>"",+$A:A59,"")
L:A60: {Bold} @IF($A:A60>"",+$A:A60,"")
L:A61: {Bold} @IF($A:A61>"",+$A:A61,"")
L:A62: @IF($A:A62>"",+$A:A62,"")
L:A63: @IF($A:A63>"",+$A:A63,"")
L:D63: -(@SUM(D47..D62)+@SUM(D64..D76))
L:E63: -(@SUM(E47..E62)+@SUM(E64..E76))
L:F63: -(@SUM(F47..F62)+@SUM(F64..F76))
L:G63: -(@SUM(G47..G62)+@SUM(G64..G76))
L:H63: -(@SUM(H47..H62)+@SUM(H64..H76))
L:I63: -(@SUM(I47..I62)+@SUM(I64..I76))
L:J63: -(@SUM(J47..J62)+@SUM(J64..J76))
L:K63: -(@SUM(K47..K62)+@SUM(K64..K76))
L:L63: -(@SUM(L47..L62)+@SUM(L64..L76))
L:M63: -(@SUM(M47..M62)+@SUM(M64..M76))
L:N63: -(@SUM(N47..N62)+@SUM(N64..N76))
L:O63: -(@SUM(O47..O62)+@SUM(O64..O76))
L:A64: @IF($A:A64>"",+$A:A64,"")
L:A65: {Bold} @IF($A:A65>"",+$A:A65,"")
L:A66: @IF($A:A66>"",+$A:A66,"")
L:K66: 250000
L:A67: @IF($A:A67>"",+$A:A67,"")
L:A68: @IF($A:A68>"",+$A:A68,"")
L:A69: {Bold} @IF($A:A69>"",+$A:A69,"")
L:A70: @IF($A:A70>"",+$A:A70,"")
L:D70: @IF(@ABS(P:C70)>0,-P:C70,0)
L:E70: @IF(@ABS(P:D70)>0,-P:D70,0)
L:F70: @IF(@ABS(P:E70)>0,-P:E70,0)
L:G70: @IF(@ABS(P:F70)>0,-P:F70,0)
L:H70: @IF(@ABS(P:G70)>0,-P:G70,0)
L:I70: @IF(@ABS(P:H70)>0,-P:H70,0)
L:J70: @IF(@ABS(P:I70)>0,-P:I70,0)
L:K70: @IF(@ABS(P:J70)>0,-P:J70,0)
L:L70: @IF(@ABS(P:K70)>0,-P:K70,0)
L:M70: @IF(@ABS(P:L70)>0,-P:L70,0)
L:N70: @IF(@ABS(P:M70)>0,-P:M70,0)
L:O70: @IF(@ABS(P:N70)>0,-P:N70,0)
L:A71: @IF($A:A71>"",+$A:A71,"")
L:A72: {Bold} @IF($A:A72>"",+$A:A72,"")
L:A73: @IF($A:A73>"",+$A:A73,"")
L:A74: @IF($A:A74>"",+$A:A74,"")
L:A75: @IF($A:A75>"",+$A:A75,"")
L:A76: @IF($A:A76>"",+$A:A76,"")
L:A77: @IF($A:A77>"",+$A:A77,"")
L:A78: @IF($A:A78>"",+$A:A78,"")
L:C78: {B} @IF($A:C78>"",+$A:C78,"")
```

```
.D76)
.E76)
.F76)
.G76)
.H76)
.I76)
.J76)
.K76)
.L76)
..M76)
..N76)
..O76)
```

```
M:A1: +$A:A1
M:C1: 'MONTHLY REPORTING MODEL
M:A2: (D4) +$A:A2
M:C2: 'MATRIX ACCOUNTING AND FORECASTING (MAF)
M:C3: 'Version
M:D3: (F2) +$A:$D$3
M:E3: '      SUPPLIER:
M:A4: +$A:A4
M:B4: {LRTB} +$A:$B$4
M:C4: +$A:$C$4
M:E4: 'GLW SOFTWARE PTY LTD
M:A5: +$A:A5
M:B5: {LRB} +$A:$B$5
M:E5: 'Level 2,   53 Queen St
M:A6: +$A:A6
M:B6: {LB} +$A:$B$6
M:E6: {L} 'Melbourne VIC 3000
M:E7: 'AUSTRALIA
M:E8: 'Telephone
M:F8: '(03) 9629 7448
M:E9: 'Facsimile
M:F9: '(03) 9629 7464
M:A10: 'SHEET:
M:B10: 'BJNL
M:A14: +$A:A1
M:B14: 'OPER
M:C14: 'MONTHLY REPORTING MODEL
M:A15: (D4) @NOW
M:C15: 'REVENUE BASED SYSTEM WITH BUDGETS
M:A16: {DUTCHB} '(c) GLW SOFTWARE PTY LTD 1995,1996
M:A17: {Bold} @IF($A:A17>"",+$A:A17,"")
M:D17: 1
M:E17: 2
M:F17: 3
M:G17: 4
M:H17: 5
M:I17: 6
M:J17: 7
M:K17: 8
M:L17: 9
M:M17: 10
M:N17: 11
M:O17: 12
M:A18: {Bold} @IF($A:A18>"",+$A:A18,"")
M:D18: {Bold} '     JUL
M:E18: {Bold} '     AUG
M:F18: {Bold} '     SEP
M:G18: {Bold} '     OCT
M:H18: {Bold} '     NOV
M:I18: {Bold} '     DEC
M:J18: {Bold} '     JAN
M:K18: {Bold} '     FEB
M:L18: {Bold} '     MAR
M:M18: {Bold} '     APR
M:N18: {Bold} '     MAY
M:O18: {Bold} '     JUN
M:A19: {Bold} @IF($A:A19>"",+$A:A19,"")
M:D19: {Bold} @IF(D17>$A:$B$4,"FORECAST","   ACTUAL")
M:E19: {Bold} @IF(E17>$A:$B$4,"FORECAST","   ACTUAL")
M:F19: {Bold} @IF(F17>$A:$B$4,"FORECAST","   ACTUAL")
M:G19: {Bold} @IF(G17>$A:$B$4,"FORECAST","   ACTUAL")
M:H19: {Bold} @IF(H17>$A:$B$4,"FORECAST","   ACTUAL")
M:I19: {Bold} @IF(I17>$A:$B$4,"FORECAST","   ACTUAL")
M:J19: {Bold} @IF(J17>$A:$B$4,"FORECAST","   ACTUAL")
M:K19: {Bold} @IF(K17>$A:$B$4,"FORECAST","   ACTUAL")
M:L19: {Bold} @IF(L17>$A:$B$4,"FORECAST","   ACTUAL")
M:M19: {Bold} @IF(M17>$A:$B$4,"FORECAST","   ACTUAL")
```

```
IP(N17>$A:$B$4,"FORECAST",'  ACTUAL")
IP(O17>$A:$B$4,"FORECAST",'  ACTUAL")
20>"",+$A:A20,"")
21>"",+$A:A21,"")
22>"",+$A:A22,"")
23>"",+$A:A23,"")
24>"",+$A:A24,"")
25>"",+$A:A25,"")
IP($A:A26>"",+$A:A26,"")
IP($A:A27>"",+$A:A27,"")
28>"",+$A:A28,"")
29>"",+$A:A29,"")
30>"",+$A:A30,"")
31>"",+$A:A31,"")
 @SUM(D20..D30)
 @SUM(E20..E30)
 @SUM(F20..F30)
 @SUM(G20..G30)
 @SUM(H20..H30)
 @SUM(I20..I30)
 @SUM(J20..J30)
 @SUM(K20..K30)
 @SUM(L20..L30)
 @SUM(M20..M30)
 @SUM(N20..N30)
 @SUM(O20..O30)

Y REPORTING MODEL
FTWARE PTY LTD
OW
 ACCOUNTING AND FORECASTING   Version 1.1
 '(c) GLW SOFTWARE PTY LTD 1995,1996
@IP($A:A42>"",+$A:A42,"")
@IP($A:A43>"",+$A:A43,"")
'     JUL
'     AUG
'     SEP
'     OCT
'     NOV
'     DEC
'     JAN
'     FEB
'     MAR
'     APR
'     MAY
'     JUN
@IP($A:A44>"",+$A:A44,"")
@IP($A:B44>"",+$A:B44,"")
@IP($A:A45>"",+$A:A45,"")
IP($A:B45>"",+$A:B45,"")
 @IP($A:A46>"",+$A:A46,"")
:A47>"",+$A:A47,"")
:A48>"",+$A:A48,"")
:A49>"",+$A:A49,"")
 @IP($A:A50>"",+$A:A50,"")
:A51>"",+$A:A51,"")
:A52>"",+$A:A52,"")
 @IP($A:A53>"",+$A:A53,"")
:A54>"",+$A:A54,"")
:A55>"",+$A:A55,"")
```

```
M:J55: 10000
M:K55: 10000
M:L55: 10000
M:M55: 10000
M:N55: 10000
M:O55: 10000
M:A56: @IP($A:A56>"",+$A:A56,"")
M:A57: @IP($A:A57>"",+$A:A57,"")
M:A58: @IP($A:A58>"",+$A:A58,"")
M:A59: @IP($A:A59>"",+$A:A59,"")
M:A60: {Bold} @IP($A:A60>"",+$A:A60,"")
M:A61: {Bold} @IP($A:A61>"",+$A:A61,"")
M:A62: @IP($A:A62>"",+$A:A62,"")
M:A63: @IP($A:A63>"",+$A:A63,"")
M:A64: @IP($A:A64>"",+$A:A64,"")
M:A65: {Bold} @IP($A:A65>"",+$A:A65,"")
M:A66: @IP($A:A66>"",+$A:A66,"")
M:A67: @IP($A:A67>"",+$A:A67,"")
M:D67: -D55
M:E67: -E55
M:F67: -F55
M:G67: -G55
M:H67: -H55
M:I67: -I55
M:J67: -J55
M:K67: -K55
M:L67: -L55
M:M67: -M55
M:N67: -N55
M:O67: -O55
M:A68: @IP($A:A68>"",+$A:A68,"")
M:A69: {Bold} @IP($A:A69>"",+$A:A69,"")
M:A70: @IP($A:A70>"",+$A:A70,"")
M:A71: @IP($A:A71>"",+$A:A71,"")
M:A72: {Bold} @IP($A:A72>"",+$A:A72,"")
M:A73: @IP($A:A73>"",+$A:A73,"")
M:A74: @IP($A:A74>"",+$A:A74,"")
M:A75: @IP($A:A75>"",+$A:A75,"")
M:A76: @IP($A:A76>"",+$A:A76,"")
M:A77: @IP($A:A77>"",+$A:A77,"")
M:A78: @IP($A:A78>"",+$A:A78,"")
M:C78: {B} @IP($A:C78>"",+$A:C78,"")
M:D78: @SUM(D47..D76)
M:E78: @SUM(E47..E76)
M:F78: @SUM(F47..F76)
M:G78: @SUM(G47..G76)
M:H78: @SUM(H47..H76)
M:I78: @SUM(I47..I76)
M:J78: @SUM(J47..J76)
M:K78: @SUM(K47..K76)
M:L78: @SUM(L47..L76)
M:M78: @SUM(M47..M76)
M:N78: @SUM(N47..N76)
M:O78: @SUM(O47..O76)
```

```
 REPORTING MODEL
:A2
ACCOUNTING AND FORECASTING (MAF)

:$D$3
PPLIER:

$A:$B$4

TWARE PTY LTD

A:$B$5
,   53 Queen St

:$B$6
bourne VIC 3000
IA
ne
29 7448
le
29 7464


Y REPORTING MODEL
OW
B BASED SYSTEM WITH BUDGETS
} '(c) GLW SOFTWARE PTY LTD 1995,1996
@IF($A:A17>"",+$A:A17,"")


@IF($A:A18>"",+$A:A18,"")
'     JUL
'     AUG
'     SEP
'     OCT
'     NOV
'     DEC
'     JAN
'     FEB
'     MAR
'     APR
'     MAY
'     JUN
@IF($A:A19>"",+$A:A19,"")
@IF(D17>$A:$B$4,"FORECAST","   ACTUAL")
@IF(E17>$A:$B$4,"FORECAST","   ACTUAL")
@IF(F17>$A:$B$4,"FORECAST","   ACTUAL")
@IF(G17>$A:$B$4,"FORECAST","   ACTUAL")
@IF(H17>$A:$B$4,"FORECAST","   ACTUAL")
@IF(I17>$A:$B$4,"FORECAST","   ACTUAL")
@IF(J17>$A:$B$4,"FORECAST","   ACTUAL")
@IF(K17>$A:$B$4,"FORECAST","   ACTUAL")
@IF(L17>$A:$B$4,"FORECAST","   ACTUAL")
@IF(M17>$A:$B$4,"FORECAST","   ACTUAL")
```

(C)GLW SOFWARE PTY LTD 1995,1996

```
N:N19: {Bold} @IF(N17>$A:$B$4,"FORECAST","   ACTUAL")
N:O19: {Bold} @IF(O17>$A:$B$4,"FORECAST","   ACTUAL")
N:A20: @IF($A:A20>"",+$A:A20,"")
N:A21: @IF($A:A21>"",+$A:A21,"")
N:A22: @IF($A:A22>"",+$A:A22,"")
N:A23: @IF($A:A23>"",+$A:A23,"")
N:A24: @IF($A:A24>"",+$A:A24,"")
N:A25: @IF($A:A25>"",+$A:A25,"")
N:A26: {Bold} @IF($A:A26>"",+$A:A26,"")
N:A27: {Bold} @IF($A:A27>"",+$A:A27,"")
N:A28: @IF($A:A28>"",+$A:A28,"")
N:A29: @IF($A:A29>"",+$A:A29,"")
N:A30: @IF($A:A30>"",+$A:A30,"")
N:A31: @IF($A:A31>"",+$A:A31,"")
N:D31: {B} (,0) @SUM(D20..D30)
N:E31: {B} (,0) @SUM(E20..E30)
N:F31: {B} (,0) @SUM(F20..F30)
N:G31: {B} (,0) @SUM(G20..G30)
N:H31: {B} (,0) @SUM(H20..H30)
N:I31: {B} (,0) @SUM(I20..I30)
N:J31: {B} (,0) @SUM(J20..J30)
N:K31: {B} (,0) @SUM(K20..K30)
N:L31: {B} (,0) @SUM(L20..L30)
N:M31: {B} (,0) @SUM(M20..M30)
N:N31: {B} (,0) @SUM(N20..N30)
N:O31: {B} (,0) @SUM(O20..O30)
N:A38: +$A:A1
N:B38: 'BJNLR
N:C38: 'MONTHLY REPORTING MODEL
N:F38: 'GLW SOFTWARE PTY LTD
N:A39: (D4) @NOW
N:C39: 'MATRIX ACCOUNTING AND FORECASTING   Version 1.1
N:A40: {DUTCH8} '(c) GLW SOFTWARE PTY LTD 1995,1996
N:A42: {Bold} @IF($A:A42>"",+$A:A42,"")
N:A43: {Bold} @IF($A:A43>"",+$A:A43,"")
N:D43: {Bold} '     JUL
N:E43: {Bold} '     AUG
N:F43: {Bold} '     SEP
N:G43: {Bold} '     OCT
N:H43: {Bold} '     NOV
N:I43: {Bold} '     DEC
N:J43: {Bold} '     JAN
N:K43: {Bold} '     FEB
N:L43: {Bold} '     MAR
N:M43: {Bold} '     APR
N:N43: {Bold} '     MAY
N:O43: {Bold} '     JUN
N:A44: {Bold} @IF($A:A44>"",+$A:A44,"")
N:B44: {Bold} @IF($A:B44>"",+$A:B44,"")
N:A45: {Bold} @IF($A:A45>"",+$A:A45,"")
N:B45: (F0) @IF($A:B45>"",+$A:B45,"")
N:A46: {Bold} @IF($A:A46>"",+$A:A46,"")
N:A47: @IF($A:A47>"",+$A:A47,"")
N:A48: @IF($A:A48>"",+$A:A48,"")
N:A49: @IF($A:A49>"",+$A:A49,"")
N:A50: {Bold} @IF($A:A50>"",+$A:A50,"")
N:A51: @IF($A:A51>"",+$A:A51,"")
N:A52: @IF($A:A52>"",+$A:A52,"")
N:A53: {Bold} @IF($A:A53>"",+$A:A53,"")
N:A54: @IF($A:A54>"",+$A:A54,"")
N:A55: @IF($A:A55>"",+$A:A55,"")
N:A56: @IF($A:A56>"",+$A:A56,"")
N:A57: @IF($A:A57>"",+$A:A57,"")
N:A58: @IF($A:A58>"",+$A:A58,"")
N:A59: @IF($A:A59>"",+$A:A59,"")
N:A60: {Bold} @IF($A:A60>"",+$A:A60,"")
N:A61: {Bold} @IF($A:A61>"",+$A:A61,"")
```

```
>"",+$A:A62,"")
>"",+$A:A63,"")
>"",+$A:A64,"")
(($A:A65>"",+$A:A65,"")
>"",+$A:A66,"")
>"",+$A:A67,"")
>"",+$A:A68,"")
F($A:A69>"",+$A:A69,"")
0>"",+$A:A70,"")
1>"",+$A:A71,"")
F($A:A72>"",+$A:A72,"")
3>"",+$A:A73,"")
4>"",+$A:A74,"")
5>"",+$A:A75,"")
6>"",+$A:A76,"")
7>"",+$A:A77,"")
8>"",+$A:A78,"")
C47..C76)
..D76)
..E76)
..F76)
..G76)
..H76)
..I76)
..J76)
..K76)
..L76)
..M76)
..N76)
..O76)
```

```
0:A1: +$A:A1
0:C1: 'MONTHLY REPORTING MODEL
0:A2: (D4) +$A:A2
0:C2: 'MATRIX ACCOUNTING AND FORECASTING (MAF)
0:C3: 'Version
0:D3: (F2) +$A:$D$3
0:B3: '      SUPPLIER:
0:A4: +$A:A4
0:B4: {LRTB} +$A:$B$4
0:C4: +$A:$C$4
0:F4: 'GLW SOFTWARE PTY LTD
0:A5: +$A:A5
0:B5: {LRB} +$A:$B$5
0:F5: 'Level 2,   53 Queen St
0:A6: +$A:A6
0:B6: {LB} +$A:$B$6
0:E6: {L} 'Melbourne VIC 3000
0:E7: 'AUSTRALIA
0:E8: 'Telephone
0:F8: '(03) 9629 7448
0:E9: 'Facsimile
0:F9: '(03) 9629 7464
0:A10: 'SHEET:
0:B10: 'EREV
0:A14: +$A:A1
0:B14: 'OPER
0:C14: 'MONTHLY REPORTING MODEL
0:A15: (D4) @NOW
0:C15: 'REVENUE BASED SYSTEM WITH BUDGETS
0:A16: {DUTCH8} '(c) GLW SOFTWARE PTY LTD 1995,1996
0:A17: {Bold} @IF($A:A17>"",+$A:A17,"")
0:D17: 1
0:E17: 2
0:F17: 3
0:G17: 4
0:H17: 5
0:I17: 6
0:J17: 7
0:K17: 8
0:L17: 9
0:M17: 10
0:N17: 11
0:O17: 12
0:A18: {Bold} @IF($A:A18>"",+$A:A18,"")
0:D18: {Bold} '     JUL
0:E18: {Bold} '     AUG
0:F18: {Bold} '     SEP
0:G18: {Bold} '     OCT
0:H18: {Bold} '     NOV
0:I18: {Bold} '     DEC
0:J18: {Bold} '     JAN
0:K18: {Bold} '     FEB
0:L18: {Bold} '     MAR
0:M18: {Bold} '     APR
0:N18: {Bold} '     MAY
0:O18: {Bold} '     JUN
0:A19: {Bold} @IF($A:A19>"",+$A:A19,"")
0:D19: {Bold} @IF(D17>$A:$B$4,"FORECAST","   ACTUAL")
0:E19: {Bold} @IF(E17>$A:$B$4,"FORECAST","   ACTUAL")
0:F19: {Bold} @IF(F17>$A:$B$4,"FORECAST","   ACTUAL")
0:G19: {Bold} @IF(G17>$A:$B$4,"FORECAST","   ACTUAL")
0:H19: {Bold} @IF(H17>$A:$B$4,"FORECAST","   ACTUAL")
0:I19: {Bold} @IF(I17>$A:$B$4,"FORECAST","   ACTUAL")
0:J19: {Bold} @IF(J17>$A:$B$4,"FORECAST","   ACTUAL")
0:K19: {Bold} @IF(K17>$A:$B$4,"FORECAST","   ACTUAL")
0:L19: {Bold} @IF(L17>$A:$B$4,"FORECAST","   ACTUAL")
0:M19: {Bold} @IF(M17>$A:$B$4,"FORECAST","   ACTUAL")
```

```
?(N17>$A:$B$4,"FORECAST","   ACTUAL")
?(O17>$A:$B$4,"FORECAST","   ACTUAL")
)>"",+$A:A20,"")
(>"",+$A:A21,"")
1..N:D21)
1..N:E21)
1..N:F21)
1..N:G21)
1..N:H21)
1..N:I21)
1..N:J21)
1..N:K21)
1..N:L21)
1..N:M21)
1..N:N21)
1..N:O21)
2>"",+$A:A22,"")
2..N:D22)
2..N:E22)
2..N:F22)
2..N:G22)
2..N:H22)
2..N:I22)
2..N:J22)
2..N:K22)
2..N:L22)
2..N:M22)
2..N:N22)
2..N:O22)
23>"",+$A:A23,"")
23..N:D23)
23..N:E23)
23..N:F23)
23..N:G23)
23..N:H23)
23..N:I23)
23..N:J23)
23..N:K23)
23..N:L23)
23..N:M23)
23..N:N23)
23..N:O23)
24>"",+$A:A24,"")
24..N:D24)
24..N:E24)
24..N:F24)
24..N:G24)
24..N:H24)
24..N:I24)
24..N:J24)
24..N:K24)
24..N:L24)
24..N:M24)
24..N:N24)
24..N:O24)
A25>"",+$A:A25,"")
@IF($A:A26>"",+$A:A26,"")
@IF($A:A27>"",+$A:A27,"")
A28>"",+$A:A28,"")
A29>"",+$A:A29,"")
A30>"",+$A:A30,"")
A31>"",+$A:A31,"")
) @SUM(D20..D30)
) @SUM(E20..E30)
) @SUM(F20..F30)
) @SUM(G20..G30)
) @SUM(H20..H30)
```

```
0:I31: (B) (,0) @SUM(I20..I30)
0:J31: (B) (,0) @SUM(J20..J30)
0:K31: (B) (,0) @SUM(K20..K30)
0:L31: (B) (,0) @SUM(L20..L30)
0:M31: (B) (,0) @SUM(M20..M30)
0:N31: (B) (,0) @SUM(N20..N30)
0:O31: (B) (,0) @SUM(O20..O30)
0:A38: +$A:A1
0:B38: 'BREV
0:C38: 'MONTHLY REPORTING MODEL
0:P38: 'GLW SOFTWARE PTY LTD
0:A39: (D4) @NOW
0:C39: 'MATRIX ACCOUNTING AND FORECASTING  Version 1.1
0:A40: {DUTCH8} '(c) GLW SOFTWARE PTY LTD 1995,1996
0:A42: {Bold} @IF($A:A42>"",+$A:A42,"")
0:A43: {Bold} @IF($A:A43>"",+$A:A43,"")
0:D43: {Bold} '    JUL
0:E43: {Bold} '    AUG
0:F43: {Bold} '    SEP
0:G43: {Bold} '    OCT
0:H43: {Bold} '    NOV
0:I43: {Bold} '    DEC
0:J43: {Bold} '    JAN
0:K43: {Bold} '    FEB
0:L43: {Bold} '    MAR
0:M43: {Bold} '    APR
0:N43: {Bold} '    MAY
0:O43: {Bold} '    JUN
0:A44: {Bold} @IF($A:A44>"",+$A:A44,"")
0:B44: {Bold} @IF($A:B44>"",+$A:B44,"")
0:A45: {Bold} @IF($A:A45>"",+$A:A45,"")
0:B45: (P0) @IF($A:B45>"",+$A:B45,"")
0:A46: {Bold} @IF($A:A46>"",+$A:A46,"")
0:A47: @IF($A:A47>"",+$A:A47,"")
0:D47: @SUM(I:D47..N:D47)
0:E47: @SUM(I:E47..N:E47)
0:F47: @SUM(I:F47..N:F47)
0:G47: @SUM(I:G47..N:G47)
0:H47: @SUM(I:H47..N:H47)
0:I47: @SUM(I:I47..N:I47)
0:J47: @SUM(I:J47..N:J47)
0:K47: @SUM(I:K47..N:K47)
0:L47: @SUM(I:L47..N:L47)
0:M47: @SUM(I:M47..N:M47)
0:N47: @SUM(I:N47..N:N47)
0:O47: @SUM(I:O47..N:O47)
0:A48: @IF($A:A48>"",+$A:A48,"")
0:D48: @SUM(I:D48..N:D48)
0:E48: @SUM(I:E48..N:E48)
0:F48: @SUM(I:F48..N:F48)
0:G48: @SUM(I:G48..N:G48)
0:H48: @SUM(I:H48..N:H48)
0:I48: @SUM(I:I48..N:I48)
0:J48: @SUM(I:J48..N:J48)
0:K48: @SUM(I:K48..N:K48)
0:L48: @SUM(I:L48..N:L48)
0:M48: @SUM(I:M48..N:M48)
0:N48: @SUM(I:N48..N:N48)
0:O48: @SUM(I:O48..N:O48)
0:A49: @IF($A:A49>"",+$A:A49,"")
0:A50: {Bold} @IF($A:A50>"",+$A:A50,"")
0:A51: @IF($A:A51>"",+$A:A51,"")
0:D51: @SUM(I:D51..N:D51)
0:E51: @SUM(I:E51..N:E51)
0:F51: @SUM(I:F51..N:F51)
0:G51: @SUM(I:G51..N:G51)
0:H51: @SUM(I:H51..N:H51)
```

```
1..N:I51)
1..N:J51)
1..N:K51)
1..N:L51)
1..N:M51)
1..N:N51)
1..N:O51)
2>"",+$A:A52,"")
F($A:A53>"",+$A:A53,"")
4>"",+$A:A54,"")
4..N:D54)
4..N:E54)
4..N:F54)
4..N:G54)
4..N:H54)
4..N:I54)
4..N:J54)
4..N:K54)
4..N:L54)
4..N:M54)
4..N:N54)
4..N:O54)
55>"",+$A:A55,"")
55..N:D55)
55..N:E55)
55..N:F55)
55..N:G55)
55..N:H55)
55..N:I55)
55..N:J55)
55..N:K55)
55..N:L55)
55..N:M55)
55..N:N55)
55..N:O55)
56>"",+$A:A56,"")
56..N:D56)
56..N:E56)
56..N:F56)
56..N:G56)
56..N:H56)
56..N:I56)
56..N:J56)
56..N:K56)
56..N:L56)
56..N:M56)
56..N:N56)
56..N:O56)
57>"",+$A:A57,"")
57..N:D57)
57..N:E57)
57..N:F57)
57..N:G57)
57..N:H57)
57..N:I57)
57..N:J57)
57..N:K57)
57..N:L57)
57..N:M57)
57..N:N57)
57..N:O57)
A58>"",+$A:A58,"")
A59>"",+$A:A59,"")
@IF($A:A60>"",+$A:A60,"")
@IF($A:A61>"",+$A:A61,"")
A62>"",+$A:A62,"")
A63>"",+$A:A63,"")
```

```
0:A64: @IF($A:A64>"",+$A:A64,"")
0:A65: (Bold) @IF($A:A65>"",+$A:A65,"")
0:A66: @IF($A:A66>"",+$A:A66,"")
0:A67: @IF($A:A67>"",+$A:A67,"")
0:A68: @IF($A:A68>"",+$A:A68,"")
0:A69: (Bold) @IF($A:A69>"",+$A:A69,"")
0:A70: @IF($A:A70>"",+$A:A70,"")
0:A71: @IF($A:A71>"",+$A:A71,"")
0:A72: (Bold) @IF($A:A72>"",+$A:A72,"")
0:A73: @IF($A:A73>"",+$A:A73,"")
0:A74: @IF($A:A74>"",+$A:A74,"")
0:A75: @IF($A:A75>"",+$A:A75,"")
0:A76: @IF($A:A76>"",+$A:A76,"")
0:D76: @SUM(D47..D57)
0:E76: @SUM(E47..E57)
0:F76: @SUM(F47..F57)
0:G76: @SUM(G47..G57)
0:H76: @SUM(H47..H57)
0:I76: @SUM(I47..I57)
0:J76: @SUM(J47..J57)
0:K76: @SUM(K47..K57)
0:L76: @SUM(L47..L57)
0:M76: @SUM(M47..M57)
0:N76: @SUM(N47..N57)
0:O76: @SUM(O47..O57)
0:A77: @IF($A:A77>"",+$A:A77,"")
0:A78: @IF($A:A78>"",+$A:A78,"")
0:D78: @SUM(D47..D75)-D76
0:E78: @SUM(E47..E75)-E76
0:F78: @SUM(F47..F75)-F76
0:G78: @SUM(G47..G75)-G76
0:H78: @SUM(H47..H75)-H76
0:I78: @SUM(I47..I75)-I76
0:J78: @SUM(J47..J75)-J76
0:K78: @SUM(K47..K75)-K76
0:L78: @SUM(L47..L75)-L76
0:M78: @SUM(M47..M75)-M76
0:N78: @SUM(N47..N75)-N76
0:O78: @SUM(O47..O75)-O76
0:A79: @IF($A:A79>"",+$A:A79,"")
0:A90: +$A:A1
0:B90: 'BREPDATA
0:D90: 'MONTHLY REPORTING MODEL
0:J90: +$A:$C$4
0:A91: (D4) @NOW
0:D91: 'MATRIX ACCOUNTING AND FORECASTING Version 1.1
0:J91: +$A:$B$5
0:D94: 1
0:E94: 2
0:F94: 3
0:G94: 4
0:H94: 5
0:I94: 6
0:J94: 7
0:K94: 8
0:L94: 9
0:M94: 10
0:N94: 11
0:O94: 12
0:A95: 'REPORT DATA
0:D95: '    JUL
0:E95: '    AUG
0:F95: '    SEP
0:G95: '    OCT
0:H95: '    NOV
0:I95: '    DEC
0:J95: '    JAN
```

```
'(c) GLW SOFTWARE PTY LTD 1995,1996

AR
F(D$17>($A:$B$4),"","AAAAAAAAA")
F(E$17>($A:$B$4),"","AAAAAAAAA")
F(F$17>($A:$B$4),"","AAAAAAAAA")
F(G$17>($A:$B$4),"","AAAAAAAAA")
F(H$17>($A:$B$4),"","AAAAAAAAA")
F(I$17>($A:$B$4),"","AAAAAAAAA")
F(J$17>($A:$B$4),"","AAAAAAAAA")
F(K$17>($A:$B$4),"","AAAAAAAAA")
F(L$17>($A:$B$4),"","AAAAAAAAA")
F(M$17>($A:$B$4),"","AAAAAAAAA")
F(N$17>($A:$B$4),"","AAAAAAAAA")
F(O$17>($A:$B$4),"","AAAAAAAAA")
ld

..099)
Held

ES
& Other Income
SUM(D47..D48)
SUM(E47..E48)
SUM(F47..F48)
SUM(G47..G48)
SUM(H47..H48)
```

```
O:I104: {B} -@SUM(I47..I48)
O:J104: {B} -@SUM(J47..J48)
O:K104: {B} -@SUM(K47..K48)
O:L104: {B} -@SUM(L47..L48)
O:M104: {B} -@SUM(M47..M48)
O:N104: {B} -@SUM(N47..N48)
O:O104: {B} -@SUM(O47..O48)
O:Q104: {B} @SUM(D104..O104)
O:A106: 'COST OF SALES
O:A107: 'Purchases
O:D107: {B} +D51
O:E107: {B} +E51
O:F107: {B} +F51
O:G107: {B} +G51
O:H107: {B} +H51
O:I107: {B} +I51
O:J107: {B} +J51
O:K107: {B} +K51
O:L107: {B} +L51
O:M107: {B} +M51
O:N107: {B} +N51
O:O107: {B} +O51
O:Q107: {B} @SUM(D107..O107)
O:A110: 'GROSS PROFIT
O:D110: {B} +D104-D107
O:E110: {B} +E104-E107
O:F110: {B} +F104-F107
O:G110: {B} +G104-G107
O:H110: {B} +H104-H107
O:I110: {B} +I104-I107
O:J110: {B} +J104-J107
O:K110: {B} +K104-K107
O:L110: {B} +L104-L107
O:M110: {B} +M104-M107
O:N110: {B} +N104-N107
O:O110: {B} +O104-O107
O:Q110: {B} @SUM(D110..O110)
O:B111: '% of Revenue
O:D111: {P2} @IF(D104>0,D110/D104,"")
O:E111: {P2} @IF(E104>0,E110/E104,"")
O:F111: {P2} @IF(F104>0,F110/F104,"")
O:G111: {P2} @IF(G104>0,G110/G104,"")
O:H111: {P2} @IF(H104>0,H110/H104,"")
O:I111: {P2} @IF(I104>0,I110/I104,"")
O:J111: {P2} @IF(J104>0,J110/J104,"")
O:K111: {P2} @IF(K104>0,K110/K104,"")
O:L111: {P2} @IF(L104>0,L110/L104,"")
O:M111: {P2} @IF(M104>0,M110/M104,"")
O:N111: {P2} @IF(N104>0,N110/N104,"")
O:O111: {P2} @IF(O104>0,O110/O104,"")
O:Q111: {P2} @IF(Q104>0,Q110/Q104,"")
O:A113: 'ADMINISTRATION EXPENSES
O:A114: 'Advertising
O:D114: +D54
O:E114: +E54
O:F114: +F54
O:G114: +G54
O:H114: +H54
O:I114: +I54
O:J114: +J54
O:K114: +K54
O:L114: +L54
O:M114: +M54
O:N114: +N54
O:O114: +O54
O:Q114: @SUM(D114..O114)
O:A115: 'Depreciation
```

```
15)

6..O116)
4..D116)
4..E116)
4..F116)
4..G116)
4..H116)
4..I115)
4..J116)
4..K116)
4..L116)
4..M115)
4..N116)
4..O116)
7..O117)
LOSS)
17
17
17
17
17
17
17
17
17
17
17
17
20..O120)
```

```
P:A1: +$A:A1
P:C1: 'MONTHLY REPORTING MODEL
P:A2: (D4) +$A:A2
P:C2: 'MATRIX ACCOUNTING AND FORECASTING (MAF)
P:C3: 'Version
P:D3: (F2) +$A:$D$3
P:E3: '     SUPPLIER:
P:A4: +$A:A4
P:B4: {LRTB} +$A:$B$4
P:C4: +$A:$C$4
P:F4: 'GLW SOFTWARE PTY LTD
P:A5: +$A:A5
P:B5: {LRB} +$A:$B$5
P:E5: 'Level 2,   53 Queen St
P:A6: +$A:A6
P:B6: {LB} +$A:$B$6
P:E6: {L} 'Melbourne VIC 3000
P:E7: 'AUSTRALIA
P:E8: 'Telephone
P:F8: '(03) 9629 7448
P:E9: 'Facsimile
P:F9: '(03) 9629 7464
P:A10: 'SHEET:
P:B10: 'BCLOSE
P:A14: +$A:A1
P:B14: 'OPER
P:C14: 'MONTHLY REPORTING MODEL
P:A15: (D4) @NOW
P:C15: 'REVENUE BASED SYSTEM WITH BUDGETS
P:A16: {DUTCH8} '(c) GLW SOFTWARE PTY LTD 1995,1996
P:A17: {Bold} @IF($A:A17>"",+$A:A17,"")
P:D17: 1
P:E17: 2
P:F17: 3
P:G17: 4
P:H17: 5
P:I17: 6
P:J17: 7
P:K17: 8
P:L17: 9
P:M17: 10
P:N17: 11
P:O17: 12
P:A18: {Bold} @IF($A:A18>"",+$A:A18,"")
P:D18: {Bold} '     JUL
P:E18: {Bold} '     AUG
P:F18: {Bold} '     SEP
P:G18: {Bold} '     OCT
P:H18: {Bold} '     NOV
P:I18: {Bold} '     DEC
P:J18: {Bold} '     JAN
P:K18: {Bold} '     FEB
P:L18: {Bold} '     MAR
P:M18: {Bold} '     APR
P:N18: {Bold} '     MAY
P:O18: {Bold} '     JUN
P:A19: {Bold} @IF($A:A19>"",+$A:A19,"")
P:D19: {Bold} @IF(D17>$A:$B$4,"FORECAST","   ACTUAL")
P:E19: {Bold} @IF(E17>$A:$B$4,"FORECAST","   ACTUAL")
P:F19: {Bold} @IF(F17>$A:$B$4,"FORECAST","   ACTUAL")
P:G19: {Bold} @IF(G17>$A:$B$4,"FORECAST","   ACTUAL")
P:H19: {Bold} @IF(H17>$A:$B$4,"FORECAST","   ACTUAL")
P:I19: {Bold} @IF(I17>$A:$B$4,"FORECAST","   ACTUAL")
P:J19: {Bold} @IF(J17>$A:$B$4,"FORECAST","   ACTUAL")
P:K19: {Bold} @IF(K17>$A:$B$4,"FORECAST","   ACTUAL")
P:L19: {Bold} @IF(L17>$A:$B$4,"FORECAST","   ACTUAL")
P:M19: {Bold} @IF(M17>$A:$B$4,"FORECAST","   ACTUAL")
```

```
A:$B$4,"FORECAST","  ACTUAL")
A:$B$4,"FORECAST","  ACTUAL")
A:A20,"")
A:A21,"")
A:A22,"")
A:A23,"")
A:A24,"")
A:A25,"")
6>"",+$A:A26,"")
7>"",+$A:A27,"")
A:A28,"")

.N:D28)
.N:E28)
.N:F28)
.N:G28)
.N:H28)
.N:I28)
..N:J28)
..N:K28)
..N:L28)
..N:M28)
..N:N28)
..N:O28)
$A:A29,"")
$A:A30,"")
$A:A31,"")
20..C30)
20..D30)
20..E30)
20..F30)
20..G30)
20..H30)
20..I30)
20..J30)
20..K30)
20..L30)
20..M30)
20..N30)
20..O30)

TING MODEL
PTY LTD

TING AND FORECASTING   Version 1.1
GLW SOFTWARE PTY LTD 1995,1996
A42>"",+$A:A42,"")
A43>"",+$A:A43,"")
UL
UG
EP
CT
OV
EC
AN
EB
AR
PR
AY
UN
:A44>"",+$A:A44,"")
:B44>"",+$A:B44,"")
:A45>"",+$A:A45,"")
15>"",+$A:B45,"")
:A46>"",+$A:A46,"")
,+$A:A47,"")
```

```
P:A48: @IF($A:A48>"",+$A:A48,"")
P:A49: @IF($A:A49>"",+$A:A49,"")
P:A50: {Bold} @IF($A:A50>"",+$A:A50,"")
P:A51: @IF($A:A51>"",+$A:A51,"")
P:A52: @IF($A:A52>"",+$A:A52,"")
P:A53: {Bold} @IF($A:A53>"",+$A:A53,"")
P:A54: @IF($A:A54>"",+$A:A54,"")
P:A55: @IF($A:A55>"",+$A:A55,"")
P:A56: @IF($A:A56>"",+$A:A56,"")
P:A57: @IF($A:A57>"",+$A:A57,"")
P:A58: @IF($A:A58>"",+$A:A58,"")
P:A59: @IF($A:A59>"",+$A:A59,"")
P:A60: {Bold} @IF($A:A60>"",+$A:A60,"")
P:A61: {Bold} @IF($A:A61>"",+$A:A61,"")
P:C61: (F0) 'Prev. Year
P:A62: @IF($A:A62>"",+$A:A62,"")
P:C62: (,0) 40000
P:D62: +C62+@SUM(I:D62..N:D62)
P:E62: +D62+@SUM(I:E62..N:E62)
P:F62: +E62+@SUM(I:F62..N:F62)
P:G62: +F62+@SUM(I:G62..N:G62)
P:H62: +G62+@SUM(I:H62..N:H62)
P:I62: +H62+@SUM(I:I62..N:I62)
P:J62: +I62+@SUM(I:J62..N:J62)
P:K62: +J62+@SUM(I:K62..N:K62)
P:L62: +K62+@SUM(I:L62..N:L62)
P:M62: +L62+@SUM(I:M62..N:M62)
P:N62: +M62+@SUM(I:N62..N:N62)
P:O62: +N62+@SUM(I:O62..N:O62)
P:A63: @IF($A:A63>"",+$A:A63,"")
P:C63: (,0) 100000
P:D63: +C63+@SUM(I:D63..N:D63)
P:E63: +D63+@SUM(I:E63..N:E63)
P:F63: +E63+@SUM(I:F63..N:F63)
P:G63: +F63+@SUM(I:G63..N:G63)
P:H63: +G63+@SUM(I:H63..N:H63)
P:I63: +H63+@SUM(I:I63..N:I63)
P:J63: +I63+@SUM(I:J63..N:J63)
P:K63: +J63+@SUM(I:K63..N:K63)
P:L63: +K63+@SUM(I:L63..N:L63)
P:M63: +L63+@SUM(I:M63..N:M63)
P:N63: +M63+@SUM(I:N63..N:N63)
P:O63: +N63+@SUM(I:O63..N:O63)
P:A64: @IF($A:A64>"",+$A:A64,"")
P:D64: +C64+@SUM(I:D64..N:D64)
P:E64: +D64+@SUM(I:E64..N:E64)
P:F64: +E64+@SUM(I:F64..N:F64)
P:G64: +F64+@SUM(I:G64..N:G64)
P:H64: +G64+@SUM(I:H64..N:H64)
P:I64: +H64+@SUM(I:I64..N:I64)
P:J64: +I64+@SUM(I:J64..N:J64)
P:K64: +J64+@SUM(I:K64..N:K64)
P:L64: +K64+@SUM(I:L64..N:L64)
P:M64: +L64+@SUM(I:M64..N:M64)
P:N64: +M64+@SUM(I:N64..N:N64)
P:O64: +N64+@SUM(I:O64..N:O64)
P:A65: {Bold} @IF($A:A65>"",+$A:A65,"")
P:D65: +C65+@SUM(I:D65..N:D65)
P:E65: +D65+@SUM(I:E65..N:E65)
P:F65: +E65+@SUM(I:F65..N:F65)
P:G65: +F65+@SUM(I:G65..N:G65)
P:H65: +G65+@SUM(I:H65..N:H65)
P:I65: +H65+@SUM(I:I65..N:I65)
P:J65: +I65+@SUM(I:J65..N:J65)
P:K65: +J65+@SUM(I:K65..N:K65)
P:L65: +K65+@SUM(I:L65..N:L65)
P:M65: +L65+@SUM(I:M65..N:M65)
```

```
I:N65..N:N65)
I:O65..N:O65)
>"",+$A:A66,"")
00
I:D66..N:D66)
I:E66..N:E66)
I:F66..N:F66)
I:G66..N:G66)
I:H66..N:H66)
I:I66..N:I66)
I:J66..N:J66)
I:K66..N:K66)
I:L66..N:L66)
I:M66..N:M66)
I:N66..N:N66)
I:O66..N:O66)
>"",+$A:A67,"")
00
(I:D67..N:D67)
(I:E67..N:E67)
(I:F67..N:F67)
(I:G67..N:G67)
(I:H67..N:H67)
(I:I67..N:I67)
(I:J67..N:J67)
(I:K67..N:K67)
(I:L67..N:L67)
(I:M67..N:M67)
(I:N67..N:N67)
(I:O67..N:O67)
8>"",+$A:A68,"")
(I:D68..N:D68)
(I:E68..N:E68)
(I:F68..N:F68)
(I:G68..N:G68)
(I:H68..N:H68)
(I:I68..N:I68)
(I:J68..N:J68)
(I:K68..N:K68)
(I:L68..N:L68)
(I:M68..N:M68)
(I:N68..N:N68)
(I:O68..N:O68)
F($A:A69>"",+$A:A69,"")
(I:D69..N:D69)
(I:E69..N:E69)
(I:F69..N:F69)
(I:G69..N:G69)
(I:H69..N:H69)
(I:I69..N:I69)
(I:J69..N:J69)
(I:K69..N:K69)
(I:L69..N:L69)
(I:M69..N:M69)
(I:N69..N:N69)
(I:O69..N:O69)
70>"",+$A:A70,"")
000
M(I:D70..N:D70)
M(I:E70..N:E70)
M(I:F70..N:F70)
M(I:G70..N:G70)
M(I:H70..N:H70)
M(I:I70..N:I70)
M(I:J70..N:J70)
M(I:K70..N:K70)
M(I:L70..N:L70)
```

```
P:M70: +L70+@SUM(I:M70..N:M70)
P:N70: +M70+@SUM(I:N70..N:N70)
P:O70: +N70+@SUM(I:O70..N:O70)
P:A71: @IF($A:A71>"",+$A:A71,"")
P:A72: {Bold} @IF($A:A72>"",+$A:A72,"")
P:A73: @IF($A:A73>"",+$A:A73,"")
P:C73: (,0) -1000000
P:D73: +C73+@SUM(I:D73..N:D73)
P:E73: +D73+@SUM(I:E73..N:E73)
P:F73: +E73+@SUM(I:F73..N:F73)
P:G73: +F73+@SUM(I:G73..N:G73)
P:H73: +G73+@SUM(I:H73..N:H73)
P:I73: +H73+@SUM(I:I73..N:I73)
P:J73: +I73+@SUM(I:J73..N:J73)
P:K73: +J73+@SUM(I:K73..N:K73)
P:L73: +K73+@SUM(I:L73..N:L73)
P:M73: +L73+@SUM(I:M73..N:M73)
P:N73: +M73+@SUM(I:N73..N:N73)
P:O73: +N73+@SUM(I:O73..N:O73)
P:A74: @IF($A:A74>"",+$A:A74,"")
P:C74: (,0) -310000
P:D74: +C74+@SUM(I:D74..N:D74)
P:E74: +D74+@SUM(I:E74..N:E74)
P:F74: +E74+@SUM(I:F74..N:F74)
P:G74: +F74+@SUM(I:G74..N:G74)
P:H74: +G74+@SUM(I:H74..N:H74)
P:I74: +H74+@SUM(I:I74..N:I74)
P:J74: +I74+@SUM(I:J74..N:J74)
P:K74: +J74+@SUM(I:K74..N:K74)
P:L74: +K74+@SUM(I:L74..N:L74)
P:M74: +L74+@SUM(I:M74..N:M74)
P:N74: +M74+@SUM(I:N74..N:N74)
P:O74: +N74+@SUM(I:O74..N:O74)
P:A75: @IF($A:A75>"",+$A:A75,"")
P:C75: (,0) -220000
P:D75: +C75+@SUM(I:D75..N:D75)
P:E75: +D75+@SUM(I:E75..N:E75)
P:F75: +E75+@SUM(I:F75..N:F75)
P:G75: +F75+@SUM(I:G75..N:G75)
P:H75: +G75+@SUM(I:H75..N:H75)
P:I75: +H75+@SUM(I:I75..N:I75)
P:J75: +I75+@SUM(I:J75..N:J75)
P:K75: +J75+@SUM(I:K75..N:K75)
P:L75: +K75+@SUM(I:L75..N:L75)
P:M75: +L75+@SUM(I:M75..N:M75)
P:N75: +M75+@SUM(I:N75..N:N75)
P:O75: +N75+@SUM(I:O75..N:O75)
P:A76: @IF($A:A76>"",+$A:A76,"")
P:D76: +C76+@SUM(I:D76..O:D76)
P:E76: +D76+@SUM(I:E76..O:E76)
P:F76: +E76+@SUM(I:F76..O:F76)
P:G76: +F76+@SUM(I:G76..O:G76)
P:H76: +G76+@SUM(I:H76..O:H76)
P:I76: +H76+@SUM(I:I76..O:I76)
P:J76: +I76+@SUM(I:J76..O:J76)
P:K76: +J76+@SUM(I:K76..O:K76)
P:L76: +K76+@SUM(I:L76..O:L76)
P:M76: +L76+@SUM(I:M76..O:M76)
P:N76: +M76+@SUM(I:N76..O:N76)
P:O76: +N76+@SUM(I:O76..O:O76)
P:A77: @IF($A:A77>"",+$A:A77,"")
P:A78: @IF($A:A78>"",+$A:A78,"")
P:C78: {B} @SUM(C47..C76)
P:D78: @SUM(D47..D76)
P:E78: @SUM(E47..E76)
P:F78: @SUM(F47..F76)
P:G78: @SUM(G47..G76)
```

+$A:A79,"")

NTING MODEL

I PTY LTD

NTING AND FORECASTING

) GLW SOFTWARE PTY LTD 1995,1996

",+$A:A94,"")

AR BALANCES:

```
GET
GET
GET
DGET
DGET
DGET
DGET
DGET
DGET
DGET
DGET
DGET
NGS
```

```
P:K141: {B} +K28
P:L141: {B} +L28
P:M141: {B} +M28
P:N141: {B} +N28
P:O141: {B} +O28
P:A144: 'ASSETS
P:A145: 'Trade Debtors
P:C145: +C62
P:D145: +D62
P:E145: +E62
P:F145: +F62
P:G145: +G62
P:H145: +H62
P:I145: +I62
P:J145: +J62
P:K145: +K62
P:L145: +L62
P:M145: +M62
P:N145: +N62
P:O145: +O62
P:A146: 'Cash at Bank
P:C146: +C63
P:D146: +D63
P:E146: +E63
P:F146: +F63
P:G146: +G63
P:H146: +H63
P:I146: +I63
P:J146: +J63
P:K146: +K63
P:L146: +L63
P:M146: +M63
P:N146: +N63
P:O146: +O63
P:A147: 'Fixed Assets at Cost
P:C147: +C66
P:D147: +D66
P:E147: +E66
P:F147: +F66
P:G147: +G66
P:H147: +H66
P:I147: +I66
P:J147: +J66
P:K147: +K66
P:L147: +L66
P:M147: +M66
P:N147: +N66
P:O147: +O66
P:A148: 'Depreciation Provision
P:C148: +C67
P:D148: +D67
P:E148: +E67
P:F148: +F67
P:G148: +G67
P:H148: +H67
P:I148: +I67
P:J148: +J67
P:K148: +K67
P:L148: +L67
P:M148: +M67
P:N148: +N67
P:O148: +O67
P:C151: @SUM(C144..C150)
P:D151: {B} @SUM(D144..D150)
P:E151: {B} @SUM(E144..E150)
P:F151: {B} @SUM(F144..F150)
P:G151: {B} @SUM(G144..G150)
```

UM(H144..H150)
UM(I144..I150)
UM(J144..J150)
UM(K144..K150)
UM(L144..L150)
UM(M144..M150)
UM(N144..N150)
UM(O144..O150)
LITIES
: Creditors e Capital :rves ained Earnings ofit Current Year

```
P:D158: -D76
P:E158: -E76
P:F158: -F76
P:G158: -G76
P:H158: -H76
P:I158: -I76
P:J158: -J76
P:K158: -K76
P:L158: -L76
P:M158: -M76
P:N158: -N76
P:O158: -O76
P:C160: @SUM(C153..C159)
P:D160: {B} @SUM(D153..D159)
P:E160: {B} @SUM(E153..E159)
P:F160: {B} @SUM(F153..F159)
P:G160: {B} @SUM(G153..G159)
P:H160: {B} @SUM(H153..H159)
P:I160: {B} @SUM(I153..I159)
P:J160: {B} @SUM(J153..J159)
P:K160: {B} @SUM(K153..K159)
P:L160: {B} @SUM(L153..L159)
P:M160: {B} @SUM(M153..M159)
P:N160: {B} @SUM(N153..N159)
P:O160: {B} @SUM(O153..O159)
```